United States Patent
Limberg

(10) Patent No.: US 7,197,685 B2
(45) Date of Patent: Mar. 27, 2007

(54) ROBUST SIGNAL TRANSMISSION IN DIGITAL TELEVISION BROADCASTING

(75) Inventor: Allen LeRoy Limberg, Port Charlotte, FL (US)

(73) Assignee: Samsung Electronics, Co., Ltd., Gyeonggi-do (KR)

( * ) Notice: Subject to any disclaimer, the term of this patent is extended or adjusted under 35 U.S.C. 154(b) by 559 days.

(21) Appl. No.: 10/733,645

(22) Filed: Dec. 12, 2003

(65) Prior Publication Data

US 2004/0237024 A1    Nov. 25, 2004

Related U.S. Application Data

(60) Provisional application No. 60/437,648, filed on Jan. 2, 2003, provisional application No. 60/458,547, filed on Mar. 28, 2003.

(51) Int. Cl.
*H03M 13/00* (2006.01)
(52) U.S. Cl. ................. 714/756; 714/784; 714/792; 375/265
(58) Field of Classification Search ............... 714/756, 714/784, 791–792, 794–796, 761, 787; 374/285–286, 374/265, 346
See application file for complete search history.

(56) References Cited

U.S. PATENT DOCUMENTS

| | | | |
|---|---|---|---|
| 6,181,383 B1 | 1/2001 | Fox et al. | |
| 6,366,731 B1 | 4/2002 | Na et al. | |
| 6,407,998 B1 | 6/2002 | Polit et al. | |
| 6,426,780 B1 * | 7/2002 | Limberg et al. | 348/725 |
| 6,430,159 B1 | 8/2002 | Wan et al. | |
| 6,496,230 B1 * | 12/2002 | Limberg et al. | 348/725 |

* cited by examiner

*Primary Examiner*—Guy J. Lamarre
(74) *Attorney, Agent, or Firm*—Sughrue Mion, PLLC

(57) ABSTRACT

A data field of transmitted digital television signals includes a first set of A/53-compliant data segments that convey payload information and further includes a second set of A/53-compliant data segments that contain parity bytes for transverse Reed-Solomon forward-error-correction coding of the data contained within the first set of A/53-compliant data segments. A digital television receiver uses the parity bytes in the second set of A/53-compliant data segments to implement transverse Reed-Solomon forward-error-correction decoding that corrects byte errors in the data contained in the first set of A/53-compliant data segments.

75 Claims, 29 Drawing Sheets

| PAYLOAD IN Mb/S | M = LENGTH OF TRANSVERSE R-S CODE | N = M - P | P = NO. OF PARITY BYTES IN TRANSVERSE R-S CODE | Q = NO. OF DATA PACKETS OF PARITY BYTES |
|---|---|---|---|---|
| 17.61 | 309 | 285 | 24 | 27 |
| 16.07 | 306 | 260 | 46 | 52 |
| 13.84 | 302 | 224 | 78 | 88 |
| 10.51 | 296 | 170 | 126 | 142 |
| 6.06 | 288 | 98 | 190 | 214 |
| 3.83 | 284 | 62 | 222 | 250 |
| 12.85 | 300 | 208 | 92 | 104 |
| 10.63 | 296 | 172 | 124 | 140 |
| 7.42 | 290 | 120 | 170 | 192 |
| 6.30 | 288 | 102 | 186 | 210 |
| 4.08 | 284 | 66 | 218 | 246 |

Fig. 2

| PAYLOAD IN Mb/S | M = LENGTH OF TRANSVERSE R-S CODE | N = M - P | P = NO. OF PARITY BYTES IN TRANS-VERSE R-S CODE | Q = NO. OF DATA PACKETS OF PARITY BYTES |
|---|---|---|---|---|
| 13.35 | 150 | 108 | 42 | 48 |
| 12.24 | 149 | 99 | 50 | 57 |
| 10.88 | 148 | 88 | 60 | 68 |
| 6.67 | 144 | 54 | 90 | 102 |
| 4.20 | 142 | 34 | 108 | 122 |
| 3.09 | 141 | 25 | 116 | 131 |
| 18.17 | 155 | 147 | 8 | 9 |
| 17.06 | 154 | 138 | 16 | 18 |
| 12.85 | 150 | 104 | 46 | 52 |
| 10.51 | 147 | 85 | 62 | 71 |
| 6.18 | 144 | 50 | 94 | 106 |

Fig. 3

| PAYLOAD IN Mb/S | G = LENGTH OF TRANSVERSE R-S CODE | H = G - J | J = NO. OF PARITY BYTES IN TRANS-VERSE R-S CODE | H + (9/8) J = H + K = NO. OF SEGMENTS IN SUPER GROUP |
|---|---|---|---|---|
| 18.83 | 16 | 8 | 8 | 17 |
| 18.27 | 24 | 8 | 16 | 26 |
| 17.71 | 32 | 8 | 24 | 35 |
| 19.11 | 24 | 16 | 8 | 25 |
| 18.83 | 32 | 16 | 16 | 34 |
| 18.55 | 40 | 16 | 24 | 43 |
| 18.27 | 48 | 16 | 32 | 52 |
| 17.99 | 56 | 16 | 40 | 61 |
| 17.71 | 64 | 16 | 48 | 70 |
| 19.20 | 32 | 24 | 8 | 33 |

Fig. 11A

| PAYLOAD IN Mb/S | G = LENGTH OF TRANSVERSE R-S CODE | H = G - J | J = NO. OF PARITY BYTES IN TRANSVERSE R-S CODE | H + (9/8)J = H + K = NO. OF SEGMENTS IN SUPER GROUP |
|---|---|---|---|---|
| 19.02 | 40 | 24 | 16 | 42 |
| 18.83 | 48 | 24 | 24 | 51 |
| 18.64 | 56 | 24 | 32 | 60 |
| 18.46 | 64 | 24 | 40 | 69 |
| 18.27 | 72 | 24 | 48 | 78 |
| 18.08 | 80 | 24 | 56 | 87 |
| 17.90 | 88 | 24 | 64 | 96 |
| 17.71 | 96 | 24 | 72 | 105 |
| 19.25 | 40 | 32 | 8 | 41 |
| 19.11 | 48 | 32 | 16 | 50 |

Fig. 11B

| PAYLOAD IN Mb/S | M = LENGTH OF TRANSVERSE R-S CODE | N = M - P | P = NO. OF PARITY BYTES IN TRANSVERSE R-S CODE | N + (9/8) P = N + Q = NO. OF SEGMENTS IN SUPER GROUP |
|---|---|---|---|---|
| 18.97 | 56 | 32 | 24 | 59 |
| 18.83 | 64 | 32 | 32 | 68 |
| 18.69 | 72 | 32 | 40 | 77 |
| 18.55 | 80 | 32 | 48 | 86 |
| 18.41 | 88 | 32 | 56 | 95 |
| 18.27 | 96 | 32 | 64 | 104 |
| 18.13 | 104 | 32 | 72 | 113 |
| 17.99 | 112 | 32 | 80 | 122 |
| 17.85 | 120 | 32 | 88 | 131 |
| 17.71 | 128 | 32 | 96 | 140 |

Fig. 11C

ROBUST SIGNAL TRANSMISSION IN DIGITAL TELEVISION BROADCASTING

This application is filed under 35 U.S.C. 111(a), claims pursuant to 35 U.S.C. 119(e)(1) benefit of the filing date of provisional U.S. patent application Ser. No. 60/437,648 filed 2 Jan. 2003 pursuant to 35 U.S.C. 111(b), and claims pursuant to 35 U.S.C. 119(e)(1) benefit of the filing date of provisional U.S. patent application Ser. No. 60/458,547 filed 26 Mar. 2003 pursuant to 35 U.S.C. 111(b), both of which provisional applications are incorporated herein by reference.

This invention relates to techniques of forward-error-correction in a digital broadcasting system, and in particular, relates to supplementary forward-error-correction coding for data packets at the transport stream layer.

BACKGROUND OF THE INVENTION

The MPEG-2 standard addresses the combining of one or more elementary streams of video, audio and other data into single or multiple streams that are suitable for storage or transmission. In very general terms, the MPEG-2 standard for transmitting digital video and associated audio and other information involves the following three steps. In the first step, a digital video signal (from a digital camera or from an analog to digital converter) is compressed by analyzing and encoding the signal using spatial and temporal redundancy. Spatial redundancy refers to the redundant information inside one video frame while temporal redundancy refers to the redundant information between consecutive frames. This process generates: Intra-frames (I-frames), which contain all of the information in an entire image; Predicted frames (P-Frames), which have some compression as they are predicted based on past I-frames and/or other P-frames; and Bi-directionally predicted frames (B-frames), which are the most compressed images as they are predicted from past and future I-Frames and P-Frames. In the second step carried out concurrently with the first step, an audio signal is compressed by removing low-power tones adjacent high-power tones. Removal of these tones does not affect the signal, because the high-power tones tend to mask the lower-power tones, making them inaudible to the human ear. In the final third step, the compressed video signals, audio signals and related time stamps of those signals are assembled into packets and inserted into a Packetized Elementary Stream (PES). Each packet in a packetized elementary stream contains overhead information such as a start code, stream ID, packet length, optional packetized elementary stream header and stuffing bytes, in addition to the actual packet bytes of video and audio data.

To facilitate the multiplexing together of several streams of packetized elementary streams of different types of data, a Programme Specific Information (PSI) table is also created, which includes a series of tables to reassemble specific packetized elementary stream within multiple channels of packetized elementary streams. The packetized elementary stream and the program specific information provide the basis for a Transport Stream (TS) of packetized elementary stream and program specific information packets.

Of particular interest to the invention disclosed herein is the transport stream as defined in Annex D of the "ATSC Digital Television Standard" published by the Advanced Television Systems Committee (ATSC) in 1995 as its document A/53. This standard defines the broadcasting of digital television (DTV) signals within the United States of America and is referred to in this specification simply as "A/53". Annex D of A/53 specifies that the original data transport stream is composed of 187-byte packets of data corresponding to MPEG-2 packets without their initial sync bytes. Annex D of A/53 specifies that data are to be randomized by being exclusive-ORed with a specific $2^{16}$-bit maximal length pseudo-random binary sequence (PRBS) which is initialized at the beginning of each data field. Annex D of A/53 specifies (207, 187) Reed-Solomon forward-error-correction (R-S FEC) coding of packets of randomized data followed by convolutional interleaving. The convolutional interleaving prescribed by A/53 provides error correction capability for continuous burst noise up to 193 microseconds (2070 symbol epochs) in duration. The convolutionally interleaved data with R-S FEC coding are subsequently trellis coded to ⅔ original code rate and mapped into eight-level digital symbols. The symbols are parsed into 828-symbol sequences.

Annex D specifies that the data frame shall be composed of two data fields, each data field composed of 313 data segments, and each data segment composed of 832 symbols. Annex D specifies that each data segment shall begin with a 4-symbol data-segment-synchronization (DSS) sequence. Annex D specifies that the initial data segment of each data field shall contain a data-field-synchronization (DFS) signal following the 4-symbol DSS sequence therein. The DSS and DFS signals are composed of symbols with +5 or −5 modulation signal values. The $2^{nd}$ through $313^{th}$ data segments each conclude with a respective one of the trellis-coded 828-symbol sequences, the convolutional interleaving of which sequences extends to a depth of 52 data segments. The digital symbols are transmitted by eight-level modulation with +7, +5, +3, +1, −1, −3, −5 and −7 modulation signal values. Owing to the A/53 baseband DTV signal being transmitted via vestigial-sideband suppressed-carrier amplitude modulation of a radio-frequency carrier, this eight-level modulation signal is referred to as trellis-coded 8VSB signal. These transmissions are accompanied by a pilot carrier of the same frequency as the suppressed carrier and of an amplitude corresponding to modulation value of +1.25.

The fifth through $515^{th}$ symbols in the initial data segment of each data field are a specified PN511 sequence—that is, a pseudo-random noise sequence composed of 511 symbols capable of being rendered as +5 or −5 modulation signal values. The $516^{th}$ through $704^{th}$ symbols in the initial data segment of each data field are a triple-PN63 sequence. The middle PN63 sequence is inverted in sense of polarity every other data field. The $705^{th}$ through $728^{th}$ symbols in the initial data segment of each data field contain a VSB mode code specifying the nature of the vestigial-sideband (VSB) signal being transmitted. The remaining 104 symbols in the initial data segment of each data field are reserved, with the last twelve of these symbols being a precode signal that repeats the last twelve symbols of the data in the last data segment of the previous data field. A/53 specifies such precode signal to implement trellis coding and decoding procedures being able to resume in the second data segment of each field proceeding from where those procedures left off processing the data in the preceding data field.

The 8VSB transmissions have a 10.76 million bits per second baud rate to fit within a 6-megahertz-wide broadcast television channel, and the effective payload is 19.3 million bits per second (Mbps). In an additive-white Gaussian noise (AWGN) channel a perfect receiver will require at least a 14.9 dB signal-to-nose ratio (SNR) in order to keep errors below a threshold-of-visibility (TOV) defined as 1.93 data segment errors per 10,000 data segments, supposing 8VSB signals are broadcast.

After the "ATSC Digital Television Standard" was established in 1995, reception of terrestrial broadcast DTV signals proved to be problematic, particularly if indoor antennas were used. In early 2000 ATSC made an industry-wide call for experts in terrestrial broadcast transmission and reception to join a Task Force on RF System Performance for studying problems with adequate reception and suggesting possible solutions to those problems. By the end of 2000 or so there was general consensus that, besides problems with equalization of the reception channel, there was a need to make the 8VSB signal more robust, if it were to be successfully received during noisy reception conditions. On 26 Jan. 2001 the ATSC Specialist Group on RF Transmission (T3/S9) issued a "Request for Proposal for Potential Revisions to ATSC Standards in the Area of Transmission Specifications". This RFP concerning how to improve the performance of 8VSB was directed to the DTV industry, universities and other parties interested in the problem. The compatible improvement of fixed and indoor 8-VSB terrestrial DTV service is specified in the widely distributed ATSC RFP to be of top priority.

Subsequent proposals for making the 8VSB signal more robust by altering modulation of the carrier wave share a common problem that the information transmitted in the robust format cannot be utilized by so-called "legacy" DTV receivers that have already been sold to the receiving public. Every 187 bytes of robust payload displace at least 374 bytes of normal payload that can be received by legacy DTV receivers and could be used for HDTV. That is, the amount of information contained in one data segment transmitted by 8VSB as specified by Annex D of the A/53 standard occupies two or more data segments of the robust signal in the proposals for making the 8VSB signal more robust by halving code rate. This means that, if legacy DTV receivers are still to be accommodated with regard to receiving a television program with good resolution in its picture content and reasonably high fidelity in the accompanying sound content, very little payload can be transmitted in the robust format. The problem is particularly vexatious if a part of the normal payload is to be transmitted in the robust format, because most of the proposals for transmission of data in a more robust format have the following requirement. The information content of the part of the normal payload has to be transmitted, not only in the more robust 8VSB format, but additionally in normal 8VSB format so that legacy receivers can be accommodated.

The specification and drawing of U.S. Pat. No. 6,430,159 titled "Forward Error Correction at MPEG-2 Transport Stream Layer" and issued Aug. 6, 2002 to Xiang Wan and Marc H. Morin are incorporated herein by reference. U.S. Pat. No. 6,430,159 describes an error correction operation being performed on a super group of packets within a Transport Stream (TS) using MPEG-2 TS protocol. The forward-error-correction (FEC) coding is formatted as a trailer group of MPEG-2 compliant TS packets containing no payload data, but only an adaptation field. The trailer group packets are provided with PIDs that cause them to be discarded by a standard MPEG-2 decoder. However, an especially equipped MPEG-2 decoder recognizes the PIDs and extracts the trailer group packets to be used for recovering data lost or corrupted in the transmission of the TS. A general concept that can be extracted from U.S. Pat. No. 6,430,159 is that FEC coding can be contained in data packets that do not contain payload data and that are separate from data packets that do contain payload. This concept, as applied to MPEG-2-compliant data packets, was critical to the objectives of the U.S. Pat. No. 6,430,159 invention. Wan and Morin sought to provide a system and method to correct an MPEG-2 transport stream that could be used in any one of the digital video broadcast (DVB) formats, without the need for FEC decoders which were specific to the particular DVB format. Another objective of the U.S. Pat. No. 6,430,159 invention was to avoid appending FEC coding to the end of each packet, in effect adding another layer to the protocol stack. Such a new layer is specific to the transmission architecture and not subject to the MPEG-2 standard. Accordingly, a broadcaster would have to rely upon each intended receiver having a symmetric FEC decoder for the transmitted signal to be received.

The U.S. Pat. No. 6,430,159 invention was not taken up by the satellite broadcast industry, the cablecasting industry or the terrestrial broadcast industry. These industries continued the practice of inserting the original transport stream into a forward-error-correction encoder and broadcasting the resulting signal over their respective broadcast medium to receivers, each having a symmetric FEC decoder for the transmitted signal. The various receivers for satellite broadcast, cablecasting and terrestrial broadcast systems continued to recover MPEG-2-compliant transport streams from received signals, using FEC decoders specific to the various systems and symmetric with the FEC coders employed in these various systems. Wan and Morin had sought to avoid the need for such practices with their U.S. Pat. No. 6,430,159 invention.

Transmitting FEC coding in data packets that do not contain payload data is a practical modification of the current United States standard for digital television broadcasting even though system-specific FEC encoding of the data to be broadcast is appended to each MPEG-2 data packet. Appending system-specific FEC encoding to the MPEG-2 data packets is a practice of the type that Wan and Morin sought to avoid by using their U.S. Pat. No. 6,430,159 invention. Even so, DTV data packets that contain supplemental FEC coding, but do not contain payload data, can be used as the basis for more robust reception of conventional DTV data packets that do contain payload. Such supplemental FEC coding does not affect data segments that contain payload data. This avoids having to transmit the same DTV information twice, once for legacy DTV receivers and again for DTV receivers of new design. The conventional DTV data packets that contain payload are usable by legacy receivers, as well as being part of the robust transmission.

U.S. Pat. No. 6,430,159 describes transverse Reed-Solomon forward-error correction coding being used to generate the adaptation fields that accompany the data fields in a transmission. Transverse Reed-Solomon forward-error-correction codes are applied to paths that cross each of a group of data packets or data segments, with each byte of each data segment being included in one of the paths. The transverse R-S FEC codes generate parity bytes. U.S. Pat. No. 6,430,159 describes such parity bytes being arranged in further packets separate from the data packets. These further packets are similar in general format to data packets and are transmitted according to protocols similar to those used for transmitting the data packets. U.S. Pat. No. 6,430,159 does not convey to one of ordinary skill in the DTV art a full appreciation of the flexibility in transmission system design afforded by such coding, however.

A wide variety of transverse Reed-Solomon codes can be used for providing additional forward-error correction coding for data fields as defined in A/53. A variety of transverse R-S codes can be used for providing additional forward-error-correction coding for a prescribed number of A/53-compliant data segments selected from one or more data fields as defined in A/53. Transverse R-S coding affords greater flexibility in choosing the amount of redundancy in robust transmissions than is provided by proposals for making the 8VSB signal more robust by altering modulation of the carrier wave to halve code rate or to quarter code rate. Broadcasters who participated in the Task Force on RF System Performance expressed a desire for flexibility in reducing code rate and hoped for smaller reductions in coding rate.

Transverse R-S FEC coding facilitates choosing the amount of redundancy in robust transmissions to be larger than the amount of redundancy in normal 8VSB transmissions by factors between one and two. Coupled with not having to transmit the same DTV information twice, once for legacy DTV receivers and again for DTV receivers of new design, this permits DTV transmission to be made more robust while still maintaining higher than standard DTV resolution. This allows DTV receivers of new design to receive HDTV broadcasting of given effective radiated power (ERP) at substantially more reception sites than legacy DTV receivers could receive normal HDTV transmissions from the same transmitter. At the same time, legacy DTV receivers can continue to receive the HDTV broadcasting at the reception sites where those receivers were able to receive normal HDTV transmissions from the same transmitter. Previous proposals for making the 8VSB signal more robust by altering modulation of the carrier wave do not allow robust transmission of HDTV signals receivable by legacy DTV receivers as well as by DTV receivers of new design.

Transverse R-S FEC coding combines with the lateral (207, 187) R-S FEC coding prescribed by A/53 to provide two-dimensional R-S FEC coding. As previously noted, U.S. Pat. No. 6,430,159 disparages the use of lateral R-S FEC coding and consequently teaches away from two-dimensional R-S FEC coding. Two-dimensional R-S FEC coding is known per se in arts other than the DTV art. The recording of digital audio on compact disk uses cross-interleaved Reed-Solomon coding (CIRC). Two-dimensional R-S FEC coding has also been used when recording digital information on magnetic tape.

However, the reasons that two-dimensional R-S FEC coding is advantageous are different in the DTV art than in other arts. Transverse R-S FEC coding is used in modification of the A/53 DTV standard because additional forward-error-correction coding can be introduced into the DTV signal with minimal effect on reception by legacy DTV receivers. The lateral (207, 187) R-S FEC coding prescribed by A/53 provides a means for the transport stream de-multiplexer in a DTV receiver to determine whether or not a received data packet contains uncorrected byte errors. So, lateral (207, 187) R-S FEC coding is indispensable when modifying the A/53 DTV standard, particularly to legacy DTV receivers. Accordingly, lateral (207, 187) R-S error correction is performed on data packets subsequent to transverse R-S error correction, as a final step before de-randomization of bits in each data packet. Performing lateral R-S error correction subsequent to transverse R-S error correction reverses the order of two-dimensional R-S error correction that is conventionally used in playback apparatus for magnetic-tape recordings of digital data.

Transverse Reed-Solomon forward-error-correction coding provides little particular assistance to improving equalization. Accordingly, further aspects of the invention concern the time-division-multiplexing of "super-robust" signals into the DTV signal. These super-robust signals use only one-half of the full alphabet of 8VSB symbols, so four rather than eight modulation levels are used. Because broadcast DTV uses trellis coding following convolutional interleaving, rather than block interleaving, the robust-modulation symbols should be ones that can be incorporated into the data stream also including trellis-coded 8VSB symbols without affecting the trellis coding of the 8VSB symbols.

For example, a set of restricted-alphabet 8VSB symbols that map data into just +7, +5, −5 and −7 modulation signal values was proposed by Philips Research. This restricted-alphabet signal is referred to as "pseudo-2VSB", since the information in the resulting modulation signal is conveyed entirely by the polarity of that signal. Using pseudo-2VSB throughout the entire DTV broadcast would halve the effective payload to 9.64 million bits per second (Mbps), but this is more than sufficient to transmit a standard-definition television (SDTV) signal. The gap between the least negative normalized modulation level, −5, and the least positive normalized modulation level, +5, is 10. This is five times the gap of 2 between adjacent modulation levels in an 8VSB signal, permitting TOV to be achieved at significantly worse SNR under AWGN conditions. The SNR required in order to keep errors below TOV in an AWGN channel is reduced to 8.5 dB, a reduction of 6.4 dB.

That is, about a quarter as much power would be required for satisfactory reception of an AWGN channel, presuming that modulation levels did not have to be decreased to maintain average effective radiated power (ERP) levels within current specification. The average ERP of the pseudo-2VSB symbols tends to increase respective to conventional trellis-coded 8VSB, because of just the +7, +5, −5 and −7 modulation signal values being used and the +3, +1, −1 and −3 modulation signal values of 8VSB not being used. A 1.5 dB decrease in transmitter peak power is necessary if long sequences of modified-2VSB symbols are transmitted. So, if long sequences of pseudo-2VSB symbols are transmitted, the increase in service area for the pseudo-2VSB signal is only that which could be achieved with a 4.9 dB increase in the power of a conventional trellis-coded 8VSB signal. Furthermore, service area for the conventional trellis-coded 8VSB signal accompanying the pseudo-2VSB signal is diminished. Consequently, pseudo-2VSB signals would in actual broadcast practice probably be restricted to only a small number of the data segments in each 313-segment data field.

Various restricted alphabets of 8VSB symbols can be analyzed to determine how the original data transport stream can be modified to cause each of the restricted-alphabet 8VSB symbol streams to be generated during the trellis coding procedure at the transmitter. Each bit in a stream of randomized data can be immediately repeated to generate a modified stream of data supplied to the (207, 187) R-S FEC encoder, which causes a pseudo-2VSB signal to be generated by the trellis coding procedure.

In another, different procedure a ONE is inserted after each bit in a stream of randomized data to generate a modified stream of data supplied to the (207, 187) R-S FEC encoder. This modified stream of data causes the trellis coding procedure to generate a restricted-alphabet signal which excludes the −7, −5, +1 and +3 symbol values of the full 8VSB alphabet. Pilot carrier energy is increased substantially in the resulting modulation, which makes synchronous demodulation easier in the DTV receiver. The gap between the least negative normalized modulation level, −5, and the least positive normalized modulation level, +1, is 6 in this restricted-alphabet signal. This gap is thrice the gap of 2 between adjacent modulation levels in an 8VSB signal, permitting TOV to be achieved at significantly poorer SNR under AWGN conditions than is the case with 8VSB signal or with E-4VSB signal. Better SNR under AWGN conditions is required to achieve TOV than is the case with pseudo-2VSB. This restricted-alphabet signal has substantially less average power than a pseudo-2VSB signal, but somewhat higher average power than normal 8VSB signal.

In still another, different procedure a ZERO is inserted after each bit in a stream of randomized data to generate a modified stream of data supplied to the (207, 187) R-S FEC encoder. This modified stream of data causes the trellis coding procedure to generate a restricted-alphabet signal which excludes the −3, −1, +5 and +7 symbol values of the full 8VSB alphabet. The gap between the least negative normalized modulation level, −5, and the least positive normalized modulation level, +1, is also 6 in this restricted-alphabet signal. However, this restricted-alphabet signal has somewhat less average power than normal 8VSB signal. A difficult problem with using just this restricted-alphabet signal is that the polarity of the pilot signal is reversed in the resulting modulation, which interferes with synchronous demodulation in DTV receivers, particularly legacy ones.

A receiver for broadcast DTV signals can use different symbol decoding procedures depending on whether the full alphabet of 8VSB symbols is being transmitted thereto or only half of the alphabet of 8VSB symbols is being transmitted thereto. If symbol decoding is done by Viterbi trellis decoding procedures, the decoding tree can be pruned to exclude decoding possibilities that are ruled out by knowledge that only half of the alphabet of the 8VSB symbols was transmitted. However, this presumes that at the time that symbol decoding is done, the DTV receiver has knowledge available to it as to whether the currently received DTV signal was transmitted using the full alphabet of 8VSB symbols or only half of that alphabet. The packet identification (PID) code bits of a data packet indicates whether the full alphabet of 8VSB symbols or only half of that alphabet was used in generating the data packet, but that information is not timely available at the receiver. The convolutional byte interleaving done at the transmitter before forward-error-correction coding breaks the PID into two parts and disperses the parts within the data field. The convolutional de-interleaving done in the receiver subsequent to symbol decoding restores the PID but only a considerable time after completion of the symbol decoding of the bytes including the PID.

Information as to whether the currently received DTV signal was transmitted using the full alphabet of 8VSB symbols or using only half of that alphabet can be transmitted in coded form during the 92-symbol "reserved" portion of the initial, zeroeth data segment of a data field. This "reserved" portion immediately follows the data field synchronization (DFS) signal. On 19 Dec. 2002 Philips Research described a general concept for doing this, as part of a proposal to ATSC for enhancing 8VSB signals. On Apr. 9, 2002 V. R. Gaddam and D. Birru filed U.S. patent application Ser. No. 118,876 titled "Packet Identification Mechanism at the Transmitter and Receiver for an Enhanced ATSC 8-VSB System". This application assigned to Koninklijke Philips Electronics N.V. was published Dec. 19, 2002 with publication No. 20020191712. This publication describes the pattern of data segments for normal transmission and for robust transmission in a data field yet to be convolutionally interleaved being inserted into a bit map convolutionally interleaved to provide a homologue of the byte map of interleaved data that is trellis coded.

On Dec. 3, 2001 M. Fimoff, R. W. Citta and J. Xia filed U.S. patent application Ser. No. 011,333 titled "Kerdock Coding and Decoding System for Map Data". This application assigned to Zenith Electronics Corporation was published Mar. 27, 2003 with publication No. 20030058140. This publication describes Kerdock codes that code different patterns of robust transmission within data fields being inserted into the initial, zeroeth data segment of each data field. This method can be adapted for describing DTV signal transmitted using the full alphabet of 8VSB symbols or using only half of that alphabet.

SUMMARY OF THE INVENTION

A data field of digital television signals transmitted in accordance with an aspect of the invention includes a first set of A/53-compliant data segments that convey payload information and further includes a second set of A/53-compliant data segments that contain parity bytes for transverse Reed-Solomon forward-error-correction coding of the data contained within the first set of A/53-compliant data segments. A digital television receiver constructed in accordance with another aspect of the invention uses the parity bytes in the second set of A/53-compliant data segments to implement transverse Reed-Solomon forward-error-correction decoding that corrects byte errors in the data contained in the first set of A/53-compliant data segments. The transverse Reed-Solomon forward-error-correction decoding can significantly increase the level of additive white Gaussian noise (AWGN) required to lower the signal-to-noise ratio (SNR) sufficiently that errors exceed the threshold of visibility (TOV). TOV is defined as 2.5 data segment errors per second, a level at which transmission errors are readily observable in digital video.

Further aspects of the invention concern the time-division-multiplexing of "super-robust" component signals into the DTV signal. These super-robust component signals use half of the full alphabet of 8VSB symbols. The positioning of the data segments in each data field that contain super-robust component signals is signaled by code transmitted in the "reserved" section of the initial data segment of the data field. The DTV receiver responds to such signaling to modify the symbol decoding operations for super-robust component signals. These modifications of symbol decoding procedures can benefit adaptive equalization in the DTV receiver, as well as increasing the level of AWGN required for errors to exceed TOV.

BRIEF DESCRIPTION OF THE DRAWING

FIG. 2 is a table showing the characteristics of transverse Reed-Solomon forward-error-correction codes that traverse a 312-segment data field and showing the payload reductions associated with using these codes.

FIG. 3 is a table showing the characteristics of some transverse Reed-Solomon forward-error-correction codes that traverse half a 312-segment data field and showing the payload reductions associated with using these codes.

FIGS. 11A, 11B and 11C are portions of a table showing the characteristics of transverse Reed-Solomon forward-error-correction codes for robust transmission of audio or ancillary data, and showing the payload reductions associated with using these codes.

DETAILED DESCRIPTION

Figure 1:
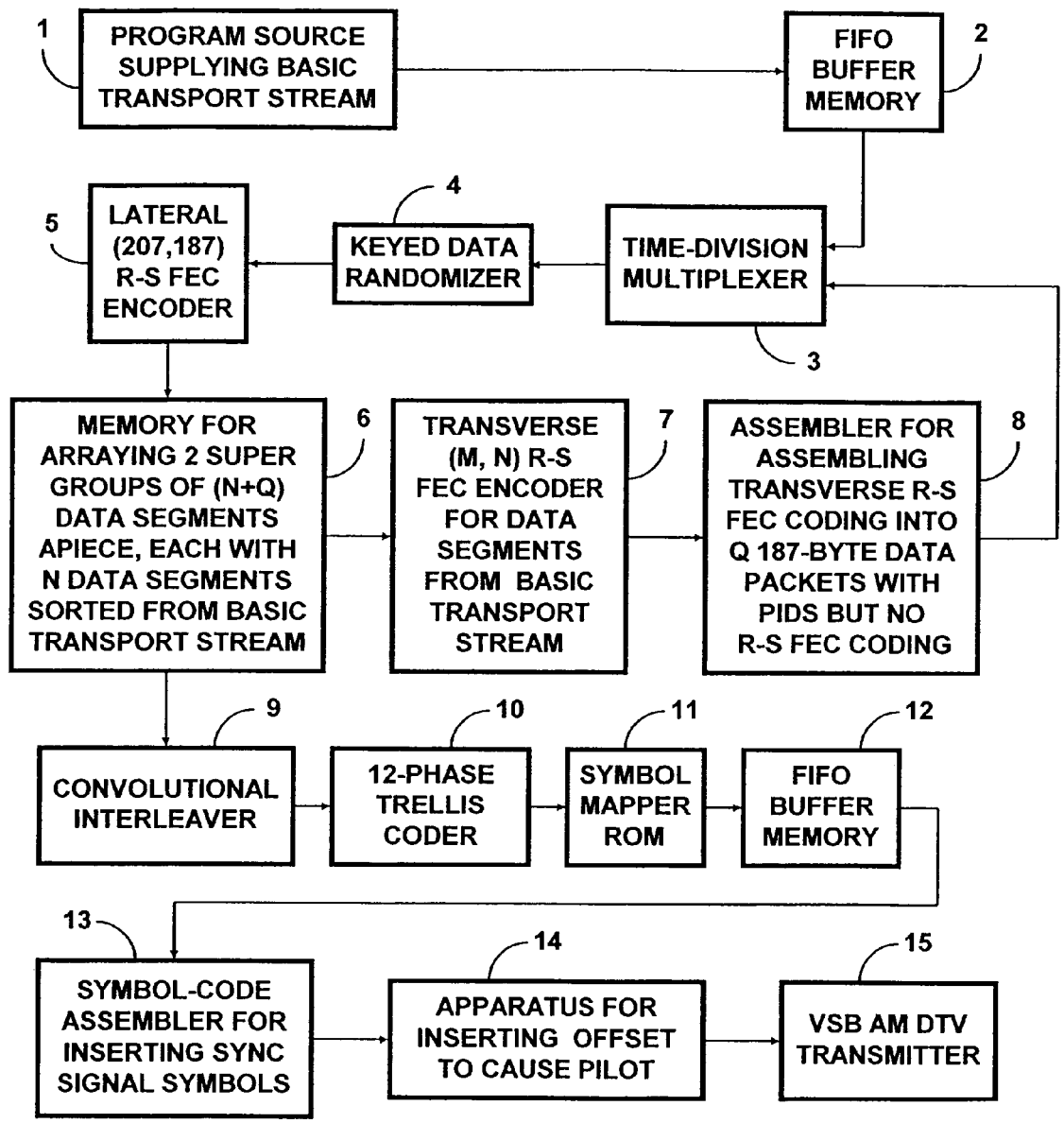
FIG. 1 is a schematic diagram of transmitting apparatus for transmitting a robust DTV signal with a payload that is reduced from that of an HDTV signal conforming to the A/53 standard, which apparatus is constructed in accordance with an aspect of the invention to perform transverse Reed-Solomon forward-error-correction coding on data bytes before they are convolutionally interleaved.

FIG. 1 shows a transmitter for transmitting a robust DTV signal with payload that is reduced from that of an HDTV signal conforming to the A/53 standard. Part of the payload is replaced with additional forward-error-correction (FEC) code in order to increase the robustness of the DTV transmission. A program source 1 supplies the basic transport stream in 187-byte data packets to a first-in/first-out buffer memory 2 for temporary storage therein. A time-division multiplexer 3 is connected for supplying 187-byte data packets to a keyed data-randomizer 4. Some of these 187-byte data packets correspond to 187-byte data packets read from the FIFO buffer memory 2. Others of these 187-byte data packets comprise transverse Reed-Solomon forward-error-correction code, the generation of which will be described in more detail further on in this specification.

The keyed data-randomizer 4 includes apparatus for generating a $2^{16}$-bit pseudo-random binary sequence (PRBS) of the sort specified in A/53, Annex D, Section 4.2.2 titled "Data-randomizer". The keyed data-randomizer 4 is keyed "on" to exclusive-OR bits of this PRBS with contemporaneous bits in the 87-byte data packets that the time-division multiplexer 3 supplies responsive to read-out from the FIFO buffer memory 2. The keyed data-randomizer 4 is also keyed "on" to exclusive-OR bits of the PRBS with contemporaneous bits in the 3-byte headers of the 187-byte data packets that comprise transverse Reed-Solomon forward-error-correction code, but is keyed "off" during the remaining 184 "payload" bytes of these data packets. This avoids randomization of the transverse Reed-Solomon forward-error-correction coding.

The randomized data from the data-randomizer 4 is supplied to a (207, 187) Reed-Solomon forward-error-correction encoder 5 of the sort specified in A/53, Annex D, Section 4.2.3 titled "Reed-Solomon encoder". The encoder 5 appends twenty bytes of lateral Reed-Solomon forward-error-correction code to the conclusion of each of the 187-byte randomized data packets, to generate a respective A/53-compliant 207-byte segment written into a random-access memory 6. Since the R-S FEC coding takes place along a byte path corresponding with the order bytes appear in a data path, this specification characterizes this R-S FEC coding as being "lateral" in nature, and the encoder 5 is described as being a "lateral" (207, 187) R-S FEC encoder.

The RAM 6 stores one 8-bit byte of code at each of its addressed storage locations and has enough addressed storage locations to store at least two successive super groups of (N+Q) data segments. In one of the preferred designs each super group of (N+Q) data segments is a data field, and (N+Q) therefore equals 312. In another of the preferred designs each super group of (N+Q) data segments is half a data field, and (N+Q) therefore equals 156. After a number N successive data segments of the basic transport stream that will appear in a super group have been written into a bank of the RAM 6, read addressing is applied to this bank for scanning these N successive data segments in transverse direction. This is done to read N-byte transverse data segments to a transverse (M, N) Reed-Solomon forward-error-correction encoder 7. M is an integer somewhat less than (N+Q). There are P parity bytes in each transverse (M, N) Reed-Solomon forward-error-correction code. Since half as many errors can be located and corrected by an R-S FEC code as there are parity bytes, P is preferably an even number. N is an integer equal to M minus P. A data assembler 8 assembles the resulting transverse R-S FEC coding from the transverse R-S FEC encoder 7 into Q data packets that comply with the MPEG-2 standard except for not having an initial sync byte. The data assembler 8 supplies each of these packets with a 3-byte header including an identifying PID and a continuity count. The remaining 184 bytes of each of these packets are parity bytes from the transverse R-S FEC coding. The time-division multiplexer 4 is operated for supplying these 187-byte data packets to the (207, 187) R-S FEC encoder 5. The lateral R-S FEC encoder 5 appends twenty bytes of lateral R-S FEC code to the conclusion of each of these 187-byte data packets, to generate a respective A/53-compliant 207-byte segment written into the RAM 6. The Q data segments containing parity bytes from transverse R-S FEC coding are written into the bank of the RAM 6, for completing the super group temporarily stored therein. The completed super group is then read from the RAM 6.

A full-length R-S code has $2^n-1$ bytes, n being an integer larger than one by a considerable factor. A prescribed number of these bytes are parity bytes. An R-S FEC code is "shortened" by presuming a number of the bytes in a full-length R-S FEC code to have predetermined values, customarily all-zero-bit values, so that these bytes can be omitted from the code transmission. There are several full-length R-S codes of prescribed length for each value of n, and they have differing numbers of parity bytes. Appendix 7D to chapter 11 of the book "Error Correcting Coding Theory" written by Man Young Rhee and copyrighted in 1989 by McGraw-Hill Publishing Company contains tables of generator polynomials useful in generating BCH codes. These tables indicate the number of byte errors that can be both located and corrected in BCH codes, which provide a basis for generating R-S codes. The shortening of some of these R-S codes can be done so as to reduce the number of parity bytes required, thereby to generate an "expurgated" R-S code. Presuming that (N+Q) equals 312, so the super group spans a data field, any of various R-S FEC codes with an original length of 511 bytes can be shortened for use in the transverse (M, N) Reed-Solomon FEC encoder 7. The Q data segments will be more completely packed by the parity bytes of some of these shortened 511-byte R-S FEC codes than by others of them. If there are 207 transverse R-S FEC codes with P parity bytes apiece, there is a total of 207P parity bytes to be packed into the Q data segments. Every 207 parity bytes fill up close to 9/8 of the 184-byte payload capacity of a single data segment. If P is a multiple of 8, the 207P parity bytes almost completely pack Q data segments, providing that Q is a multiple of 9. This best preserves coding efficiency.

FIG. 1 shows a convolutional interleaver 9 connected for receiving data segments read seriatim from the RAM 6 and for supplying convolutionally interleaved data segments to a 12-phase trellis coder 10. In actual practice a portion of the convolutional interleaving can be implemented by reading bytes from the RAM 6 in correct order, the convolutional interleaver 9 essentially consisting of a read address generator. The pattern of convolutional interleaving conforms to the prescription of A/53, Annex D, Section 4.2.4 titled "Interleaving". The 12-phase trellis coder 10 is constructed in accordance with A/53, Annex D, Section 4.2.5 titled "Trellis coding". The trellis coding results from the trellis coder 10 are supplied as input addressing to read-only memory 11 that functions as a symbol mapper supplying 3-bit, 8-level symbols to a first-in/first-out buffer memory 12. The FIFO buffer memory 12 is operated to provide rate buffering and to open up intervals between 828-symbol groups in the symbol stream supplied to a symbol-code assembler 13, into which intervals the symbol-code assembler 13 inserts synchronizing signal symbols. Each of the successive data fields begins with a respective interval into which the symbol-code assembler 13 inserts symbol code descriptive of a data-segment-synchronization (DSS) sequence followed by symbol code descriptive of an initial data segment including an appropriate data-field-synchronization (DFS) sequence. Each data segment in the respective remainder of each data field is followed by a respective interval into which the symbol-code assembler 13 inserts symbol code descriptive of a respective DSS sequence. Apparatus 14 for inserting the offset to cause pilot is connected to receive assembled data fields from the symbol-code assembler 13. The apparatus 14 is simply a clocked digital adder that zero extends the number used as symbol code and adds a constant term thereto to generate a real-only modulating signal in digital form, supplied to a vestigial-sideband amplitude-modulation digital television transmitter 15 of conventional construction.

A question that arises in the designs for transmitters of the type shown in FIG. 1 is where the data segments including the transverse R-S FEC coding are to be positioned in a 312-data-segment data field. Grouping these segments together makes it easier to transmit information concerning their location, supposing such information is transmitted by means other than the PIDs of these data segments. Placing these data segments at the conclusion of the data field provides an opportunity for conserving power consumption in the DTV receiver. If none of the earlier data segments within a data field that contain payload are found to contain transmission error that the (207, 187) lateral R-S FEC decoding procedures leaves uncorrected, then the transverse R-S FEC decoding procedures can be dispensed with for that data field. This avoids the power consumption associated with the transverse R-S FEC decoding procedures during that data field.

Another set of questions that arises in the designs for transmitters of the type shown in FIG. 1 concerns the paths used for transverse R-S FEC coding, the nature of these paths being recognized during the preparation of this specification to be a variable that could affect results. A/53 prescribes convolutional interleaving of transmitted DTV signals. The effects of the convolutional interleaving and de-interleaving on the transverse R-S FEC coding have to be considered. Transverse R-S FEC coding can advantageously employ a form of interleaving known as code interleaving, in which successive bytes in the original data field keep their original positions respective to each other. The effects of burst errors on the transverse R-S FEC codes are dispersed because the code paths are transverse to the lateral order in which the bytes ultimately are successively transmitted.

A method has been devised for discerning one set of suitable transverse code paths through a data field that arrays the segments of data that already have been through lateral R-S FEC coding. This method begins with a consideration of the general form of the data field before convolutional interleaving. The steps of the method are listed in order of their performance, following.

a.) The parity bytes of the lateral R-S FEC coding in the data segments containing the parity bytes of transverse R-S FEC coding are labeled, since the parity bytes of this lateral R-S FEC coding are not involved in the transverse R-S FEC coding.

b.) Convolutional interleaving of the data field is then performed per the A/53 standard to determine the locations within the interleaved data field that are occupied by the bytes previously labeled as being parity bytes of the lateral R-S FEC coding which are not involved in the transverse R-S FEC coding.

c.) Any bytes in the known-length vacancy at the conclusion of the interleaved data field are labeled as particular bytes of that vacancy. The known-length vacancy at the conclusion of the interleaved data field can contain zero bytes or a multiple of 23 bytes.

d.) The bytes in the interleaved data field are raster scanned to implement a byte-counting procedure that skips over bytes previously labeled as being parity bytes of the lateral R-S FEC coding that are not involved in the transverse R-S FEC coding. The byte counting halts when the known-length vacancy at the conclusion of the interleaved data field is reached. The byte counting is done to count the bytes modulo-207, for determining which of the 207 transverse R-S FEC coding paths each byte is a part of, and to count the successive bytes in each of these paths. Each byte is labeled with two numbers that identify the 207 transverse R-S FEC coding paths it is contained in and its successive position in that particular path.

e.) The de-interleaving algorithm used for fields of bytes with convolutional interleaving per the A/53 standard is then applied to the field of labeled bytes to generate a description of the original data field that will generate the field of interleaved bytes that is transmitted. The positions of the bytes in each of the transverse R-S FEC code paths will be indicated by the labeling of the bytes, which is maintained throughout the de-interleaving procedure.

This method generates a set of transverse R-S FEC code paths in which the bytes within each code are successively transmitted at intervals no shorter than the 77.3 microsecond duration of a data segment.

In an alternative type of transverse R-S FEC coding the code paths are transverse to the data segments in the data field before convolutional interleaving. An advantage of this alternative type of transverse R-S FEC coding is that it makes it easier to transverse R-S FEC code the parity bytes of lateral (207, 187) R-S FEC coding of data segments on a selective basis. The parity bytes of lateral (207, 187) R-S FEC coding of data segments can be subjected to transverse R-S FEC coding all the time, or never subjected to transverse R-S FEC coding. Another option is for those parity bytes of lateral (207, 187) R-S FEC coding to be subjected to transverse R-S FEC coding, but the resulting parity bytes of transverse R-S FEC coding to be transmitted only when payload demands are not exceptionally severe.

Proposals have been made to ATSC to modify A/53 to permit symbols of prescribed values to be inserted into the conclusion of each data field. The increased number of known symbols allows the parameters of equalization filtering to be adjusted more rapidly and accurately than can be done relying on just the known symbols in the DFS signal at the beginning of each data field. In June 2001 BroadCom Corporation proposed to the ATSC that the data field synchronizing (DFS) signal of each data field be preceded by an extension 384 symbols long into the preceding data field of a DTV signal as specified by A/53. This extension was designed to preserve trellis coding, with a succession of ninety prescribed-value bytes being preceded by six bytes of transition code. This pre-extension of the DFS signal destroys data in a DTV signal as specified by A/53, and recovery of the destroyed data relies on the (207, 187) lateral R-S FEC decoding procedures. This reduces the capability of the (207, 187) lateral R-S FEC code to correct other errors arising during over-the-air transmission. In accordance with an aspect of the invention, when the DTV signal as specified by A/53 is modified to include transverse Reed-Solomon coding in later segments of the de-interleaved data field, the known-length vacancy at the conclusion of the interleaved data field is designed to accommodate all or most of the 96 bytes of the DFS extension. Accordingly, the capability of the (207, 187) lateral R-S FEC code to correct errors arising during over-the-air transmission is unimpaired or is substantially less impaired.

Provisional U.S. patent applications Ser. No. 60/437,648 and 60/458,547 disclose variants of the FIG. 1 transmitting apparatus. Data randomization is performed on a keyed basis in these variants, subsequent to the time division multiplexing of data packets with packets containing transverse R-S FEC coding. In these variants, when data packets are supplied to the lateral (207, 187) R-S FEC encoder, data randomization is activated or keyed on. However, when packets containing transverse R-S FEC coding are supplied to the lateral (207, 187) R-S FEC encoder, data randomization is de-activated or keyed off. Overall operation is essentially equivalent to that of transmitting apparatus as shown in FIG. 1.

FIG. 2 is a table showing the characteristics of some transverse Reed-Solomon forward-error-correction codes that traverse an entire data field and showing the payload reductions associated with using these codes. The payload available with any of these transverse R-S FEC codes is the 19.28 megabits per second payload available with normal 8VSB transmission times N/312, where N is the number of data segments containing payload in the data field with transverse R-S FEC coding.

The transverse R-S FEC codes tabulated in FIG. 2 are only a few of the ones that are possible. However, a set of a few transverse R-S FEC codes should be settled on as being standard, to avoid the proliferation of types of DTV receiver that will be manufactured. The initial five of the transverse R-S FEC codes listed in the FIG. 2 table are designed to accommodate the DFS extension proposed by BroadCom Corporation. The final six R-S FEC codes listed in the FIG. 2 table are designed to pack the parity bytes of transverse R-S FEC codes into data segments with as small as possible a fraction of a data segment left over.

The (300, 208) transverse R-S FEC code that is the first entry in the FIG. 2 table was generated by shortening a (511, 419) R-S FEC code capable of locating and correcting 46 erroneous bytes. The transverse R-S FEC coding is the equivalent of 92 data segments and so consists of 92 times 207 bytes. These 19,044 bytes are supplied to the data assembler 8 for arraying the transverse R-S FEC coding in 187-byte data segments each with its own 3-byte header, but without its own 20-byte lateral R-S FEC code. Since three bytes must be given over to header, only 184 bytes of transverse R-S FEC coding can be written into each 187-byte data segment. This means that 19,044 bytes of transverse R-S FEC coding can be contained in 104 A/53-compliant data segments, as determined by rounding up to the next whole number greater than 19,044/184=103.5. Subtracting the 104 data segments containing transverse R-S FEC coding from the 312 available in a data field leaves 208 data segments for broadcast program information. Adding the equivalent of 92 data segments for transverse R-S FEC coding to these 208 data segments for broadcast program information establishes the path length of the transverse R-S FEC coding to be 300 bytes. The shortened (511, 419) R-S FEC code used in the transverse R-S FEC coding is accordingly the (300, 208) R-S FEC code.

The (296, 172) transverse R-S FEC code that is the second entry in the FIG. 2 table was generated by shortening a (511, 387) R-S FEC code capable of locating and correcting 62 erroneous bytes. The transverse R-S FEC coding is the equivalent of 124 data segments and so consists of 124 times 207 bytes. These 25,668 bytes are supplied to the data assembler 8 for arraying the transverse R-S FEC coding in 187-byte data segments each with its own 3-byte header, but without its own 20-byte lateral R-S FEC code. Since three bytes must be given over to header, only 184 bytes of transverse R-S FEC coding can be written into each 187-byte data segment. This means that 25,668 bytes of transverse R-S FEC coding can be contained in 140 A/53-compliant data segments, as determined by rounding up to the next whole number greater than 25,668/184=139.5. Subtracting these 140 ATSC-compliant data segments from the 312 available in a data field leaves 172 data segments for broadcast program information. Adding the equivalent of 124 data segments for transverse R-S FEC coding to these 172 data segments for broadcast program information establishes the path length of the transverse R-S FEC coding to be 296 bytes. The shortened (511, 387) R-S FEC code used in the transverse R-S FEC coding is accordingly a (296, 172) R-S FEC code with a code rate that is somewhat more than one half of that of an HDTV signal conforming to the A/53 standard. This robust DTV signal can transmit three standard-definition television (SDTV) signals concurrently, for example.

The (290, 120) transverse R-S FEC code that is the third entry in the FIG. 2 table was generated by shortening a (511, 341) R-S FEC code capable of locating and correcting 85 erroneous bytes. The transverse R-S FEC coding is the equivalent of 170 data segments and so consists of 170 times 207 bytes. These 35,190 bytes are supplied to the data assembler 8 for arraying the transverse R-S FEC coding in 187-byte data segments each with its own 3-byte header, but without its own 20-byte lateral R-S FEC code. Since three bytes must be given over to header, only 184 bytes of transverse R-S FEC coding can be written into each 187-byte data segment. This means that 35,190 bytes of transverse R-S FEC coding can be contained in 192 A/53-compliant data segments, as determined by rounding up to the next whole number greater than 35,190/184=191.25. Subtracting these 192 ATSC-compliant data segments from the 312 available in a data field leaves 120 data segments for broadcast program information. Adding the equivalent of 170 data segments for transverse R-S FEC coding to these 120 data segments for broadcast program information establishes the path length of the transverse R-S FEC coding to be 290 bytes. The shortened (511, 385) R-S FEC code used in the transverse R-S FEC coding is accordingly a (290, 120) R-S FEC code with a code rate that is somewhat more than one third of that of an HDTV signal conforming to the A/53 standard. This would more than support concurrent robust transmissions of two SDTV channels, for example.

The (284, 102) transverse R-S FEC code that is the fourth entry in the FIG. 2 table was generated by shortening a (511, 325) R-S FEC code capable of locating and correcting 93 erroneous bytes. The transverse R-S FEC coding is the equivalent of 182 data segments and so consists of 186 times 207 bytes. These 38,502 bytes are supplied to the data assembler 8 for arraying the transverse R-S FEC coding in 187-byte data segments each with its own 3-byte header, but without its own 20-byte lateral R-S FEC code. Since three bytes must be given over to header, only 184 bytes of transverse R-S FEC coding can be written into each 187-byte data segment. This means that 38,502 bytes of transverse R-S FEC coding can be contained in 210 A/53-compliant data segments, as determined by rounding up to the next whole number greater than 38,502/184=209.25. Subtracting these 210 ATSC-compliant data segments from the 312 available in a data field leaves 102 data segments for broadcast program information. Adding the equivalent of 182 data segments for transverse R-S FEC coding to these 102 data segments for broadcast program information establishes the path length of the transverse R-S FEC coding to be 284 bytes. The shortened (511, 325) R-S FEC code used in the transverse R-S FEC coding is accordingly a (284, 102) R-S FEC code with a code rate that is slightly less than one third of that of an HDTV signal conforming to the A/53 standard. This would just support concurrent robust transmissions of two SDTV channels, for example.

The (284, 66) transverse R-S FEC code that is the fifth entry in the FIG. 2 table was generated by shortening a (511, 293) R-S FEC code capable of locating and correcting 109 erroneous bytes. The transverse R-S FEC coding is the equivalent of 218 data segments and so consists of 218 times 207 bytes. These 45,126 bytes are supplied to the data assembler 8 for arraying the transverse R-S FEC coding in 187-byte data segments each with its own 3-byte header, but without its own 20-byte lateral R-S FEC code. Since three bytes must be given over to header, only 184 bytes of transverse R-S FEC coding can be written into each 187-byte data segment. This means that 45,126 bytes of transverse R-S FEC coding can be contained in 246 A/53- compliant data segments, as determined by rounding up to the next whole number greater than 45,126/184=245.25. Subtracting these 246 ATSC-compliant data segments from the 312 available in a data field leaves 66 data segments for broadcast program information. Adding the equivalent of 218 data segments for transverse R-S FEC coding to these 66 data segments for broadcast program information establishes the path length of the transverse R-S FEC coding to be 284 bytes. The shortened (511, 293) R-S FEC code used in the transverse R-S FEC coding is accordingly a (284, 66) R-S FEC code with a code rate that is somewhat more than one fifth of that of an HDTV signal conforming to the A/53 standard. This would support robust transmission of one SDTV channel plus some incidental information, for example.

The (300, 208) transverse R-S FEC code that is the seventh entry in the FIG. 2 table was generated by shortening a (511, 417) R-S FEC code capable of locating and correcting 62 erroneous bytes. Code rate is 66.67% of the maximum HDTV code rate of 19.28 Mbps, and HDTV transmissions could still be supported if there was not a large amount of rapid motion of individual portions of the image field.

The (296, 172) transverse R-S FEC code that is the eighth entry in the FIG. 2 table was generated by shortening a (511, 387) R-S FEC code capable of locating and correcting 62 erroneous bytes. Code rate is 55.13% of the maximum HDTV code rate of 19.28 Mbps, and up to three SDTV transmissions could be supported.

The (290, 120) transverse R-S FEC code that is the ninth entry in the FIG. 2 table was generated by shortening a (511, 341) R-S FEC code capable of locating and correcting 85 erroneous bytes. Code rate is 38.46% of the maximum HDTV code rate of 19.28 Mbps, and two SDTV transmissions could be supported without having to be very careful.

The (284, 102) transverse R-S FEC code that is the tenth, penultimate entry in the FIG. 2 table was generated by shortening a (511, 325) R-S FEC code capable of locating and correcting 93 erroneous bytes. Code rate is 32.69% of the maximum HDTV code rate of 19.28 Mbps, and two SDTV transmissions could still be supported with care.

The (284, 66) transverse R-S FEC code that is the eleventh and final entry in the FIG. 2 table was generated by shortening a (511, 293) R-S FEC code capable of locating and correcting 109 erroneous bytes. Code rate is 21.15% of the maximum HDTV code rate of 19.28 Mbps, and a single SDTV transmission could be supported.

A question that arises in the design of a transmitter per FIG. 1 is where the data segments including the transverse R-S FEC coding are to be positioned in the 312 data-segment data field. The preferred placement is at the end of the data field in each case. One reason for this is that this placement provides an opportunity for conserving power consumption in the DTV receiver. If none of the earlier data segments within a data field that contain payload are found to contain transmission error that the (207, 187) lateral R-S FEC decoding procedures leaves uncorrected, then the transverse R-S FEC decoding procedures can be dispensed with for that data field. This avoids the power consumption associated with the transverse R-S FEC decoding procedures during that data field that contains no uncorrected transmission error after trellis decoding and the (207, 187) lateral R-S FEC decoding procedures.

There is another reason for preferring that the data segments including the transverse R-S FEC coding are placed at the conclusion of the 312 data-segment data field. With such placement, the fraction of a data segment that is additional to that required for the transverse R-S FEC coding can be filled with data dispersed to intervals that correspond to the conclusion of the interleaved data field supplied from the convolutional interleaver 9. This accommodates the interleaved data field concluding, for example, with a pre-extension of the DFS signal contained in the next data field. If such pre-extension is used, the initial five transverse R-S FEC codes listed in the FIG. 2 table are preferred over other transverse R-S FEC codes that fit within a data field. This is because the fraction of a data segment that is additional to that required for the transverse R-S FEC coding is at least 92 bytes long. The fraction of a data segment that is additional to that required for the transverse R-S FEC coding is 368 symbols long for the (300, 208) and (296, 172) transverse R-S FEC codes. The fraction of a data segment that is additional to that required for the transverse R-S FEC coding is 552 symbols long for the (290, 120), (284, 102) and (284, 66) transverse R-S FEC codes.

Transmitters of the type shown in FIG. 1 preferably use transverse R-S FEC coding with cycles that match the 312-segment data field. Covering the entire 312 segments of data field in the transverse R-S FEC coding permits correction of very long burst errors. However, temporary storage for two data fields or so is necessary in the DTV receiver for acquiring the data field to be subjected to transverse R-S FEC decoding and supporting the transverse R-S FEC decoding while the next data field to be subjected to transverse R-S FEC decoding is acquired. Alternative transmitters constructed in accordance with the invention use transverse R-S FEC coding with cycles that match half the 312-segment data field. That is, (N+Q) equals 156. This reduces the temporary storage requirements in the DTV receiver associated with transverse R-S FEC decoding. Shortened 255-byte R-S FEC coding can be used as well as shortened 511-byte R-S FEC coding with cycles that match a group of (N+Q) data segments that extend over only half of a 312-segment data field.

FIG. 3 tabulates some transverse R-S FEC codes with cycles that match half the 312-segment data field that can be used in alternative species of DTV transmitters of the general type shown in FIG. 1. These shorter transverse R-S FEC codes reduce the temporary storage requirements in the DTV receiver associated with transverse R-S FEC decoding. Shortened 255-byte R-S FEC coding can be used as well as shortened 511-byte R-S FEC coding with cycles that match half the 312-segment data field. The payload available with any of these transverse R-S FEC codes is the 19.28 megabits per second payload available with normal 8VSB transmission times N/156, where N is the number of data segments containing payload in the data field with transverse R-S FEC coding.

The six transverse R-S FEC codes that the FIG. 3 table initially lists are designed to accommodate the DFS extension proposed by BroadCom Corporation. A (255, 209) R-S FEC code capable of locating and correcting 21 erroneous bytes can be shortened to generate a (150, 108) R-S FEC code. Code rate is a little less than 69.2% of the HDTV code rate of 19.28 Mbps, which will support the transmission of an EDTV signal or the concurrent transmission of four SDTV signals. Each half data field ends with only 48 A/53-compliant data segments, so a shortened 511-byte R-S FEC code probably is preferable to use. A (511, 461) R-S FEC code capable of locating and correcting 25 erroneous bytes shortened to a (149, 99) transverse R-S FEC code accommodates pre-extension of DFS signals into the conclusions of data fields and provides 63.5% of the 19.28 Mbps code rate of HDTV. Accommodating pre-extension of DFS signals into the conclusions of data fields is easier as code rate is further reduced.

A (255, 195) R-S FEC code capable of locating and correcting 30 erroneous bytes can be shortened to generate a (148, 88) transverse R-S FEC code. Code rate is 56.4% of the HDTV code rate of 19.28 Mbps, so the concurrent transmission of three SDTV programs is supported. Each half data field ends with 68 ATSC-compliant data segments, which accommodates the pre-extension of DFS signals into the conclusions of data fields.

A (255, 165) R-S FEC code capable of locating and correcting 45 erroneous bytes can be shortened to generate a (144, 54) transverse R-S FEC code. The 108 payload data packets in each data field will support the concurrent transmission of two SDTV signals. Each half data field ends with 102 ATSC-compliant data segments, which accommodates the pre-extension of DFS signals into the conclusions of data fields.

There is no 255-byte transverse R-S FEC code based directly on BCH code, which transverse R-S FEC code is capable of locating and correcting more than 45 errors that readily accommodates pre-extension of DFS signals into the conclusions of data fields. So, if such pre-extensions are to be used, a much-shortened 511-byte R-S FEC code probably is preferable to use for more robust transmission of a single SDTV channel. A (511, 403) R-S FEC code capable of locating and correcting 54 erroneous bytes can be shortened to generate a (142, 34) transverse R-S FEC code that provides 21.8% of the 19.28 Mbps code rate of HDTV. A (511, 395) R-S FEC code capable of locating and correcting 58 erroneous bytes can be shortened to generate a (141, 25) R-S FEC code that provides 16.0% of the 19.28 Mbps code rate of HDTV.

The seventh and eighth transverse R-S FEC codes listed in the FIG. 3 table are designed to pack the parity bytes for transverse Reed-Solomon coding into data segments as tightly as possible. A (255, 247) R-S FEC code capable of locating and correcting 4 erroneous bytes can be shortened to generate a (155, 147) R-S FEC code. Code rate is 94.2% of the HDTV code rate of 19.28 Mbps. The 5.8% overhead cost of this transverse Reed-Solomon code is less than the 9.7% overhead cost of the (207, 187) lateral Reed-Solomon code.

A (255, 239) R-S FEC code capable of locating and correcting 8 erroneous bytes can be shortened to generate a (154, 138) R-S FEC code. Code rate is a little less than 88.5% of the HDTV code rate of 19.28 Mbps. The 11.5% overhead cost of this transverse Reed-Solomon code is somewhat more than the 9.7% overhead cost of the (207, 187) lateral Reed-Solomon code.

The ninth transverse R-S FEC code listed in the FIG. 3 table is designed to pack the parity bytes for transverse Reed-Solomon coding more tightly into data segments than the first-listed transverse R-S FEC code. A (255, 209) R-S FEC code capable of locating and correcting 23 erroneous bytes can be shortened to generate a (150, 104) R-S FEC code. Code rate is two-thirds the HDTV code rate of 19.28 Mbps, which will support the transmission of an EDTV signal or the concurrent transmission of four SDTV signals.

The tenth transverse R-S FEC code listed in the FIG. 3 table is designed to pack the parity bytes for transverse Reed-Solomon coding more tightly into data segments than the third-listed transverse R-S FEC code. A (255, 193) R-S FEC code capable of locating and correcting 31 erroneous bytes can be shortened to generate a (147, 85) R-S FEC code. Code rate is 54.5% of the HDTV code rate of 19.28 Mbps, which will support the concurrent transmission of three SDTV signals.

The eleventh transverse R-S FEC code listed in the FIG. 3 table is designed to pack the parity bytes for transverse Reed-Solomon coding more tightly into data segments than the fourth-listed transverse R-S FEC code. A (255, 163) R-S FEC code capable of locating and correcting 46 erroneous bytes can be shortened to generate a (144, 50) R-S FEC code. Code rate is 32.1% of the HDTV code rate of 19.28 Mbps, which will support the concurrent transmission of two SDTV signals.

Figure 4:
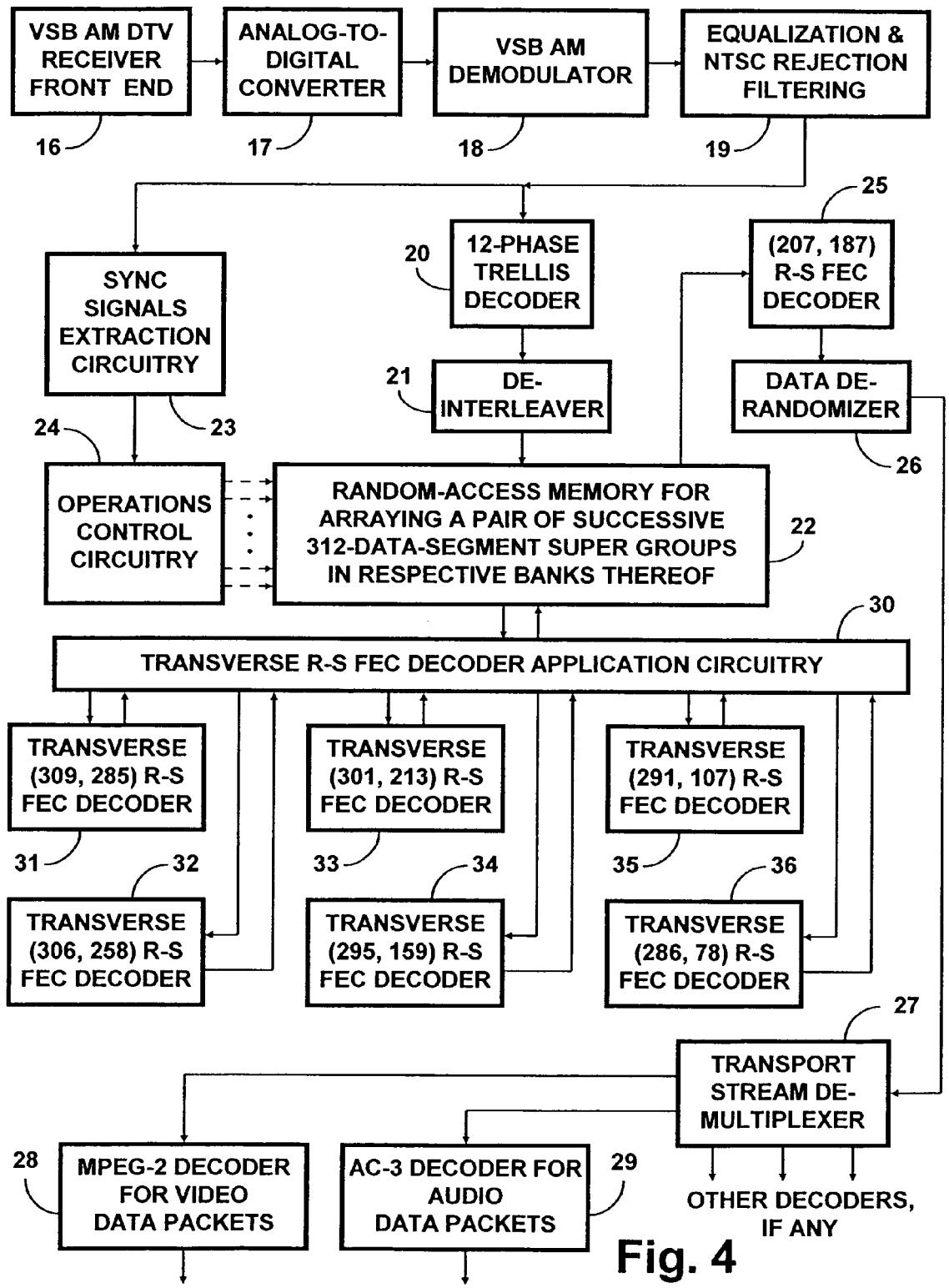
FIG. 4 is a schematic diagram of a DTV receiver for receiving robust DTV signals which employ transverse Reed-Solomon forward-error-correction codes that traverse full data fields, which DTV receiver is constructed in accordance with an aspect of the invention.

FIG. 4 shows the general construction of a DTV receiver for robust DTV signals employing transverse R-S FEC codes that traverse full data fields. Specific types of the FIG. 1 transmitter can transmit such signals. The FIG. 4 DTV receiver includes a vestigial-sideband amplitude-modulation (VSB AM) DTV receiver front-end 16 for selecting a radio-frequency DTV signal for reception, converting the selected RF DTV signal to an intermediate-frequency DTV signal, and for amplifying the IF DTV signal. The FIG. 4 DTV receiver further includes an analog-to-digital converter 17 for digitizing the amplified IF DTV signal supplied from the DTV receiver front-end 16. The FIG. 4 DTV receiver further includes a demodulator 18 for demodulating the digitized VSB AM IF DTV signal to generate a digitized baseband DTV signal supplied to digital filtering 19 for equalization of channel response and for rejection of co-channel interfering NTSC signal. A 12-phase trellis decoder 20 is connected to receive the digital filtering 19 response and to supply bytes of data to a de-interleaver 21 that complements the convolutional interleaver 9 in the FIG. 1 DTV transmitter. The portion of the FIG. 4 DTV receiver comprising the elements 16–21 is substantially equivalent to the corresponding portions of DTV receivers known in the art.

The trellis decoder 20 is of Viterbi type and can be designed to supply an extension to each byte it supplies, which extension comprises one or more additional bits indicative of the confidence level that the byte is correct. The de-interleaver 21 supplies de-interleaved data bytes, plus any extensions to them, for writing to a banked random-access memory 22 used in transverse Reed-Solomon forward-error-correction decoding. Each addressed location in the RAM 22 can temporarily store a byte supplied from the de-interleaver 21, plus any extension or extensions of that byte. The RAM 22 has two banks operated so that, while bytes of a newly received data field are being written to one bank of the memory, the previous data field that was written to the other bank of memory can be corrected for byte errors.

The FIG. 4 DTV receiver includes synchronization signal extraction circuitry 23 for extracting data field synchronizing signals and data segment synchronizing signals from the digital filtering 19 response and supplying those signals to operations control circuitry 24. The operations control circuitry 24 controls the writing to and reading from the banked RAM 22. The operations control circuitry 24 supplies the addressing for writing and reading operations. The operations control circuitry 24 includes counter circuitry for counting at twice the rate bytes are supplied from the de-interleaver 21, the count from which counter circuitry is synchronized with the received data fields and data segments using the synchronizing signals extracted by the synchronization signal extraction circuitry 23. The count from this counter provides read addressing to a pair of read-only memories. These ROMs respectively generate the addressing supplied to each bank of the RAM 22. Storage locations in one of the RAM 22 banks are addressed by row and by column for being read and then overwritten with data bytes supplied from the de-interleaver 21. The storage locations in the other of the RAM 22 banks are transversely addressed for reading to a transverse Reed-Solomon forward-error-correction decoder and being written back to with byte errors corrected.

That is, the RAM 22 has two banks operated so that, while bytes of a newly received data field are being written to one bank of the RAM 22, the previous data field that was written to the other bank of the RAM 22 can be corrected for byte errors. Writing each successive byte of a newly received data field to an addressed storage location in one bank of the RAM 22 is preceded by reading from that storage location a byte from two data fields previous. These bytes from two data fields previous have been corrected by transverse R-S FEC decoding procedures and are read to a (207, 187) Reed-Solomon forward-error-correction decoder 25.

The (207, 187) R-S FEC decoder 25 performs lateral Reed-Solomon forward-error-correction. The R-S FEC decoder 25 toggles the Transport Error Indicator (TEI) bit in each data packet in which it finds byte errors that still cannot be corrected. The (207, 187) R-S FEC decoder 25 then supplies the portions of the data segment other than its twenty R-S FEC code parity bytes to a data de-randomizer 26 as a 187-byte data packet. The data de-randomizer 26 is connected for supplying de-randomized data to a transport stream de-multiplexer 27. The transport stream de-multiplexer 27 responds to the PIDs in the data packets for sorting them to appropriate packet decoders. For example, video data packets are sorted to an MPEG-2 decoder 28. The MPEG-2 decoder 28 responds to the TEI bit in a data packet indicating that it still contains byte errors by not using the packet and instituting measures to mask the effects of the packet not being used. By way of further example, audio data packets are sorted to an AC-3 decoder 29. The portion of the FIG. 4 DTV receiver comprising the elements 25–29 as thusfar described is substantially equivalent to the corresponding portions of DTV receivers known in the art.

A major difference of the FIG. 4 DTV receiver from prior-art DTV receivers is the transverse R-S FEC decoding that is performed with the aid of the banked RAM 22. In a variation of the FIG. 4 DTV receiver, the separate de-interleaver 21 is dispensed with and the RAM 22 is written directly from the trellis decoder 20. The write addressing for the bank of the RAM 22 being written to from the trellis decoder 20 is such as to provide for the convolutional de-interleaving in this variation of the FIG. 4 DTV receiver.

Figure 6:
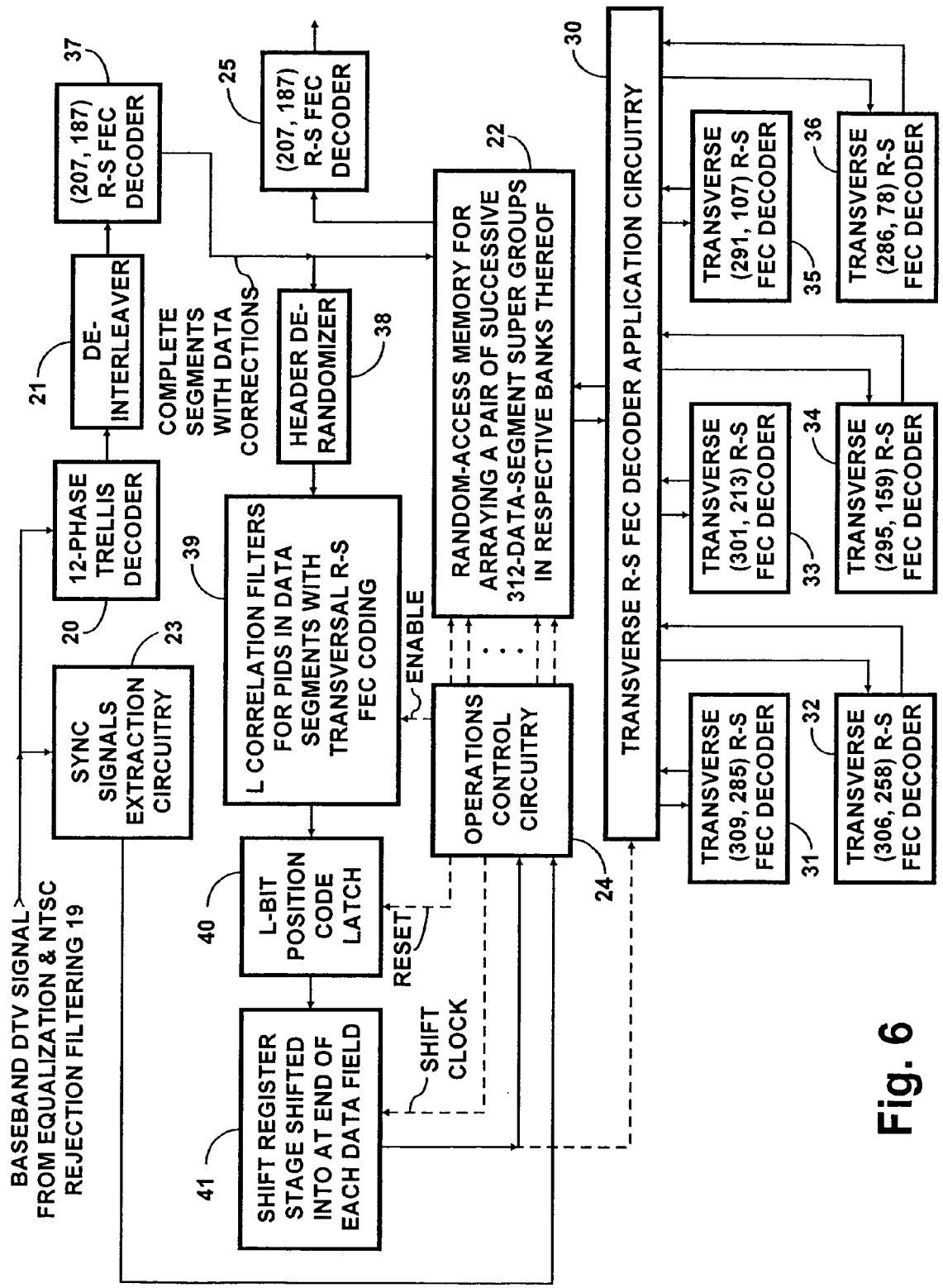
FIG. 6 is a schematic diagram of a detail of the construction of the FIG. 4 DTV receiver as modified per FIG. 5.

Further on, with reference to FIG. 6 of the drawing, this specification describes in detail ways that an indication indicating the particular type of transverse R-S FEC coding used in a data field can be generated. After the data field has been received in its entirety, this indication is used to condition transverse R-S FEC code application circuitry 30 for selecting the correct one of the transverse Reed-Solomon forward-error-correction decoders 31–36 to perform transverse R-S FEC decoding. The transverse R-S FEC decoding is performed on each of the successively scanned transverse code paths that extend through the data field. If the PID indicating that the received signal employs (309, 285) transverse R-S FEC coding is detected, the transverse R-S FEC decoder application circuitry 30 selects the transverse R-S FEC decoder 31 for correcting byte errors in each of the transverse code paths. If the PID indicating that the received signal employs (306, 258) transverse R-S FEC coding is detected, the transverse R-S FEC decoder application circuitry 30 selects the transverse R-S FEC decoder 32 for correcting byte errors in each of the transverse code paths. If the PID indicating that the received signal employs (301, 213) transverse R-S FEC coding is detected, the transverse R-S FEC decoder application circuitry 30 selects the transverse R-S FEC decoder 33 for correcting byte errors in each of the transverse code paths. If the PID indicating that the received signal employs (295, 159) transverse R-S FEC coding is detected, the transverse R-S FEC decoder application circuitry 30 selects the transverse R-S FEC decoder 34 for correcting byte errors in each of the transverse code paths. If the PID indicating that the received signal employs (291, 107) transverse R-S FEC coding is detected, the transverse R-S FEC decoder application circuitry 30 selects the transverse R-S FEC decoder 35 for correcting byte errors in each of the transverse code paths. If the PID indicating that the received signal employs (286, 78) transverse R-S FEC coding is detected, the transverse R-S FEC decoder application circuitry 30 selects the transverse R-S FEC decoder 36 for correcting byte errors in each of the transverse code paths.

As previously noted, the bytes stored at each addressed location in the banked RAM 22 can be accompanied by extensions, each of which comprises one or more additional bits indicative of the confidence level that the accompanying byte is correct. The information can be used for locating byte errors for the one of the transverse R-S FEC decoders 31–36 that is used. If the R-S FEC decoders 31–36 do not have to locate as well as correct byte errors, their operation can be designed to correct twice as many byte errors as is possible if their operation must locate byte errors before they can be corrected. Such procedures are known in the digital magnetic recording art. Background information concerning this can be found in U.S. Pat. No. 5,530,708 titled "Error detection method using convolutional code and Viterbi decoding", which issued 25 Jun. 1996 to K. Miya. Additional background information concerning such procedures can be found in U.S. Pat. No. 5,875,199 titled "Video device with Reed-Solomon erasure decoder and method thereof" which issued 23 Feb. 1999 to D. A. Luthi.

If the one of the transverse R-S FEC decoders 31–36 that is used is able to correct all erroneous bytes in a transverse path, the confidence level information in the bit extensions to the bytes stored at addressed storage locations in the banked RAM 22 is updated accordingly. The confidence level information in the bit extensions to the bytes stored at addressed storage locations in the banked RAM 22 can then be used by the lateral (207, 187) R-S FEC decoder 25 for locating erroneous bytes in each data segment. If the R-S FEC decoder 25 does not have to locate as well as correct byte errors, its operation can be designed to correct twice as many byte errors as is possible if its operation must locate byte errors before they can be corrected. If the R-S FEC decoder 25 is able to correct all erroneous bytes in a data segment, the byte-error information in the extensions of the bytes in the data segment can be updated accordingly. Then, the updated byte-error information can be conveyed along with the randomized data that the R-S FEC decoder 25 supplies to the data de-randomizer 26. The byte-error information can be further conveyed along with the de-randomized data that the data de-randomizer 26 supplies to the transport stream de-multiplexer 27 and passed on by the transport stream de-multiplexer 27 to the decoders that follow. For example, the location of erroneous bytes in an audio data packet can be useful to the AC-3 decoder 29 in determining whether any information can be salvaged from the data packet.

Figure 5:
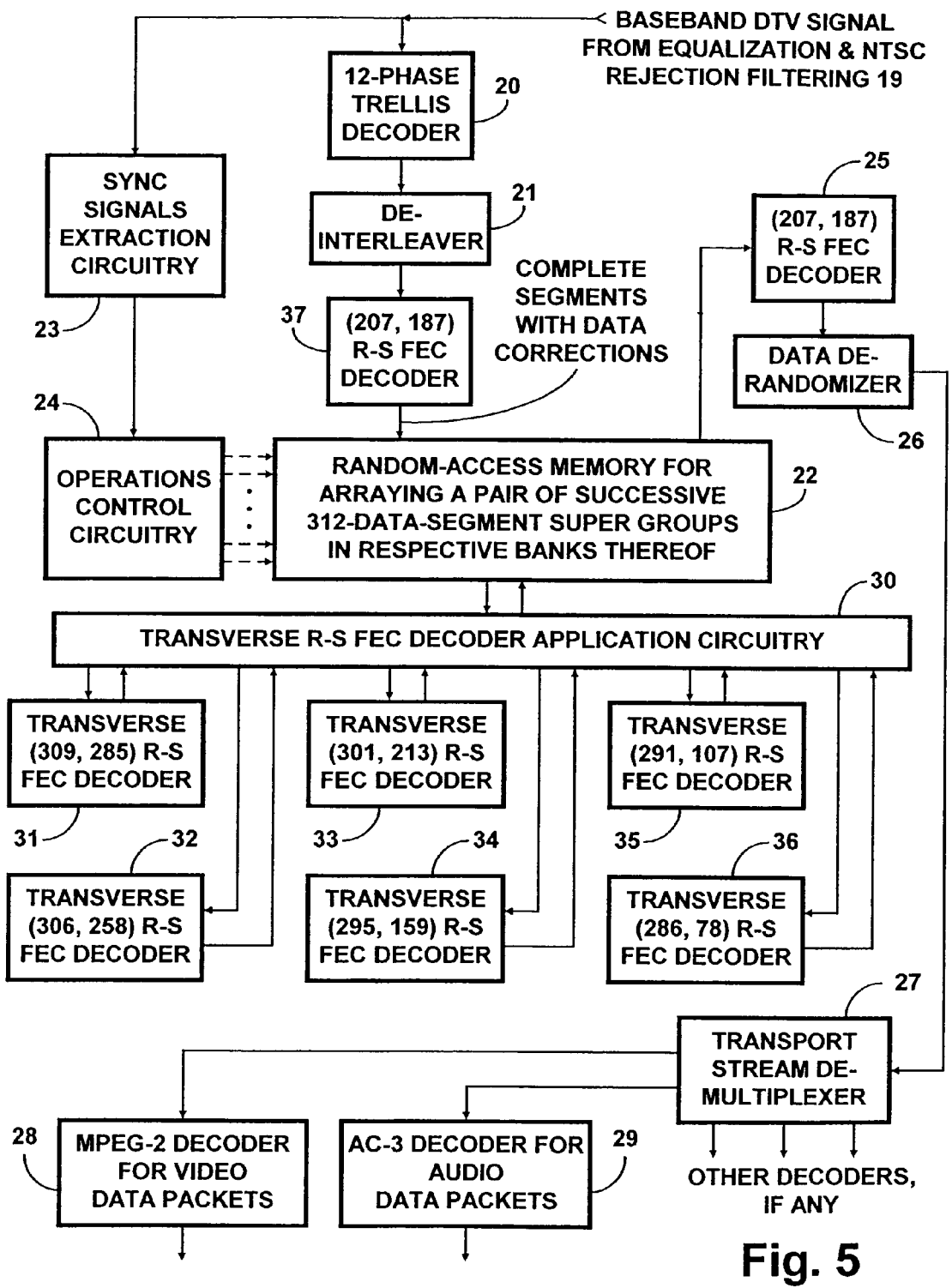
FIG. 5 is a schematic diagram of a modification of the FIG. 4 DTV receiver made to exploit more fully the benefits of two-dimensional Reed-Solomon forward-error-correction coding in accordance with a further aspect of the invention.

FIG. 5 shows a modification of the FIG. 4 DTV receiver which modification permits the benefits of two-dimensional R-S FEC coding to be exploited more fully. A lateral (207, 187) R-S FEC decoder 37 follows the de-interleaver 21 and provides preliminary correction of byte errors in the data segments written a byte at a time into the banked RAM 22. The parity bytes of the lateral (207, 187) R-S FEC coding are written into the banked RAM 22, as well as the bytes in the data packets themselves. Extensions appended to the bytes during the Viterbi decoding procedures by the trellis decoder 20 can be utilized for locating byte errors for the initial lateral (207, 187) R-S FEC decoder 37 in order to increase its byte error correction capability. If the R-S FEC decoder 37 is able to correct all erroneous bytes in a data segment, the bit extensions to the bytes in the data segment can be updated accordingly before those bytes are written into the RAM 22. To the extent that the lateral R-S FEC decoder 37 is able to correct data segments, the byte error correction capability of the subsequent transverse R-S FEC decoding is less apt to be taxed too much. Correction of more byte errors during subsequent transverse R-S FEC decoding increases the likelihood of any remaining byte errors being corrected during the subsequent lateral R-S FEC decoding by the lateral (207, 187) R-S FEC decoder 25. If the transverse R-S FEC decoding is able to correct all erroneous bytes in a transverse path, the extensions to the bytes in the transverse path can be updated accordingly, to provide better error location information to the final initial lateral (207, 187) R-S FEC decoder 25. One skilled in the art of digital circuit design will perceive that duplexing arrangements are readily designed so that a single lateral (207, 187) R-S FEC decoder performs the lateral R-S FEC decoding performed by the decoders 25 and 37 in the DTV receivers of FIGS. 5 and 6.

FIG. 6 shows in greater detail the circuitry that the FIG. 5 DTV receiver uses to determine what type of transmitter is broadcasting the DTV signals it is currently receiving. Portions of the de-interleaved data segments supplied from the initial lateral (207, 187) R-S FEC decoder 37 comprising their respective PIDs are de-randomized by a PID de-randomizer 38. The PID de-randomizer 38 can be a standard de-randomizer for de-randomizing each data segment except for the parity bytes of the lateral (207, 187) R-S FEC coding. The standard de-randomizer comprises exclusive-OR-gate circuitry for exclusive-ORing data bits in the data-packet portion of each data segment with the output of a special type of bit counter that is the same as that used for data randomization at the DTV transmitter. This special bit counter is specified in A/53, Annex D, Section 4.2.2 titled "Data-randomizer". If the PID de-randomizer 38 is a standard de-randomizer, it is followed by a gating arrangement for extracting the de-randomized PIDs as input signal to a bank of correlation filters 39. The correlation filters 39 are L in number, one for the PID of each type of transverse R-S FEC coding used for full data fields. The gating arrangement for extracting the de-randomized PIDs to the correlation filters 39 is controlled by the counter within the operations control circuitry 24.

Alternatively, the PID de-randomizer 38 comprises exclusive-OR-gate circuitry for exclusive-ORing data bits in the PID portion of each data segment with the output of a read-only memory supplied read addressing from the counter in the operations control circuitry 24 used for controlling the writing and reading of the RAM 22. In this construction of the PID de-randomizer 38, too, the exclusive-OR-gate circuitry is followed by a gating arrangement for extracting the de-randomized PIDs as input signal for each of the correlation filters 39.

If the later data segments of a data field have PIDs indicating they contain transverse R-S FEC coding of a specific type, one of the correlation filters 39 will provide spike responses to those PIDs. These spike responses have sufficient energy to overcome a threshold below which correlation filter response is suppressed. The correlation filters 39, L in number, are connected for supplying their responses to a bank of respective bit latch circuits within an L-bit position-code latch 40. The L-bit position codeword from the position-code latch 40 contains a ONE from the bit latch for one of the correlation filters 39 that generates spike responses to the PIDs of the data segments that contain the transverse R-S FEC coding of a specific type. The position codeword from the position-code latch 40 contains ZEROes from the bit latches for the other ones of the correlation filters 39 that do not generate spike responses because the PIDs those correlation filters 39 respond to are not present in the current data field. The position-code latch 40 retains the position codeword until the beginning of the next data field, at which time in response to a SHIFT CLOCK signal the position codeword is shifted into a shift register stage 41 for temporary storage throughout the following data field interval. Then, the position-code latch 40 is reset to an all-ZERO codeword condition responsive to a RESET signal. The SHIFT CLOCK and RESET signals are generated by circuitry within the operations control circuitry 24 responsive to the count from the counter circuitry also within the operations control circuitry 24.

The position codeword held in the shift register stage 41 is supplied to the operations control circuitry 24, wherein the L bits of the position codeword are ORed to determine the operations it will perform with regard to the RAM 22. If all L bits in the position codeword held in the shift register stage 41 are ZEROes, this informs the operations control circuitry 24 that a normal DTV transmission has been received. Responsive to this information the operations control circuitry 24 foregoes the scanning of storage locations in the bank of the RAM 22 temporarily storing the last data field received, which scanning would be done to implement transverse R-S FEC decoding. This saves some power consumption in the DTV receiver. If one of the bits in the position codeword held in the shift register stage 41 is a ONE, this informs the operations control circuitry 24 that a robust DTV transmission has been received. Accordingly, the operations control circuitry 24 scans storage locations in the bank of the RAM 22 temporarily storing the last data field received, to implement transverse R-S FEC decoding.

The position codeword held in the shift register stage 41 is supplied to the transverse R-S FEC decoder application circuitry 30 to condition it for selecting the correct one of the transverse Reed-Solomon forward-error-correction decoders 31–36 to perform transverse R-S FEC coding. If a normal DTV transmission was received during the previous data field interval, so the all the bits in the position codeword are ZEROes, the transverse R-S FEC decoder application circuitry 30 does not select any of the transverse R-S FEC decoders 31–36 to perform transverse R-S FEC coding.

The FIG. 4 DTV receiver can employ circuitry to determine what type of transmitter is broadcasting the DTV signals it is currently receiving, which circuitry is similar to that used with the FIG. 5 DTV receiver modified per FIG. 6. Since there is no initial (207, 187) lateral R-S FEC decoder 37 as used in the FIG. 5 modification, the PID de-randomizer 38 is connected to receive data segments directly from the de-interleaver 21. However, it is preferred that the initial (207, 187) lateral R-S FEC decoder 37 be used, so that errors in the portions of the data segments containing randomized PIDs may be corrected exploiting the byte error correction benefits of the (207, 187) lateral R-S FEC coding. Then, the PIDs that the PID de-randomizer 38 supplies will be less likely to contain bit errors. Reduction of bit errors in the PIDs that the PID de-randomizer supplies becomes even more important when PIDs are used for selecting only portions of the received segment stream to the RAM used for temporary storage in support of transverse R-S FEC decoding.

Figure 7:
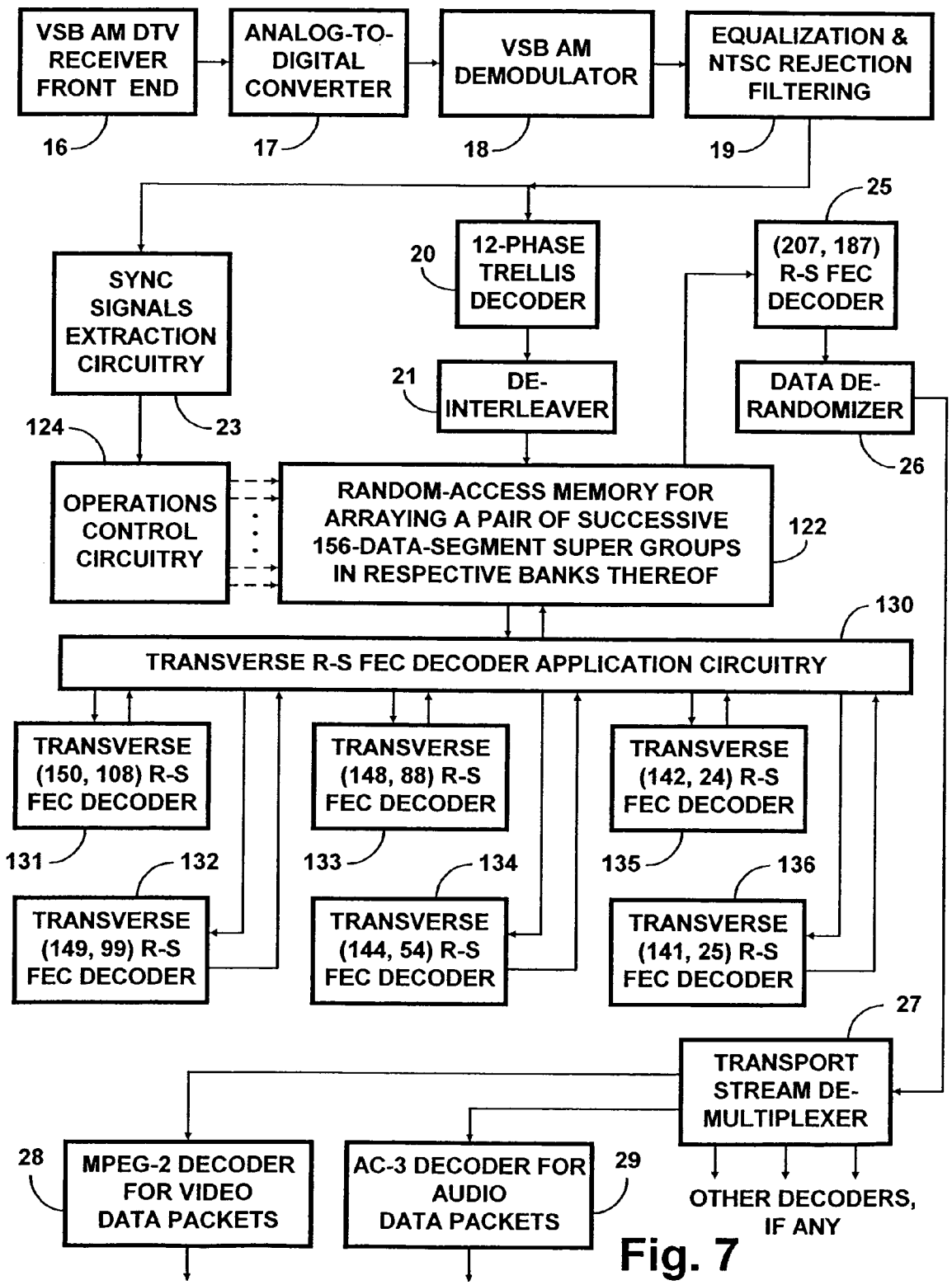
FIG. 7 is a schematic diagram of a DTV receiver for receiving robust DTV signals which employ transverse Reed-Solomon forward-error-correction codes that traverse half data fields, which DTV receiver is constructed in accordance with an aspect of the invention.

FIG. 7 shows the general construction of a DTV receiver for robust DTV signals employing transverse R-S FEC codes that traverse halves of data fields. Such signals can be transmitted by specific types of the FIG. 1 transmitter. The FIG. 7 DTV receiver is generally similar in structure to the FIG. 4 DTV receiver, except for the following differences. In the FIG. 7 DTV receiver, random-access memory 122 with two banks only capable of temporarily storing 156 data segments apiece replaces the random-access memory 22 of the FIG. 4 DTV receiver, which RAM 22 has two banks each capable of temporarily storing 312 data segments. The operations control circuitry 24 used in the FIG. 4 DTV receiver to control writing and reading of the two banks of the RAM 22 each temporarily storing 312 data segments is replaced by operations control circuitry 124 in the FIG. 7 DTV receiver. The operations control circuitry 124 controls writing and reading of the two banks of the RAM 122 each temporarily storing 156 data segments. The transverse R-S FEC decoder application circuitry 30 controlled by the operations control circuitry 24 in the FIG. 4 DTV receiver is replaced in the FIG. 7 DTV receiver by transverse R-S FEC decoder application circuitry 130. The transverse R-S FEC decoders 31, 32, 33, 34, 35 and 36 used in the FIG. 4 DTV receiver for coding across full data fields are replaced in the FIG. 7 DTV receiver by transverse R-S FEC decoders 131, 132, 133, 134, 135 and 136. The transverse R-S FEC decoder application circuitry 130 is controlled by the operations control circuitry 124 for reading from a selected bank of the RAM 122 to a selected one of the transverse R-S FEC decoders 131, 132, 133, 134, 135 and 136. The selected one of the transverse R-S FEC decoders 131, 132, 133, 134, 135 and 136 codes across half fields of data and writes the transversely R-S FEC coded data back to the selected bank of the RAM 122.

Figure 8:
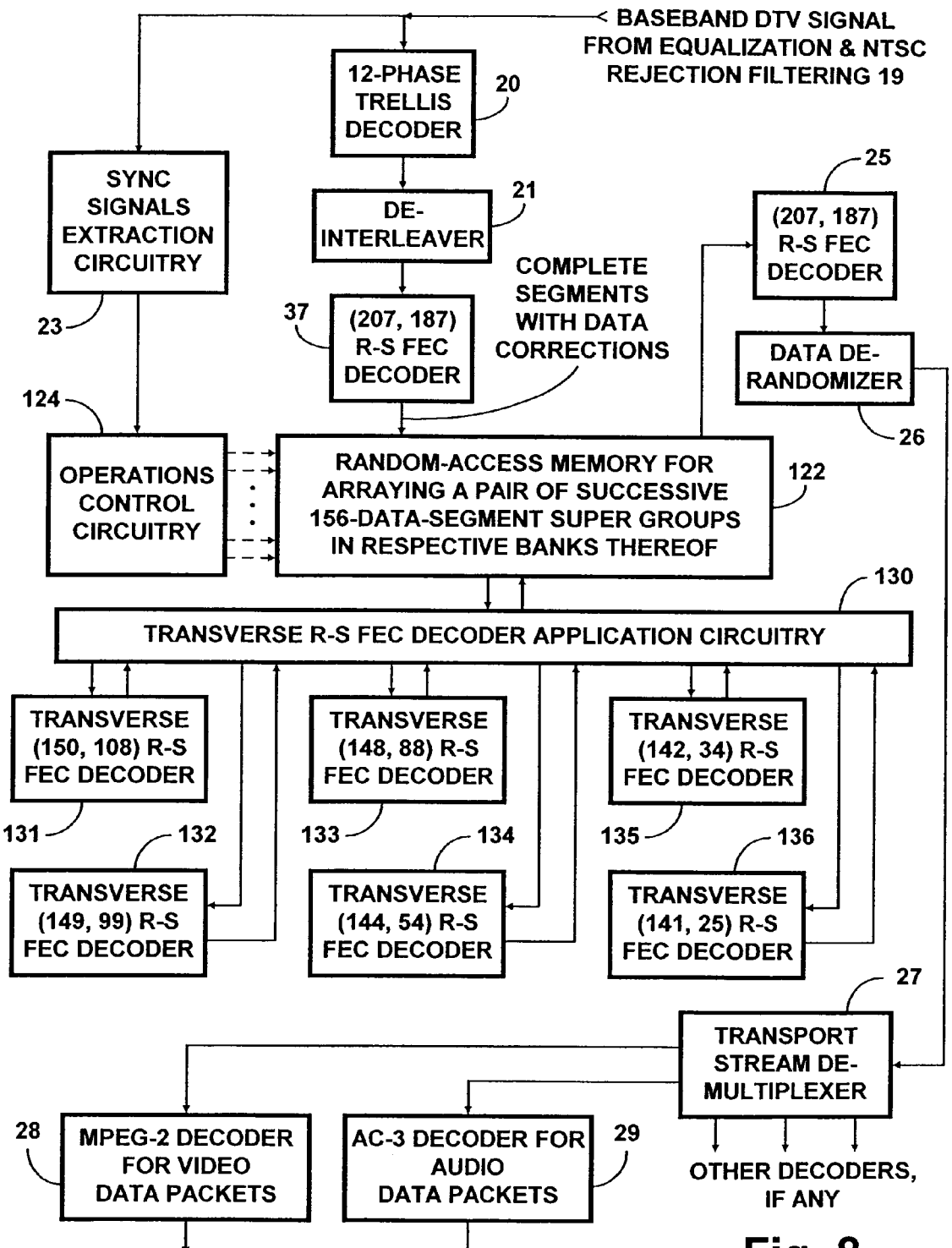
FIG. 8 is a schematic diagram of a modification of the FIG. 7 DTV receiver made to exploit more fully benefits of two-dimensional Reed-Solomon forward-error-correction coding in accordance with a further aspect of the invention.

FIG. 8 shows the general construction of another DTV receiver for robust DTV signals employing transverse R-S FEC codes that traverse halves of data fields. Such signals can be transmitted by specific types of the FIG. 1 DTV transmitter. The FIG. 8 DTV receiver is generally similar in structure to the FIG. 5 DTV receiver, but differs therefrom in the same ways the FIG. 7 DTV receiver differs from the FIG. 4 DTV receiver.

Figure 9:
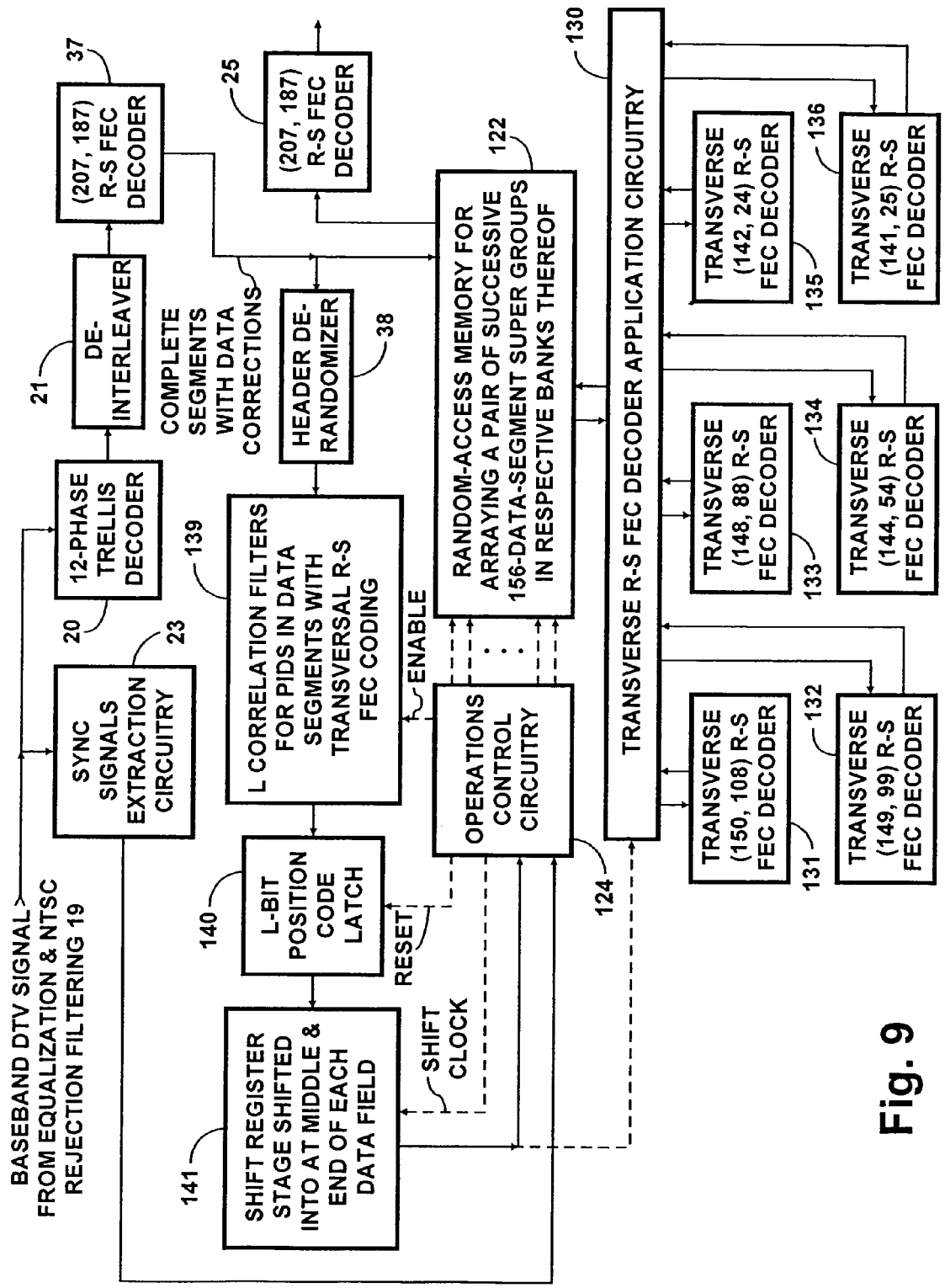
FIG. 9 is a schematic diagram of a detail of the construction of the FIG. 7 DTV receiver as modified per FIG. 8.

FIG. 9 shows in greater detail the circuitry that the FIG. 8 DTV receiver uses to determine what type of transmitter is broadcasting the DTV signals it is currently receiving. The FIG. 9 circuitry is generally similar in structure to the FIG. 6 circuitry, but differs in the following respects. The correlation filters 39 for detecting data segments of various types associated with transverse R-S FEC coding that traverses full data fields are replaced by correlation filters 139 for detecting data segments of various types associated with transverse R-S FEC coding that traverses half data fields. The position code latch 40 that the operations control circuitry 24 resets or clears at the beginning of data fields is replaced by a position code latch 140 that the operations control circuitry 124 resets or clears at the beginning of half data fields. The shift register stage 41, to which the operations control circuitry 24 supplies a shift command at the conclusions of 312-segment data fields, is replaced by a shift register stage 141, to which the operations control circuitry 124 supplies a shift command at the conclusion of 156-segment halves of data fields.

In DTV signals transmitted by transmitting apparatus of the general type shown in FIG. 1, each of the segments of A/53-type "data" fields containing parity bytes of the transverse R-S FEC coding also includes parity bytes for the lateral (207, 187) R-S FEC coding of that segment. The parity bytes for the lateral (207, 187) R-S FEC coding of those segments are useful to the "sandwich" type two-dimensional R-S error correction techniques employed in DTV receivers per FIGS. 5, 6, 8 and 9, in which techniques initial lateral R-S error correction precedes the transverse R-S error correction. This initial lateral R-S error correction is performed by the lateral (207, 187) R-S FEC decoder 37 in DTV receivers per FIGS. 5, 6, 8 and 9. The FIG. 4 and FIG. 7 DTV receivers do not include the lateral (207, 187) R-S FEC decoder 37 for performing initial lateral R-S error correction before transverse R-S error correction. Insofar as the operation of DTV receivers similar to those shown in FIGS. 4 and 7 is concerned, transmitting apparatus of the general type shown in FIG. 1 can be modified to dispense with applying lateral (207, 187) R-S FEC coding to each of the segments of A/53 data fields containing parity bytes of the transverse R-S FEC coding. After transverse R-S error correction is performed, the transport stream de-multiplexer 27 will discard the segments of A/53-type "data" fields containing parity bytes of the transverse R-S FEC coding. The transport stream de-multiplexer 27 discards these segments responsive to the PIDs in their headers, so there is no point in using the lateral (207, 187) R-S FEC decoder 25 to correct erroneous bytes in these segments. The packing of the parity bytes of the transverse R-S FEC coding within these segments of A/53-type "data" fields is affected by dispensing with lateral (207, 187) R-S FEC coding of each of the segments. DTV receivers have to differ slightly from those shown in FIGS. 4 and 7 in order to accommodate the different packing of the parity bytes of the transverse R-S FEC coding within the segments of A/53-type "data" fields.

It is generally preferable, however, that each of the segments of A/53-type "data" fields containing parity bytes of the transverse R-S FEC coding also includes parity bytes for the lateral (207, 187) R-S FEC coding of that segment. Initial decoding of the lateral (207, 187) R-S FEC codes can then correct some erroneous bytes parity bytes of the transverse R-S FEC coding before transverse R-S decoding is begun, which will lighten the subsequent task of transverse R-S correction of erroneous bytes. Furthermore, if all segments of A/53-type "data" fields respectively include parity bytes for their lateral (207, 187) R-S FEC coding, the results of initial decoding of the lateral (207, 187) R-S FEC codes are available to aid in locating erroneous bytes for subsequent transverse R-S correction of erroneous bytes.

If the error-correction algorithm a receiver uses with an R-S FEC code relies on the R-S FEC code itself for locating erroneous bytes as well as correcting them, the number of erroneous bytes that can be corrected is limited to one-half the number of parity bytes. If erroneous bytes can be located without relying on the R-S code itself, an alternative algorithm can be used with the R-S code so the number of erroneous bytes that can be corrected can be as large as the number of parity bytes. U.S. Pat. No. 5,530,708 describes "soft decisions" from a trellis decoding procedure being used for locating errors for a subsequent R-S error-correction procedure. The "soft decisions" from a trellis decoding procedure can be used for locating errors both for a subsequent lateral R-S error-correction procedure and for a subsequent transverse R-S error-correction procedure. In the DTV receivers utilizing two-dimensional R-S FEC coding, results from an initial lateral R-S FEC decoding procedure can be used to help locate erroneous bytes for the subsequent transverse R-S FEC decoding procedure. Also, results from the transverse R-S FEC decoding procedure can be used to help locate erroneous bytes for the subsequent final lateral R-S FEC decoding procedure.

In transmitting apparatus of the general type shown in FIG. 1, the entire DTV signal is transmitted more robustly than with conventional A/53 DTV broadcasting. Another option that DTV broadcasters desire is to be able to transmit only a selected portion of the DTV signal in a robust format. A particular desire is robust transmission of audio packets, since errors in audio reproduction from DTV signals are more difficult to disguise than errors in video reproduction from DTV signals are.

In the FIG. 1 DTV transmitter the transverse R-S FEC coding is performed on data segments containing packets of data that have been randomized. This is contrary to the Wan and Morin concept of performing transverse R-S FEC coding on unmodified MPEG-2 data packets. The FIG. 1 DTV transmitter performs transverse R-S FEC coding on data segments containing packets of data that have been randomized to facilitate the DTV receiver performing lateral (207, 187) R-S FEC decoding following transversal R-S FEC decoding. The lateral (207, 187) R-S FEC decoding has to be done on packets of data that have been randomized. The lateral (207, 187) R-S FEC decoding is done following transversal R-S FEC decoding since it permits decisions as to whether or not a packet contains uncorrected byte errors to be made on an individual basis. The DTV transmitters of FIGS. 10, 14, 15, 24 and 26 also perform transverse R-S FEC coding on packets of data that have been randomized or on data segments containing such packets. This is done for reasons similar to the reasons the FIG. 1 DTV transmitter performs transverse R-S FEC coding on data segments containing packets of data that have been randomized.

Figure 10:
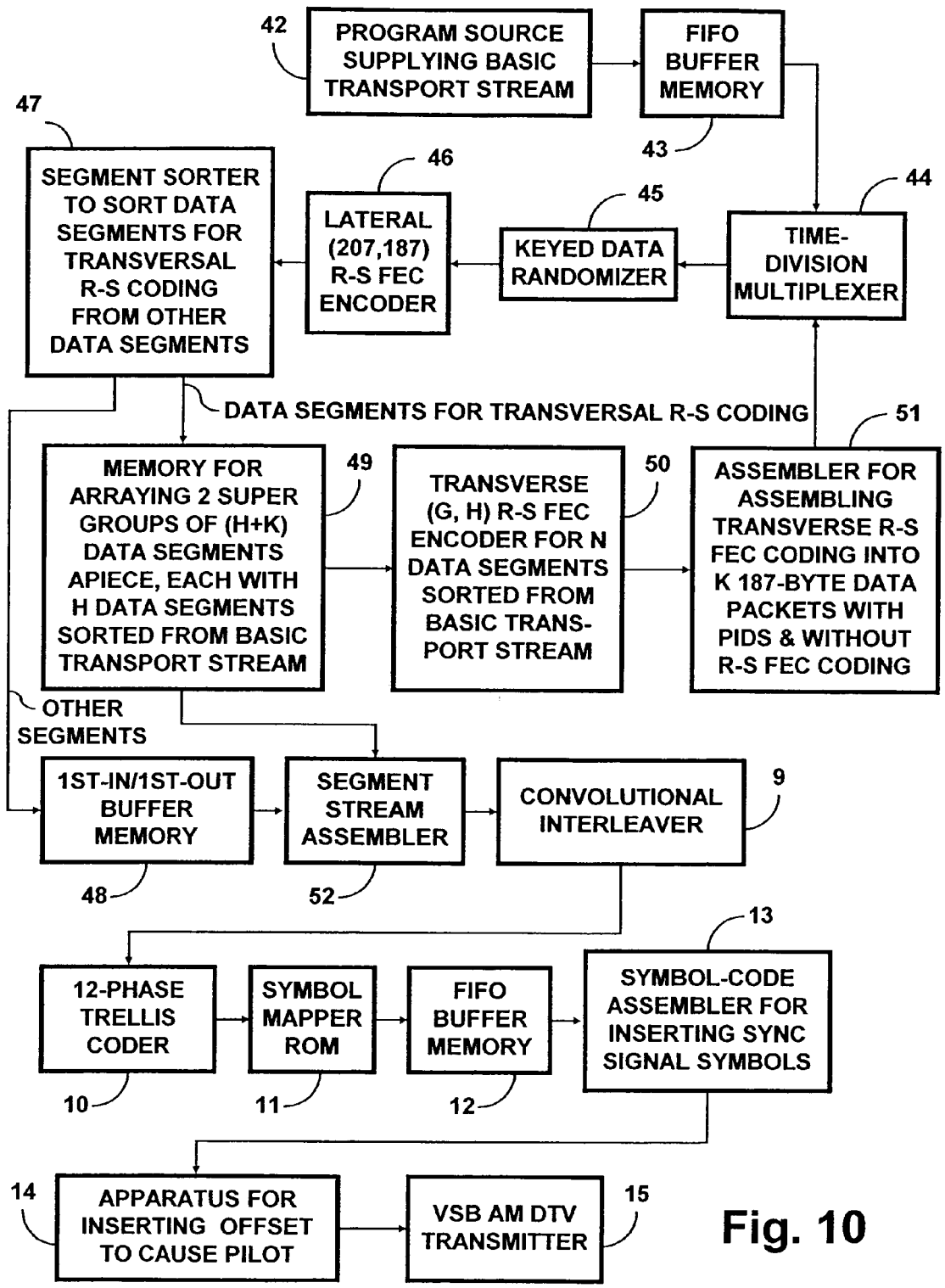
FIG. 10 is a schematic diagram of transmitting apparatus for transmitting a DTV signal including a robust audio signal, or another robust signal unrelated to the primary television signal, which transmitting apparatus in accordance with an aspect of the invention selectively applies transverse Reed-Solomon coding to that robust signal before it is convolutionally interleaved.

FIG. 10 shows a transmitter for transmitting a DTV signal in which only data packets of a selected type, such as audio packets, are subject to robust transmission. A program source 42 supplies the basic transport stream in 187-byte data packets to a first-in/first-out buffer memory 43 for temporary storage therein. A time-division multiplexer 44 is connected for supplying 187-byte data packets to a keyed data-randomizer 45, some of which data packets correspond to data packets read from the FIFO buffer memory 43 and are randomized by a keyed data-randomizer 45. The randomized data from the keyed data-randomizer 45 are supplied to a lateral (207, 187) Reed-Solomon forward-error-correction encoder 46. The R-S FEC encoder 46 is connected for supplying its 207-byte data packets to a segment sorter 47 that transfers most types of these data packets to a first-in/first-out buffer memory 48 for temporary storage therein.

However, the segment sorter 47 sorts out data packets of a type subject to robust transmission and data packets containing transverse R-S FEC coding for those particular data packets, to be written into a banked random-access memory 49. The RAM 49 stores one 8-bit byte of code at each of its addressed storage locations. The RAM 49 has enough addressed storage locations to store at least two successive super groups of (H+K) data segments apiece. H of these data segments are sorted from the basic transport stream by the segment sorter 47, and K of these data segments contain parity bytes for the transverse FEC coding.

After H successive data segments of the basic transport stream that will appear in a data field have been written into a bank of the RAM 49, read addressing is applied to this bank. This read addressing scans these H successive data segments in transverse direction to read H-byte transverse data segments to a transverse (G, H) Reed-Solomon forward-error-correction encoder 50.

A data assembler 51 assembles the parity bytes generated by the transverse R-S FEC encoder 50 into K 187-byte data packets that comply with the MPEG-2 standard except for not having an initial sync byte. The data assembler 51 supplies each of these K packets with a 3-byte header that includes an identifying PID and a continuity count. The time-division multiplexer 44 is operated for supplying these 187-byte data packets to the keyed data-randomizer 45 for randomization of their 3-byte headers. The keyed data-randomizer 45 differs from the data randomizer 4 in the FIG. 1 DTV transmitter in that the exclusive-ORing of data bits with the PRBS is keyed off when the time-division multiplexer 44 reproduces the parity bytes generated by the transverse R-S FEC encoder 50. Subsequently, the 187-byte data packets with randomized headers followed by non-randomized parity bytes from transverse R-S FEC coding are supplied by the keyed data-randomizer 45 to the lateral (207, 187) R-S FEC encoder 46 as input signal thereto. The lateral R-S FEC encoder 46 appends twenty bytes of lateral R-S FEC code to the conclusion of each of these K 187-byte data packets, to generate a respective A/53-compliant 207-byte segment selected by the segment sorter 47 for writing into the RAM 49. The K 187-byte data segments containing transverse R-S FEC coding are written into the bank of the RAM 49 to complete the super group that is temporarily stored therein. The (H+K) data segments in this completed super group are then read seriatim from that bank of the RAM 49 at appropriate intervals. The K data segments containing data packets with parity bytes for transverse R-S FEC coding are read from the RAM 49 before the H data segments containing the type of payload data packets selected for robust transmission.

A segment-stream assembler 52 receives these (H+K) data segments and inserts them into a stream of other data segments supplied from the first-in/first-out buffer memory 48. Establishing a prescribed pattern for these segments appearing in data fields makes it easier for DTV receivers to ascertain which data segments comprise the robust transmission. The remaining portion of the FIG. 10 DTV transmitter comprising the elements 9–15 is similar to a portion of the FIG. 1 transmitting apparatus. The convolutional interleaver 9 is connected for receiving data packets supplied seriatim from the segment-stream assembler 52 and for supplying convolutionally interleaved data packets to the 12-phase trellis coder 10. The trellis coding results from the trellis coder 10 are supplied as input addressing to the read-only memory 11 that functions as a symbol mapper supplying 3-bit, 8-level symbols to the first-in/first-out buffer memory 12. The FIFO buffer memory 12 is operated to provide rate buffering and to open up intervals between 828-symbol groups in the symbol stream supplied to a symbol-code assembler 13, into which intervals the symbol-code assembler 13 inserts synchronizing signal symbols. Each of the successive data fields begins with a respective interval into which the symbol-code assembler 13 inserts symbol code descriptive of a data-segment-synchronization (DSS) sequence followed by symbol code descriptive of an initial data segment including an appropriate data-field-synchronization (DFS) sequence. Each data packet in the respective remainder of each data field is followed by a respective interval into which the symbol-code assembler 13 inserts symbol code descriptive of a respective DSS code sequence. Apparatus 14 for inserting the offset to cause pilot is connected to receive assembled data fields from the symbol-code assembler 13. The apparatus 14 is simply a clocked digital adder that zero extends the number used as symbol code and adds a constant term thereto to generate a real-only modulating signal in digital form, supplied to a vestigial-sideband amplitude-modulation digital television transmitter 15 of conventional construction.

Provisional U.S. patent applications Ser. No. 60/437,648 and 60/458,547 disclose variants of the FIG. 10 DTV transmitter. Data randomization is performed on a keyed basis in these variants, subsequent to the time division multiplexing of data packets with packets containing transverse R-S FEC coding. In these variants, when data packets are supplied to the lateral (207, 187) R-S FEC encoder, data randomization is activated or keyed on. However, when packets containing transverse R-S FEC coding are supplied to the lateral (207, 187) R-S FEC encoder, data randomization is de-activated, or keyed off. Overall operation is essentially equivalent to that of FIG. 10 DTV transmitter.

FIGS. 11A, 11B and 11C tabulate the characteristics of some transverse Reed-Solomon forward-error-correction codes suitable for robust transmission of audio or ancillary data. The parity bytes of the codes shown in FIGS. 11A, 11B and 11C provide for full packing of an integral number of A/53-compliant data segments. FIGS. 11A, 11B and 11C also show the payload reductions associated with using these codes in an otherwise normal DTV transmission.

An average of 8 data segments per data field is required for transmission of packets with 5.1-channels of AC/3 audio data. Preferably, the transverse R-S FEC coding of these 8 data segments per data field precedes them, so that the transverse R-S FEC decoding of these 8 data segments per data field need not be delayed very long after their reception. The need to keep legacy DTV receivers operational constrains the delays permitted between the respective transmission times of video data packets and of the audio data packets that go with them. MPEG-2 rules require that video data packets and audio data packets with similar presentation time stamps (PTSs) be no further apart in the transport stream than one second (20.66 data frames), but does not specify which type of data packet should precede or succeed the other type of data packet. Accordingly, delaying the transverse R-S FEC decoding of the 8 data segments per data field in a robust DTV receiver tends to require substantial compensatory delay to be introduced into the much more voluminous video-data-packet stream. So, the video data packets would have to be provided substantial temporary storage for keeping them reasonably contemporaneous with audio data packets with similar PTSs.

Generally, it is desired that the robust audio reduce the current 19.3 Mbps capacity of the channel by no more than a few percent. At first, this suggests that the transverse paths in the transverse R-S FEC coding are constrained to being shorter length. Transverse paths 15, 31 or 63 byte lengths long are considered as being shorter; transverse paths 127, 255 or 511 byte lengths long are considered as being longer. However, there is no requirement that the transverse R-S FEC coding has to be complete within a single frame. A "shingling" approach to coding is possible in which each data field contains 8 audio data segments of a small super group in prescribed positions within each data field. The data segments containing the transverse R-S FEC coding for those audio data segments are located in prescribed positions within preceding data fields. Variants of this shingling approach place 16 audio data segments of a somewhat larger super group in prescribed positions within the two fields of a data frame. The data segments containing the transverse R-S FEC coding for those audio data segments are located in prescribed positions within data fields preceding that data frame. This keeps the latency of the audio packets within reasonably close constraints, but allows transverse R-S FEC coding over a greater number of data segments while maintaining substantially the same code rate. This allows the error-correcting capability of the transverse R-S FEC coding to be more flexible in regard to the locations of correctable errors.

If coding efficiency is to be maximized, it is desirable to pack fully the data segments containing parity bytes for the transverse R-S FEC coding. As noted with regard to transverse R-S FEC coding over entire data fields, transverse R-S FEC codes with eight or a multiple of eight parity bytes provide for full packing of nine or a multiple of nine A/53-compliant data segments. Full packing for transverse R-S FEC coding with only eight payload-bearing data packets per super group is provided only with codes that reduce coding rate quite substantially by a factor of (17/8), (13/4), (35/8) or more. As can be discerned from FIG. 11A, the codes that reduce coding rate during robust transmission by factors of (17/8), (13/4) and (35/8) reduce payload rate for the entire DTV signal by 0.56, 1.12 and 1.68 megabits per second, respectively. These are 2.88%, 5.77% and 8.65% reductions, respectively, in the payload rate for the entire DTV signal.

Full packing for transverse R-S FEC coding with sixteen payload-bearing data packets per super group is provided with codes that reduce coding rate during robust transmission by a factor of (25/16), (17/8), (43/16), (13/4), (61/16), (35/8) or more. The codes that reduce coding rate during robust transmission by factors of (25/16), (17/8), (43/16), (13/4), (61/16) and (35/8) reduce payload rate for the entire DTV signal by 0.28, 0.56, 0.84, 1.12, 1.40 and 1.68 megabits per second, respectively. These are 1.44%, 2.88%, 4.33%, 5.77%, 7.22% and 8.65% reductions, respectively, in the payload rate for the entire DTV signal. FIG. 11A shows the resulting payload rates. For a given reduction in the payload rate for the entire DTV signal, a larger super group provides greater flexibility concerning where long burst errors can be located without jeopardizing the ability to correct those errors. The availability of the smaller 1.44% reduction in the payload rate for the entire DTV signal is particularly of interest.

Full packing for transverse R-S FEC coding with twenty-four payload-bearing data packets per super group makes available a transverse R-S FEC code that reduces coding rate during robust transmission by a factor of (11/8) that reduces payload rate for the entire DTV signal by only 0.19 megabits per second. This code, shown in FIG. 11A, reduces the payload rate for the entire DTV signal by 0.99%. Full packing for transverse R-S FEC coding with thirty-two payload-bearing data packets per super group makes available a transverse R-S FEC code that reduces coding rate during robust transmission by a factor of (41/32) that reduces payload rate for the entire DTV signal by only 0.14 megabits per second. This reduces the payload rate for the entire DTV signal by 0.72%. The latency associated with accumulating data segments containing audio packets for 4 data fields increases by 10% the buffer memory requirements for the MPEG-2 and AC-3 decoders in a DTV receiver designed to utilize the transverse R-S FEC coding of audio data packets. This is probably the practical limit of increased buffer memory requirements in designs of DTV receivers for use in homes.

When a limited amount of robust ancillary data is to be transmitted that is separate from the television program and does not have to be kept contemporaneous therewith, transverse R-S FEC coding that extends over several data fields becomes more attractive. Transverse R-S FEC coding can be designed that can correct byte errors caused by a drop-out in signal energy that persists for as long as a few data fields and that accordingly is more suitable for mobile receivers. The transverse paths can extend through data segments that are in respective successive data fields rather than through successive data segments in the same data field, as is the case in the transmissions from transmitting apparatus of the type shown in FIG. 1. These successive data fields need not be consecutive, but are preferably periodic.

Figure 12:
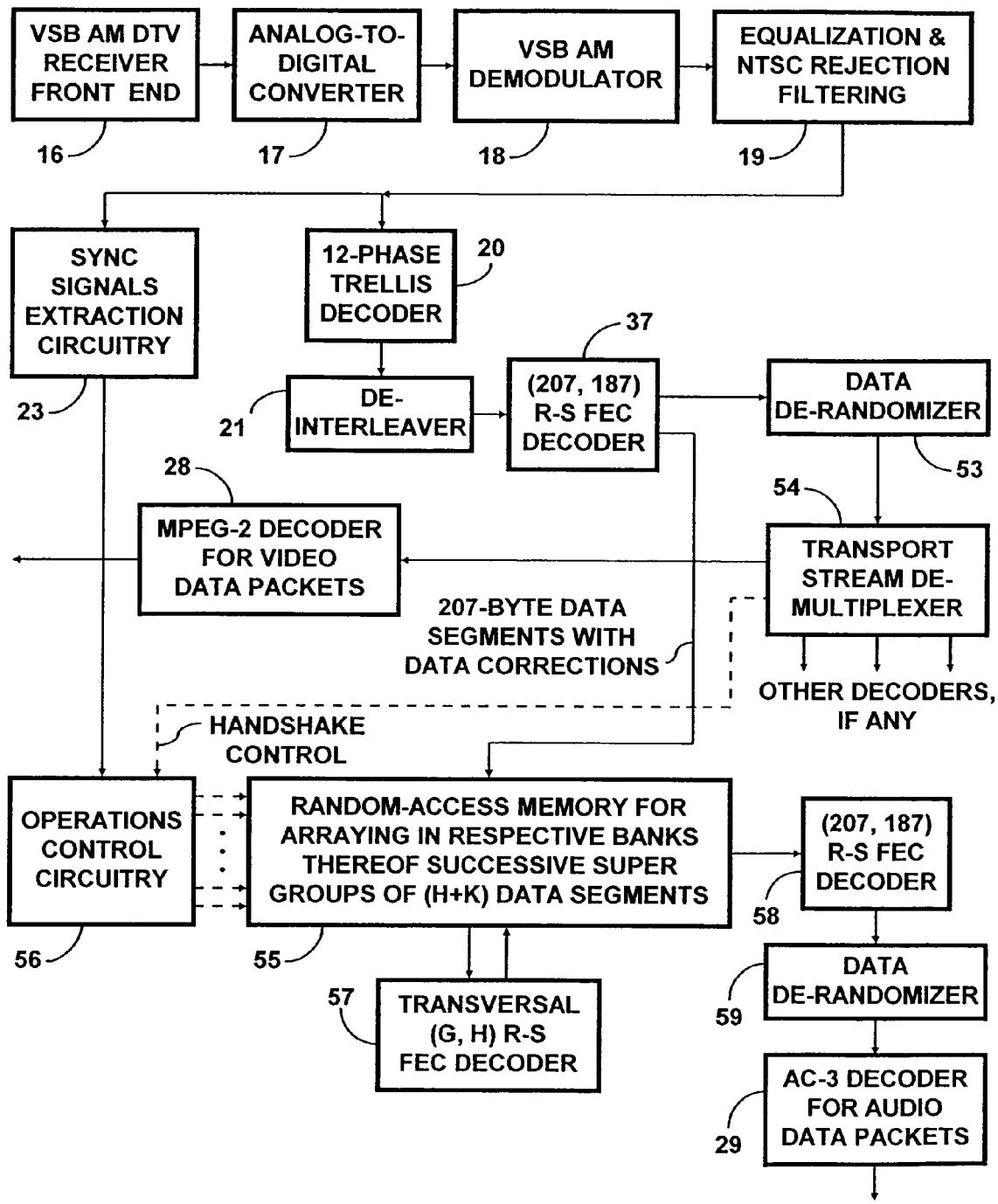
FIG. 12 is a schematic diagram of a DTV receiver for receiving a DTV signal including a robust signal, as transmitted by transmitting apparatus of the type shown in FIG. 10, which DTV receiver is constructed in accordance with an aspect of the invention.

FIG. 12 shows the general construction of a DTV receiver for receiving robust DTV signals as transmitted by the FIG. 10 transmitter. The FIG. 12 DTV receiver includes the vestigial-sideband amplitude-modulation (VSB AM) DTV receiver front-end 16 for selecting a radio-frequency DTV signal for reception, converting the selected RF DTV signal to an intermediate-frequency DTV signal, and for amplifying the IF DTV signal. The FIG. 12 DTV receiver further includes the analog-to-digital converter 17 for digitizing the amplified IF DTV signal supplied from the DTV receiver front-end 16. The FIG. 12 DTV receiver further includes the demodulator 18 for demodulating the digitized VSB AM IF DTV signal to generate a digitized baseband DTV signal supplied to the digital filtering 19 for equalization of channel response and for rejection of co-channel interfering NTSC signal. The 12-phase trellis decoder 20 is connected to receive the digital filtering 19 response and to supply bytes of data to the de-interleaver 21 that is complementary to the convolutional interleaver 9 in the FIG. 10 transmitter. The de-interleaver 21 is connected to supply de-interleaved data bytes, plus any extensions to them, to the lateral (207, 187) Reed-Solomon forward-error-correction decoder 37 as input signal thereto.

The lateral R-S FEC decoder 37 performs lateral Reed-Solomon forward-error-correction on each data segment, and toggles the TEI bit in each data packet in which it leaves byte errors uncorrected. If the lateral R-S FEC decoder 37 determines that a data packet is correct or is able to correct all byte errors in the data packet, the decoder 37 updates any extensions of the bytes in that data packet indicative of the confidence levels that the bytes are correct. The lateral R-S FEC decoder 37 forwards the corrected 187-byte packet to a data de-randomizer 53. The data de-randomizer 53 supplies a transport stream to a transport stream de-multiplexer 54. The transport stream de-multiplexer 54 responds to the PIDs in certain of the data packets for sorting them to appropriate packet decoders. For example, video data packets are sorted to the MPEG-2 decoder 28 for video packets. The MPEG-2 decoder 28 responds to the TEI bit in a video data packet indicating that it still contains byte errors by not using the packet and instituting measures to mask the effects of the packet not being used.

The lateral R-S FEC decoder 37 supplies 207-byte segments containing bytes of lateral R-S FEC code as well as corrected data bytes to a banked random-access memory 55 that accepts certain of these data segments for being written into a bank of the RAM 55. The data segments accepted for writing each contain a respective data packet of audio information or a respective data packet comprising the parity bytes of transversal R-S FEC coding of the data packets of audio information. Each storage location in the banked RAM 55 is capable of temporarily storing a respective byte of one of these 207-byte data segments, plus any extension or extensions of each of those bytes. There are at least two memory banks in the RAM 55, but there may be more to facilitate "shingled" robust audio transmission. In some designs the RAM 55 is constructed and operated for temporarily storing each 207-byte data segment in a respective row of storage locations that includes at least extra storage location, used for temporarily storing information the ordinal number of that data segment. This ordinal number specifies the location of that data segment within the data field in which it was received.

The FIG. 12 DTV receiver includes the synchronization signal extraction circuitry 23 for extracting data field synchronizing signals and data segment synchronizing signals from the digital filtering 19 response and supplying those signals to operations control circuitry 56. The operations control circuitry 56 controls the writing to and reading from the banked random-access memory 55. The operations control circuitry 56 also generates the addressing for writing and reading operations of the RAM 55. The operations control circuitry 56 includes counter circuitry for counting bytes per data segment and counting data segments per data field in the signal supplied from the lateral R-S FEC decoder 37. These counts from this counter circuitry are synchronized with the received data fields and data segments using the synchronizing signals extracted by the synchronization signal extraction circuitry 23. Storage locations in one bank of the RAM 55 banks are addressed by row and by column for being written with data bytes from the lateral R-S FEC decoder 37 that the RAM 55 is conditioned by the operations control circuitry 56 to accept for writing. The column write addressing is the bytes per segment count from the counter circuitry included within the operations control circuitry 56. The row write addressing is responsive to the continuity count in the header of data segment being written from the lateral R-S FEC decoder 37 into that bank of the RAM 55.

The writing of the RAM 55 with data bytes from the lateral R-S FEC decoder 37 is done by a handshaking procedure, with the transport stream de-multiplexer 54 providing the operations control circuitry 56 with a HANDSHAKE CONTROL signal. The HANDSHAKE CONTROL signal indicates when the lateral R-S FEC decoder 37 is supplying the RAM 55 with a data packet to be written into a bank of the memory therein. Responsive to this HANDSHAKE CONTROL signal, the operations control circuitry 56 conditions the appropriate bank of the RAM 55 to be written into with the data packet currently supplied from the lateral R-S FEC decoder 37.

The HANDSHAKE CONTROL signal that the transport stream de-multiplexer 54 supplies the operations control circuitry 56 comprises substantially more than just a write enable signal for the RAM 55. The HANDSHAKE CONTROL signal comprises the 13-bit PID of the data segment that is to be written into the RAM 55 and further comprises the succeeding eight bits of that data segment. The last four of these succeeding eight bits is the continuity count for that particular type of data segment. If the data packet contains parity bytes for transverse R-S FEC coding, the two bits that succeed the PID are used as a PID extension that identifies the cycle of robust transmission that data packet belongs to. The operations control circuitry 56 uses these two bits for selecting the bank in the RAM 55 that the data packet comprising parity bytes for transverse R-S FEC coding is to be written to. The pair of bits that succeed the pair of bank selection bits in a data packet that comprises parity bytes for transverse R-S FEC coding is used to increase continuity count capability from modulo-sixteen to modulo-sixty-four. The count of data packets that comprise parity bytes for transverse R-S FEC coding for a particular cycle of robust transmission begins at one at the start of that cycle. The operations control circuitry 56 uses the modulo-sixty-four count for selecting the row in the bank of the RAM 55 that the data packet that comprises parity bytes for transverse R-S FEC coding is to be written into. The continuity count for the data packets that comprise parity bytes for a particular type of transverse R-S FEC coding reaches a complete count K as the cycle of robust transmission to which those data packets belong continues with the H audio data packets those parity bytes pertain to. At that time one bank of the RAM 55 contains a complete complement of K data packets that comprise parity bytes for transverse (G, H) R-S FEC coding. The operations control circuitry 56 conditions the RAM 55 to write the H audio data packets that the lateral R-S FEC decoder 37 next supplies into that same bank.

The data packets written into the RAM 55 are the data packets containing audio information and the data packets containing the parity bytes of transversal R-S FEC coding associated with the data packets containing audio information. The storage locations in another of the RAM 55 banks are transversally addressed for reading to a transversal (G, H) Reed-Solomon forward-error-correction decoder 57 and being written back to with byte errors corrected. After the data packets containing audio information have been corrected insofar as possible by transversal R-S FEC decoding, the data segments comprising them are read from the RAM 55 to a further lateral (207, 187) Reed-Solomon forward-error-correction decoder 58 as input signal thereto. The (207, 187) R-S FEC decoder 58 performs lateral Reed-Solomon forward-error-correction on each data segment, and toggles the TEI bit in each data packet in which it finds byte errors that can be corrected. If the lateral R-S FEC decoder 58 is able to correct byte errors in the data packet, the decoder 58 updates any extensions of the bytes in that data packet indicative of the confidence levels that the bytes are correct. The lateral R-S FEC decoder 58 then supplies the 187-byte audio data packets to a data de-randomizer 59. The data de-randomizer 59 de-randomizes the data in these packets and supplies the de-randomized data to the AC-3 decoder 29 for audio data packets.

The proper operation of the data de-randomizer 59 requires careful design because a robust audio data packet may be read from the RAM 55 at a different position in a data field than it was in the data field in which it was written into the RAM 55. De-randomization must use the portion of the PRBS pertaining to the location of the robust audio data packet in the data field in which it was written into the RAM 55. In one possible design the data de-randomizer 59 includes a read-only memory that supplies the portions of the PRBS used in its exclusive-ORing procedure. This ROM receives part of its input addressing from the counter circuitry in the operations control circuitry 56 that generates columnar byte addressing for the bank of RAM 55 that reads to the final lateral R-S FEC decoder 58. The rest of the input addressing is a 9-bit binary number indicating where the data segment that will be read to the final lateral R-S FEC decoder 58 was located within the data field which that data segment was received in. This 9-bit binary number is the data segments per data field count that the counter circuitry in the operations control circuitry 56 supplies at the time the data segment is first written into the RAM 55. This 9-bit binary number is stored as a prefatory byte in the RAM 55 along with the bytes of that data segment. This prefatory byte is subsequently read from the RAM 55 and passed along by the final lateral R-S FEC decoder 58 to the data randomizer 59 prior to the data segment that prefatory byte describes. The prefatory byte is plucked from the data stream and used to address the ROM storing portions of the PRBS that the data de-randomizer 59 uses in its exclusive-ORing procedures. This places no limitation on the location of the audio data packets within data fields and very little, if any, limitation on when data segments comprising the audio data packets can be read from the RAM 55 to the final lateral R-S FEC decoder 58.

In an alternative design the operations control circuitry 56 arranges for data segments comprising audio data packets to be read from the RAM 55 at the same position in a data field that those data segments were in the data field(s) they were written into the RAM 55. This advantageously allows the data randomizer 59 to use the same PRBS generating apparatus as the data de-randomizer 53. However, the latent delay in the audio data packets compared to the video data packets is longer than in the design described in the preceding paragraph.

Figure 13:
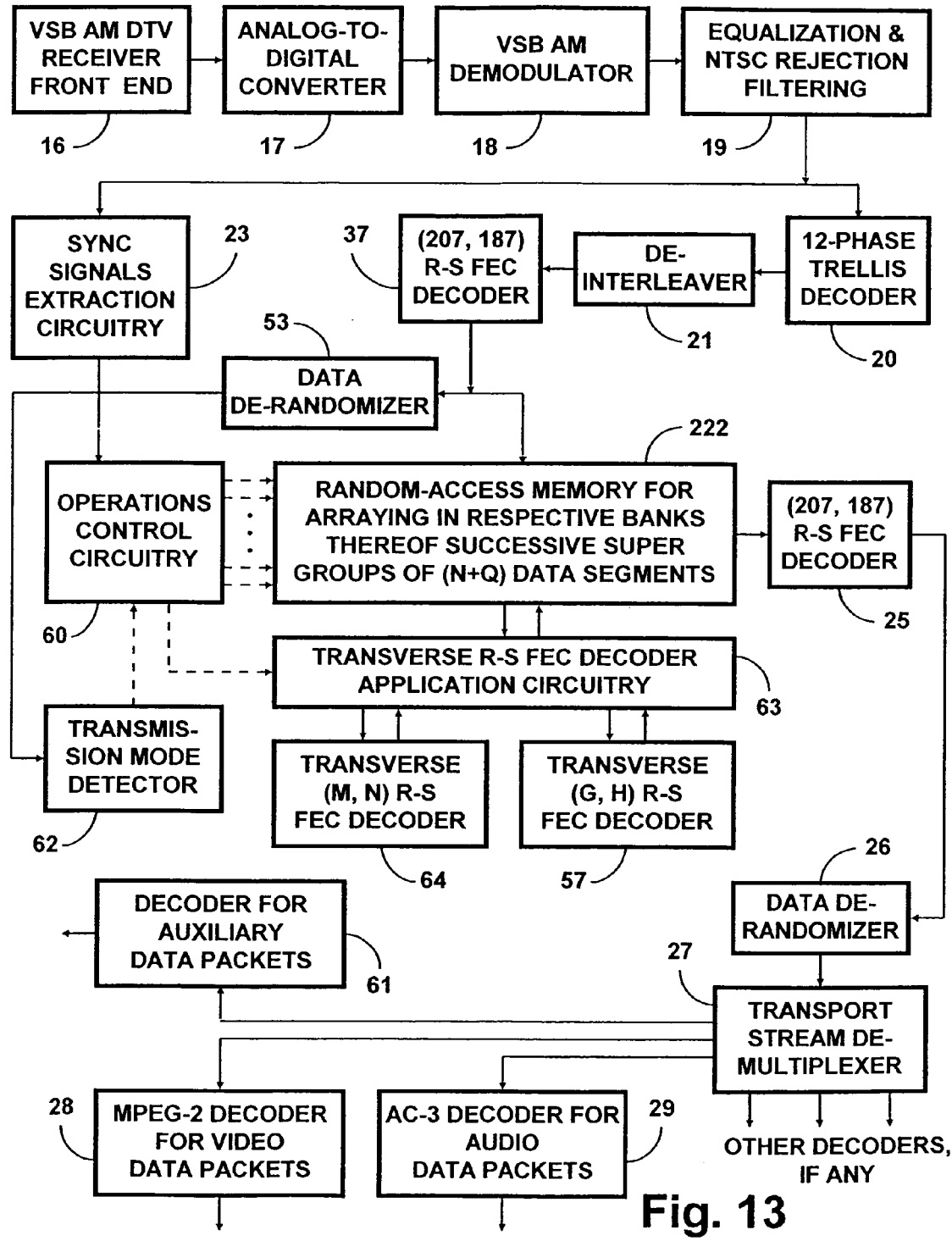
FIG. 13 shows a DTV receiver capable of receiving robust DTV signals as transmitted by transmitting apparatus of either of the types shown in FIGS. 1 and 10.

FIG. 13 shows a DTV receiver capable of receiving robust DTV signals as transmitted by transmitting apparatus of either of the types shown in FIGS. 1 and 10. The FIG. 13 DTV receiver provides the reception capability of the FIG. 12 DTV receiver in addition to reception capability similar to that of the FIG. 4 DTV receiver modified per FIG. 5 or to that of the FIG. 7 DTV receiver modified per FIG. 8. Operations control circuitry 60 in the FIG. 13 DTV receiver combines the capabilities of the FIG. 12 operations control circuitry 46 with capabilities of the FIG. 4 operations control circuitry 24 or of the FIG. 7 operations control circuitry 124. A random-access memory 222 with at least two banks each capable of storing (N+Q) data segments is selectively written and read in response to addressing and control signals the RAM 222 is connected to receive from the operations control circuitry 60. In a design in which (N+Q) is substantially equal to 312, the RAM 222 replaces the RAM 22 of the FIG. 4, 5 or 6 DTV receiver apparatus. In a design in which (N+Q) is substantially equal to 312, the RAM 222 replaces the RAM 122 of the FIG. 7, 8 or 9 DTV receiver apparatus. Elements 16–21, the lateral (207, 187) R-S FEC decoder 37 and the data de-randomizer 53 are connected and operated substantially the same as in the FIG. 12 DTV receiver. The initial lateral (207, 187) R-S FEC decoder 37 is connected to supply the RAM 222 with 207-byte segments containing bytes of lateral R-S FEC code, as well as data bytes with initial Reed-Solomon correction of byte errors, all of which 207-byte segments are written into the RAM 222.

After transverse R-S FEC decoding procedures, data segments are read from the RAM 222 to the final lateral (207, 187) R-S FEC decoder 25. The (207, 187) R-S FEC decoder 25 performs lateral Reed-Solomon forward-error-correction on each data segment, and toggles the TEI bit in each data packet in which it finds byte errors that can be corrected. If the lateral R-S FEC decoder 25 is able to correct byte errors in the data packet, the decoder 25 updates any extensions of the bytes in that data packet indicative of the confidence levels that the bytes are correct. The lateral R-S FEC decoder 25 then supplies the 187-byte data packets to the data de-randomizer 26. The data de-randomizer 26 de-randomizes the data in these packets and supplies the de-randomized data to the transport stream de-multiplexer 27. The transport stream de-multiplexer 27 responds to the PIDs in the data packets for sorting them to appropriate packet decoders. Video data packets are sorted to the MPEG-2 decoder 28 and audio data packets are sorted to the AC-3 decoder 29. The connection and operation of the elements 25–29 are substantially the same as in the DTV receivers of FIGS. 4 and 7. FIG. 13 shows a decoder 61 for auxiliary data packets sorted thereto by the transport stream de-multiplexer 27.

FIG. 13 shows a transmission mode detector 62 connected for receiving de-randomized baseband DTV signal from the data de-randomizer 53 and for supplying the operations control circuitry 60 indications of the transmission mode used for transmitting the received DTV signals. In a DTV system in which (N+Q) is substantially equal to 312, at times the transmission mode detector 62 determines the received DTV signal is transmitted with transverse R-S FEC coding of all data segments in each data field. The transmission mode detector 62 supplies indications of such transmission to the operations control circuitry 60, which responds to such indications to operate the RAM 222 like the RAM 22 of the FIG. 4, 5 or 6 DTV receiver apparatus. The operations control circuitry 60 conditions the Reed-Solomon forward-error-correction decoder application circuitry 63 for selectively connecting the RAM 222 to a transverse (M, N) Reed-Solomon forward-error-correction decoder 64. The selective connecting is done so as to permit the reading of bytes in transversal paths from the RAM 222 to the transverse (M, N) R-S FEC decoder 64 and the subsequent writing of corrected bytes back to the RAM 222 from the decoder 64. The transverse (M, N) R-S FEC decoder 64 uses a transverse (M, N) Reed-Solomon forward-error-correction code suited to super groups that extend over 312 data segments and can be a selected one of a group of such transverse (M, N) R-S FEC decoders.

Alternatively, in a DTV system in which (N+Q) is substantially equal to 156, at times the transmission mode detector 62 determines the received DTV signal is transmitted with transverse R-S FEC coding of all data segments in each half data field. The transmission mode detector 62 supplies indications of such transmission to the operations control circuitry 60, which responds to such indications to operate the RAM 222 like the RAM 122 of the FIG. 7, 8 or 9 DTV receiver apparatus. The operations control circuitry 60 conditions the Reed-Solomon forward-error-correction decoder application circuitry 63 for selectively connecting the RAM 222 to the transverse (M, N) Reed-Solomon forward-error-correction decoder 64. The selective connecting is done so as to permit the reading of bytes in transversal paths from the RAM 222 to the transverse (M, N) R-S FEC decoder 64 and the subsequent writing of corrected bytes back to the RAM 222 from the decoder 64. The transverse (M, N) R-S FEC decoder 64 uses a transverse (M, N) Reed-Solomon forward-error-correction code suited to super groups that extend over 156 data segments and can be a selected one of a group of such transverse (M, N) R-S FEC decoders.

When the transmission mode detector 62 determines that the audio portion of the received DTV signal was transmitted with its own transverse R-S FEC coding, the transmission mode detector 62 supplies indications of such transmission to the operations control circuitry 60. The operations control circuitry 60 responds to these indications to operate the RAM 222 so as to perform transverse R-S FEC decoding of only those data segments concerning the audio portion of the received DTV signal. The operations control circuitry 60 conditions the Reed-Solomon forward-error-correction decoder application circuitry 63 for selectively connecting the RAM 222 to the transverse (G, H) R-S FEC decoder 57. The selective connecting is done so as to permit the reading of bytes in transversal paths from the RAM 222 to the transverse (G, H) R-S FEC decoder 57 and the subsequent writing of corrected bytes back to the RAM 222 from the decoder 57.

When the transmission mode detector 62 determines that an ancillary portion of the received DTV signal was transmitted with its own transverse R-S FEC coding, the transmission mode detector 62 supplies indications of such transmission to the operations control circuitry 60. The operations control circuitry 60 responds to these indications to operate the RAM 222 so as to perform transverse R-S FEC decoding of only those data segments concerning the ancillary data. The operations control circuitry 60 conditions the Reed-Solomon forward-error-correction decoder application circuitry 63 for selectively connecting the RAM 222 to the transverse (G, H) R-S FEC decoder 57. The selective connecting is done so as to permit the reading of bytes in transversal paths from the RAM 222 to the transverse (G, H) R-S FEC decoder 57 and the subsequent writing of corrected bytes back to the RAM 222 from the decoder 57.

All data segments supplied by the lateral (207, 187) R-S FEC decoder 37 are written to the RAM 222 to be temporarily stored therein over two (N+Q)-data-segment intervals. That is, the RAM 222 provides the delay compensation data segments without transverse R-S FEC coding have to have in order not to be advanced respective to data segments with transverse R-S FEC coding. The delay associated with writing (N+Q) data segments into a bank of the RAM 222 before transverse R-S FEC decoding can proceed, affords the transmission mode detector 62 time to assemble a full set of indications concerning how transverse R-S FEC coding of that block of (N+Q) data segments was done. The timing of the transverse R-S FEC decoding operations can be arranged to permit both individual transverse R-S FEC coding of selected types of data segments and overall transverse R-S FEC coding of all data segments in a data field or data half field. Such arrangement is a matter of design by one skilled in the art who is advised of the possibility of such operation.

FIG. 13 shows the transmission mode detector 62 connected for responding to the transport stream reproduced by the data de-randomizer 53. Such connection is appropriate if the transmission mode detector 62 is of a type that determines the nature of the received DTV signal by analyzing the PIDS of the data segments in the reproduced transport stream. Alternatively, the transmission mode detector 62 can be of a type for responding to information concerning the pattern of robust transmissions, which information is transmitted in coded form during the 92-symbol "reserved" portion of the initial, zeroeth data segment of a data field.

Figure 14:
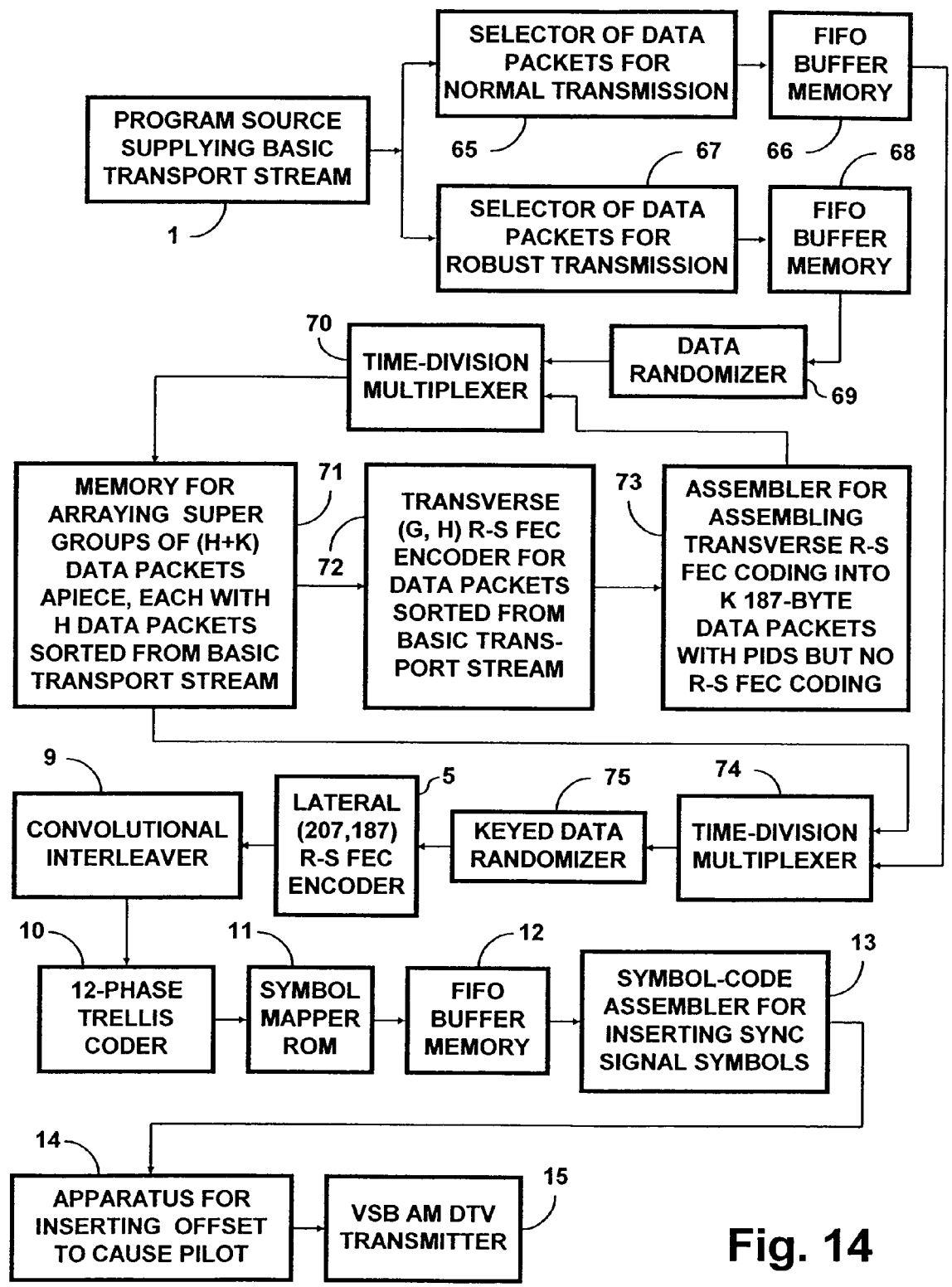
FIG. 14 is a schematic diagram of transmitting apparatus for transmitting a DTV signal including a robust audio signal or another robust signal unrelated to the primary television signal, which transmitting apparatus is constructed in accordance with an aspect of the invention as an alternative to the FIG. 10 transmitting apparatus.

FIG. 14 shows a transmitter for transmitting a DTV signal in which only data packets of a selected type, such as audio packets, are subject to robust transmission. In the FIG. 14 DTV transmitter 187-byte data packets containing parity bytes of the transverse R-S FEC coding are time-division multiplexed with 187-byte data packets containing payload. In the FIG. 14 DTV transmitter the transverse R-S FEC coding is performed before lateral R-S FEC coding of the 187-byte data packets, and the parity bytes of the lateral R-S FEC coding are not subjected to transverse R-S FEC coding. This differs from the FIG. 10 DTV transmitter of FIG. 10, in which lateral R-S FEC coding is performed before transverse R-S FEC coding, so parity bytes of the lateral R-S FEC coding are subjected to transverse R-S FEC coding. Subjecting parity bytes of the lateral R-S FEC coding to transverse R-S FEC coding tends to provide more powerful two-dimensional Reed-Solomon forward-error-correction coding, but for given transverse R-S FEC code generates 207/187 times as many parity bytes. This is about 11% greater overhead cost.

The program source 1 supplies the basic transport stream in 187-byte data packets to a transport stream de-multiplexer in the FIG. 14 DTV receiver. The transport stream de-multiplexer comprises a selector 65 connected for selecting those data packets that are the basis for the normal transmission to a first-in/first-out (FIFO) buffer memory 66 for temporary storage therein. The transport stream de-multiplexer further comprises a selector 67 connected for selecting those data packets that are the basis for robust transmission to a first-in/first-out (FIFO) buffer memory 68 for temporary storage therein. A data randomizer 69 is connected for randomizing data packets read from the FIFO buffer memory 68. Provision has to be made for supplying the data randomizer 69 with knowledge concerning the position in the data field that will be occupied by each data segment incorporating a respective data packet read from the FIFO buffer memory 68. This allows data randomization to be done by exclusive-ORing the data in each packet with the appropriate portion of the PRBS.

A time-division multiplexer 70 is connected for supplying 187-byte packets to be written into a banked random-access memory 71, which stores one 8-bit byte of code plus any byte extensions at each of its addressed storage locations. The RAM 71 has enough addressed storage locations to store at least two successive super groups of (H+K) 187-byte data packets apiece. FIFO buffer memory 68 is periodically read from for supplying data packets to the data-randomizer 69, which after randomization are supplied to the time-division multiplexer 70 as its first input signal. The time-division multiplexer 70 relays these randomized data packets to the RAM 71 for being written into a bank of memory therein. After H successive data packets for robust transmission have been written into a bank of the RAM 71, read addressing is applied to this bank. This read addressing scans these H successive data segments in transverse direction to read H-byte transverse data segments to a transverse (G, H) Reed-Solomon forward-error-correction encoder 72. A data assembler 73 assembles the resulting transverse R-S FEC coding from the transverse R-S FEC encoder 72 into K 187-byte data packets that comply with the MPEG-2 standard except for not having an initial sync byte. The data assembler 73 supplies each of these K packets with a 3-byte header that includes an identifying PID and a continuity count. The time-division multiplexer 70 receives these 187-byte data packets as a second input signal forwards these 187-byte data packets to the RAM 71 for being written into a bank of the RAM 71 to complete the super group that is temporarily stored therein. The (H+K) data packets in this completed super group are then read seriatim from that bank of the RAM 71 at appropriate intervals. Preferably, the K data packets containing transverse R-S FEC coding are read from the RAM 71 before the H data packets containing the payload data selected for robust transmission.

A two-input time-division multiplexer 74 is connected for supplying 187-byte data packets to a keyed data-randomizer 75. The FIFO buffer memory 66 is connected for supplying randomized normal-transmission data packets to the time-division multiplexer 74 as the first of its two input signals. The time-division multiplexer 74 is connected for receiving robust-transmission data packets read from the RAM 71 as the second of its two input signals. The keyed data-randomizer 75 is connected for receiving the output signal of the time-division multiplexer 74 and for supplying the lateral (207, 187) R-S FEC encoder 5 with selectively randomized response to the output signal of the time-division multiplexer 74. The keyed data-randomizer 75 randomizes the normal-transmission data packets that the time-division multiplexer 74 relays from the FIFO buffer memory 66 readout. The keyed data-randomizer 75 randomizes the 3-byte headers of packets containing parity bytes from transverse R-S FEC coding, but relays without modification the 184-byte payload portions of these packets. The keyed data-randomizer 75 relays the data packets that were previously randomized by the data-randomizer 69 to the lateral R-S FEC encoder 5 without any modification of those data packets. The lateral R-S FEC encoder 5 appends twenty bytes of lateral R-S FEC code to the conclusion of each of the 187-byte data packets supplied by the keyed data-randomizer 75. This generates a respective A/53-compliant 207-byte segment that the lateral R-S FEC encoder 5 supplies to the convolutional interleaver 9 as input signal thereto. The portion of the FIG. 14 DTV transmitter comprising the elements 9 through 15 corresponds to the portion of the FIG. 1 DTV transmitter comprising the elements 9 through 15.

Figure 15:
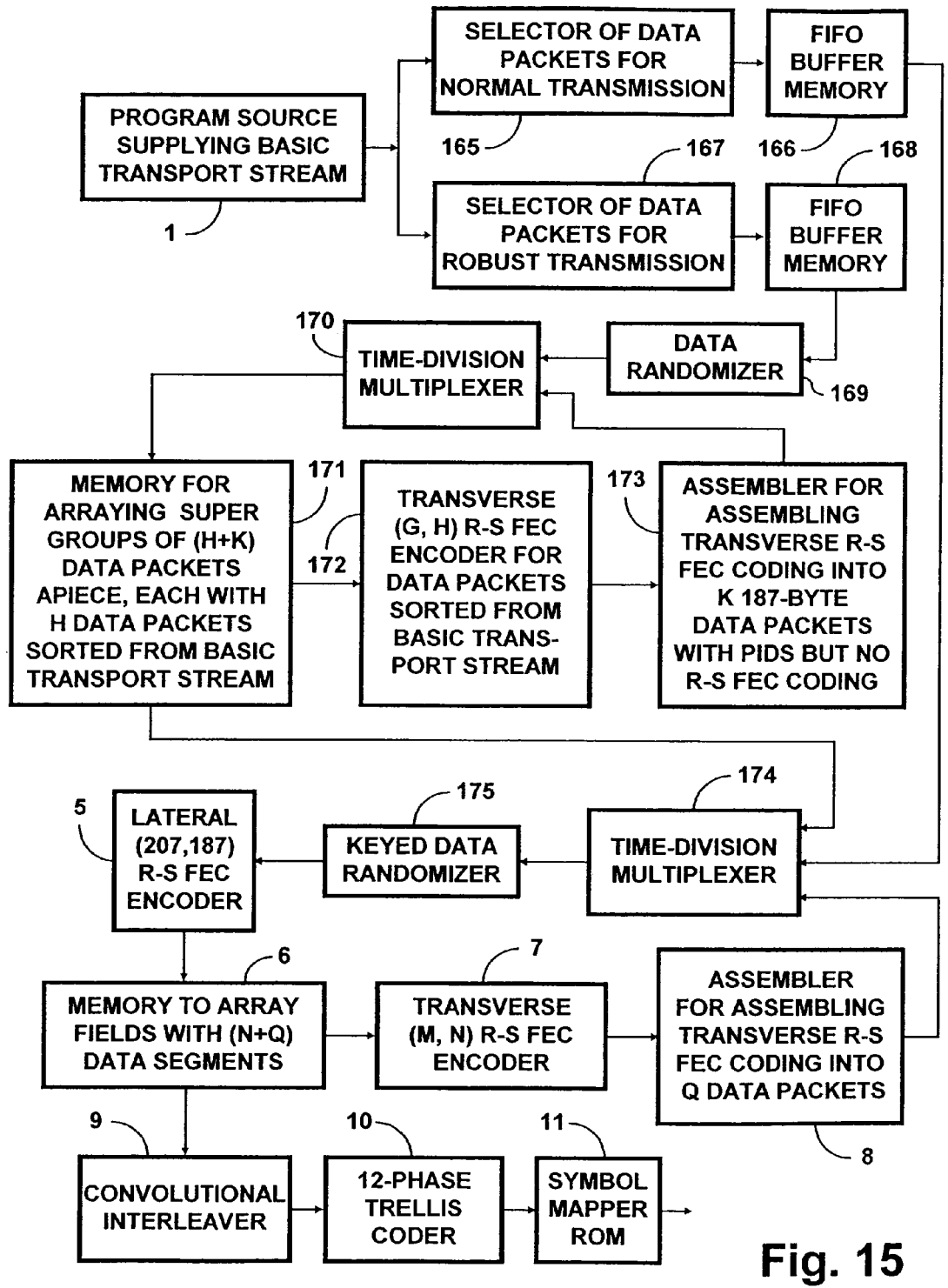
FIG. 15 is a schematic diagram of a modification made to the FIG. 1 transmitter for enabling transmission of a robust DTV signal together with an even more robust "super-robust" signal.

FIG. 15 shows how the FIG. 1 DTV transmitter is modified for transmitting its robust DTV signal together with a super-robust signal, such as the audio component of the primary DTV signal or a signal unrelated to the primary DTV signal. The elements 165, 166, 167, 168, 169, 170, 171, 172 and 173 in the FIG. 15 DTV transmitting apparatus are similar respectively, both in structure and in operation, to the elements 65, 66, 67, 68, 69, 70, 71, 72 and 73 in the FIG. 14 DTV transmitter. The two-input time-division multiplexer 74 and the keyed data-randomizer 75 of the FIG. 14 DTV transmitter are respectively replaced by a three-input time-division multiplexer 174 and by a keyed data-randomizer 175 in the FIG. 15 DTV transmitting apparatus. These replacements are made to accommodate additional transverse R-S FEC coding using methods similar to those used in the FIG. 1 DTV transmitter.

More particularly, the program source 1 supplies the basic transport stream in 187-byte data packets to a transport stream de-multiplexer in FIG. 15. The transport stream de-multiplexer comprises a selector 165 connected for selecting those data packets that are the basis for the robust transmission to a FIFO buffer memory 166 for temporary storage therein. The transport stream de-multiplexer further comprises a selector 167 for selecting those data packets that are the basis for an even more robust "super-robust" transmission to a FIFO buffer memory 168 for temporary storage therein. A data randomizer 169 is connected for randomizing data packets read from the FIFO buffer memory 168 and supplying the randomized data packets to a time-division multiplexer 170 as a first of its two input signals. The time-division multiplexer 170 is connected for supplying 187-byte packets to be written into a banked random-access memory 171, which stores one 8-bit byte of code plus any byte extensions at each of its addressed storage locations. The RAM 171 has enough addressed storage locations to store at least two successive super groups of (H+K) 187-byte data packets apiece After H successive data packets for more robust transmission have been written into a bank of the RAM 171, read addressing is applied to this bank. This read addressing scans these H successive data segments in transverse direction to read H-byte transverse data segments to a transverse (G, H) Reed-Solomon forward-error-correction encoder 172. A data assembler 173 assembles the resulting transverse R-S FEC coding from the transverse R-S FEC encoder 172 into K 187-byte data packets that comply with the MPEG-2 standard except for not having an initial sync byte. The data assembler 173 supplies each of these K packets with a 3-byte header that includes an identifying PID and a continuity count. The data assembler 173 is connected for supplying these K packets to the time-division multiplexer 170 as a second of its two input signals. The time-division multiplexer 170 forwards these 187-byte data packets to the RAM 171 for being written into a bank of the RAM 171 to complete the super group that is temporarily stored therein. The (H+K) data packets in this completed super group are then read seriatim from that bank of the RAM 171 at appropriate intervals. Preferably, the K data packets containing transverse R-S FEC coding are read from the RAM 171 before the H data packets containing the payload data selected for robust transmission.

The three-input time-division multiplexer 174 is connected for supplying 187-byte data packets to the keyed data-randomizer 175. The keyed data-randomizer 175 is connected for receiving the output signal of the time-division multiplexer 174 and for supplying the lateral (207, 187) R-S FEC encoder 5 with selectively randomized response to the output signal of the time-division multiplexer 174. The encoder 5 appends twenty bytes of lateral Reed-Solomon forward-error-correction code to the conclusion of each of the 187-byte packets it supplies for writing into the random-access memory 6. The RAM 6 stores one 8-bit byte of code plus any byte extensions at each of its addressed storage locations and has enough addressed storage locations to store at least two successive super groups of (N+Q) data segments. After a number N successive data segments of the basic transport stream that will appear in a super group have been written into a bank of the RAM 6, read addressing is applied to this bank for scanning these N successive data segments in transverse direction. This is done to read N-byte transverse data segments to the transverse (M, N) Reed-Solomon forward-error-correction encoder 7. The data assembler 8 assembles the resulting transverse R-S FEC coding from the transverse R-S FEC encoder 7 into Q data packets that comply with the MPEG-2 standard except for not having an initial sync byte. The data assembler 8 supplies each of these packets with a 3-byte header including an identifying PID and a continuity count. The remaining 184 bytes of each of these packets are parity bytes from the transverse R-S FEC coding. The Q data segments containing parity bytes generated by the transverse R-S FEC encoder 7 are routed through the time-division multiplexer 174 and the keyed data-randomizer 175 to be written into the bank of the RAM 6, for completing the super group temporarily stored therein. The completed super group is then read from the RAM 6 to the convolutional interleaver 9. The portion of the FIG. 15 DTV transmitting apparatus comprising the elements 9 through 15 corresponds to the portion of the FIG. 1 DTV transmitter comprising the elements 9 through 15, although elements 12 through 15 are not explicitly shown in FIG. 15.

The FIFO buffer memory 166 is connected for supplying randomized normal-transmission data packets to the time-division multiplexer 174 as a first of its three input signals. The time-division multiplexer 174 is connected for receiving robust-transmission data packets read from the RAM 71 as a second of its three input signals. The data assembler 8 is connected for packets of parity bytes from the transverse R-S FEC coder 7 to the time-division multiplexer 174 as a third of its three input signals. The keyed data-randomizer 175 randomizes the normal-transmission data packets that the time-division multiplexer 174 relays from the FIFO buffer memory 166 readout. The keyed data-randomizer 175 randomizes the 3-byte headers of packets containing parity bytes from transverse R-S FEC coding, but relays without modification the 184-byte payload portions of these packets. The keyed data-randomizer 175 relays the data packets that were previously randomized by the data-randomizer 169 to the lateral R-S FEC encoder 5 without modification of those data packets.

Figure 16A:
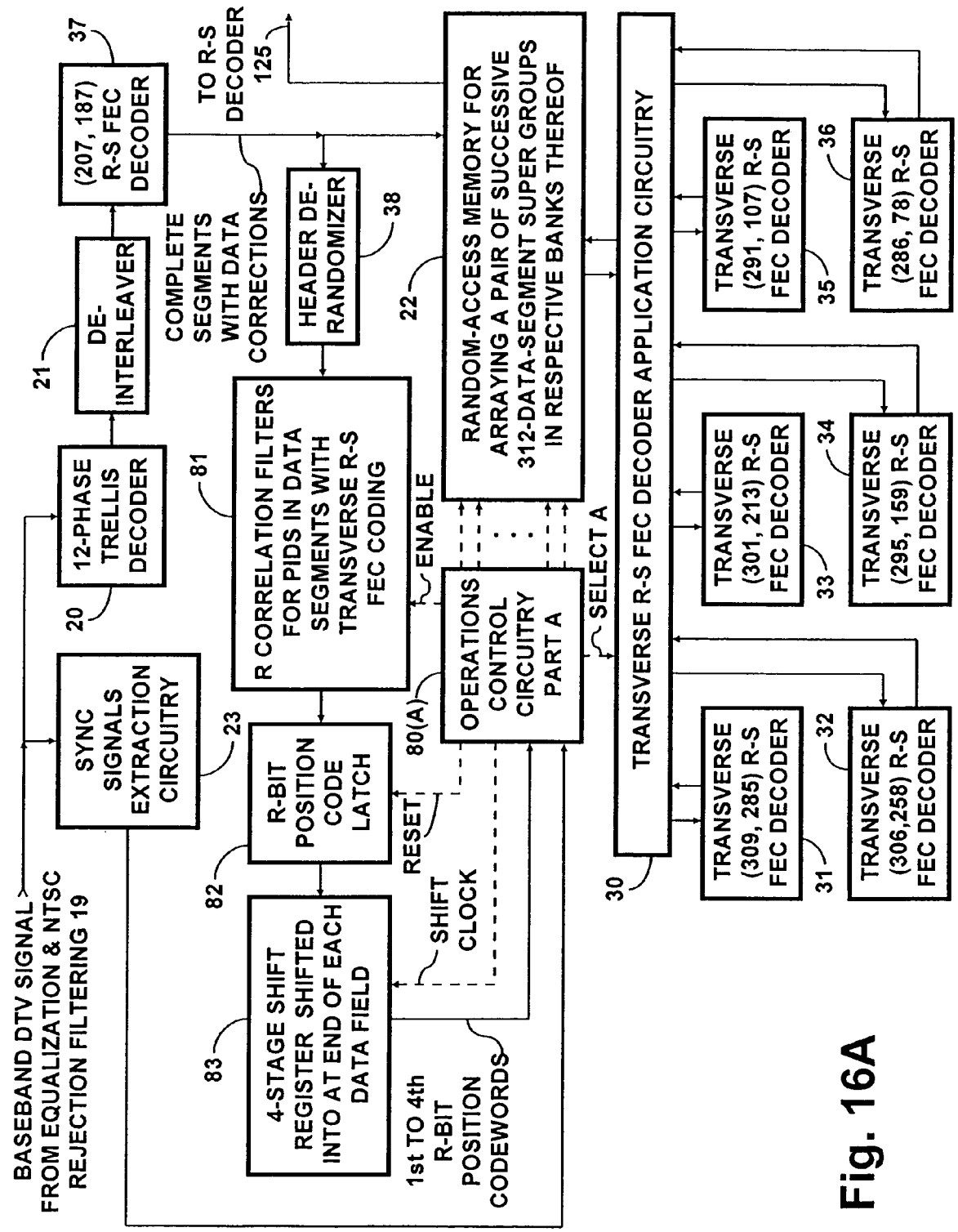
FIGS. 16A and 16B combine to form a FIG. 16 schematic diagram of a modified FIG. 4 DTV receiver capable of receiving DTV signals using transverse Reed-Solomon forward-error-correction codes that traverse complete data fields, as transmitted by transmitting apparatus of types as shown in FIGS. 14 and 15.
Figure 16B:
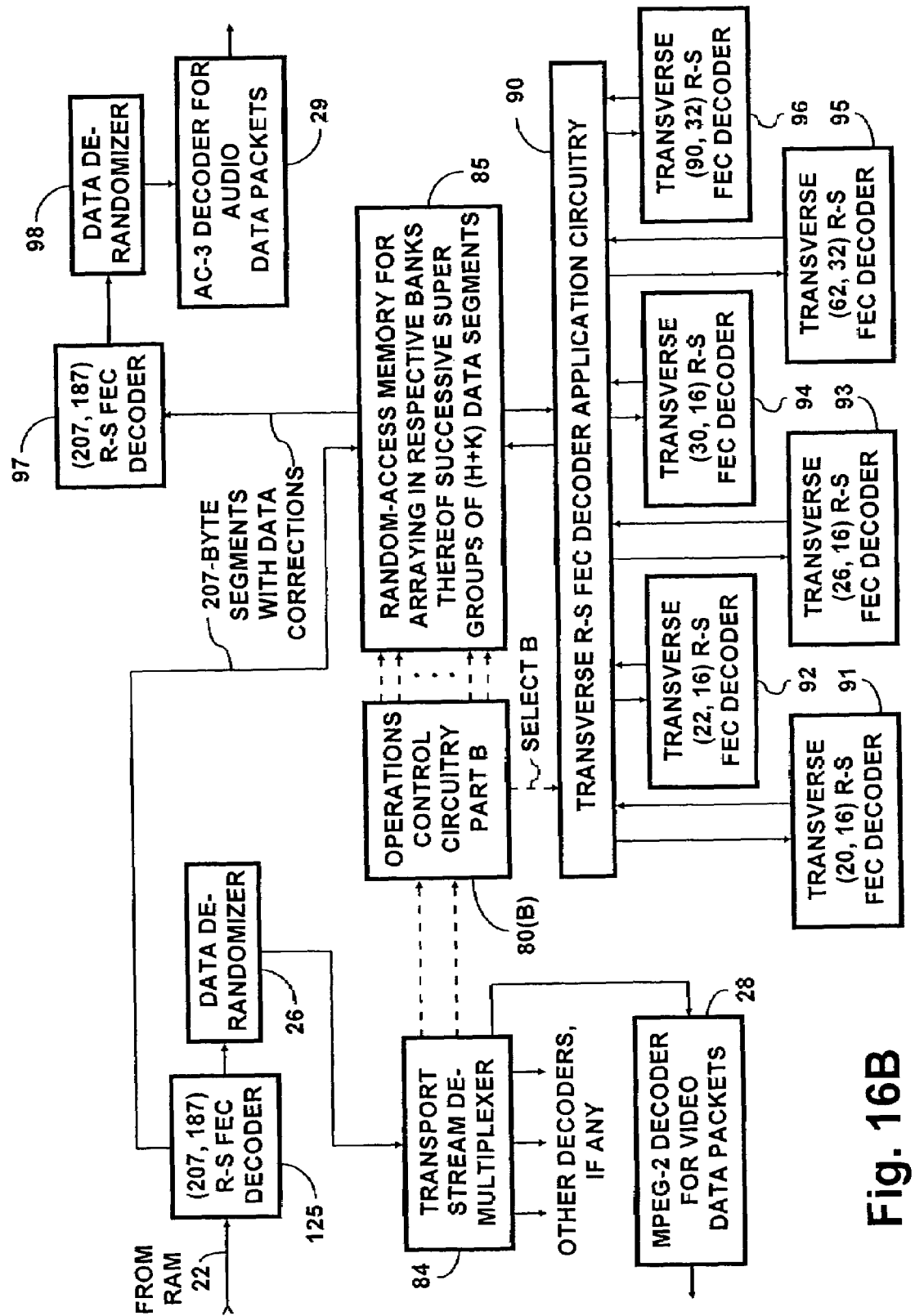

FIGS. 16A and 16B combine to form FIG. 16 showing modifications of the FIG. 4 DTV receiver. Accordingly, in many respects, the circuitry shown in FIG. 16A resembles the FIG. 6 modifications of the FIG. 4 DTV receiver. The FIG. 16A portion of the modified FIG. 4 DTV receiver provides for the reception of robust DTV signals which employ transverse Reed-Solomon forward-error-correction codes that traverse full data fields and are transmitted by a type of transmitter shown in FIG. 1. The FIG. 16 modifications permit reception of robust DTV signals that include super-robust audio component signals as transmitted by the transmitting apparatus of FIG. 15. The FIG. 16 modifications also permit reception of DTV signals with robust audio component signals as transmitted by the FIG. 14 DTV transmitter.

However, operations control circuitry 80 replaces the operations control circuitry 24 shown in FIGS. 4, 5 and 6. FIGS. 16A and 16B show the operations control circuitry 80 as comprising parts 80(A) and 80(B), which is an artifice used in the drawings to avoid running numerous connections from elements shown in FIG. 16A to elements shown in FIG. 16B. The operations control circuitry 80 is more complicated than the operations control circuitry 24. The operations control circuitry 80 performs further tasks, in addition to providing for the reading and writing of the RAM 22 to implement transverse R-S FEC decoding of robust DTV signals as transmitted by a transmitter of the type shown in FIG. 1 or shown in FIG. 15.

FIG. 16A shows transverse R-S FEC decoder application circuitry 30 connected for receiving position code forwarded from the operations control circuitry 80(A) as a SELECT A signal. In response to the SELECT A signal, the transverse R-S FEC decoder application circuitry 30 selects one of the transverse R-S FEC decoders 31–36 for implementing transverse R-S FEC decoding of an entire data field of data segments temporarily stored in one bank of the RAM 22. FIG. 16A shows correlation filters 81, R in number, which are connected for receiving as their respective input signals the de-randomized PIDs from the PID de-randomizer 38. The correlation filters 81 comprise the correlation filters 39 (not explicitly shown in FIG. 16A), L in number, which generate spike responses to respective ones of the PIDs identifying data segments containing transverse R-S FEC coding that spans a full data field. The correlation filters 81 comprise further correlation filters, which generate spike responses to respective ones of the PIDs identifying data segments containing transverse R-S FEC coding descriptive of more robust audio data transmission or other specific more robust data transmission. FIG. 16A shows a position code latch 82 and a four-stage shift register 83 for position code from the position code latch 82. These replace the position code latch 40 and the single-stage shift register 41 for position code from the position code latch 40 that are shown in FIG. 6. The position code latch 82 is capable of temporarily storing the position code with more bits that results from the correlation filters 81 including further correlation filters besides the correlation filters 39.

The four-stage shift register 83 temporarily stores each successive position codeword for four data fields, and the position codewords stored in the four-stage shift register 83 are supplied to the operations control circuitry 80(A) for its use in determining the operations it is to perform. Increasing the number of stages in the shift register 83 simplifies keeping track of different cycles of robust audio transmission that overlap each other when "shingled" operation is employed. The four bits that succeed the PID of a data packet that contains parity bytes of transverse R-S FEC code can be used as a PID extension that identifies the cycle of robust transmission that data packet belongs to.

The position codeword from the position-code latch 82 contains a ONE from the bit latch for one of the correlation filters 81 that generates spike responses to the PIDs of the data segments that contain the transverse R-S FEC coding of a specific type. The position codeword from the position-code latch 82 contains ZEROes from the bit latches for the other ones of the correlation filters 81 that do not generate spike responses because the PIDs those correlation filters 81 respond to are not present in the current data field. The position-code latch 82 retains the position codeword until the beginning of the next data field, at which time responsive to a SHIFT CLOCK signal the position codeword is shifted into the shift register 83 for temporary storage throughout the following four data field intervals. Then, the position-code latch 82 is reset to an all-ZERO condition responsive to a RESET signal. The SHIFT CLOCK and RESET signals are generated by circuitry within the operations control circuitry 80 responsive to the count from the counter circuitry also within the operations control circuitry 80.

Each of the position codewords temporarily stored in one of the stages of the shift register 83 has first and second portions. The first portion of each position codeword consists of the bits generated by those of the correlation filters 81 that detect PIDS of data segments containing transverse R-S FEC coding for robust transmissions each of which completes an entire cycle of itself within the same data field. The operations control circuitry 80 responds to the first portion of the position codeword stored in the first stage of the shift register 83 to implement transverse R-S FEC decoding of such a robust transmission. This transverse R-S FEC decoding is done in circuitry shown in FIG. 16A. The second portion of each position codeword consists of the bits generated by those of the correlation filters 81 that detect PIDS of data segments containing transverse R-S FEC coding for more robust transmissions each of which requires more than one data field to complete an entire cycle of itself. The operations control circuitry 80 responds to the second portion of the position codeword stored in the second stage of the shift register 83 to implement transverse R-S FEC decoding of such a more robust transmission. This transverse R-S FEC decoding is done in circuitry shown in FIG. 16B.

The transverse R-S FEC decoding done in circuitry shown in FIG. 16A is similar to that done in the FIG. 6 circuitry. However, the operations control circuitry 80 ORs the bits of the first portion of the position codeword from the first stage of the four-stage shift register 83. This OR operation generates an indication of whether or not a robust transmission that completes an entire cycle thereof within the same data field is being received.

If all the bits in the first portion of the position codeword are ZEROes, these bits OR to ZERO. This indicates to the operations control circuitry 80 that a robust transmission that completes an entire cycle of itself within the same data field was not written into the RAM 22 during the previous data field. Responsive to this information the operations control circuitry 80 foregoes the scanning of storage locations in the bank of the RAM 22 temporarily storing the last data field received, which scanning would be done to implement transverse R-S FEC decoding. This saves some power consumption in the DTV receiver. The operations control circuitry 80 supplies a control signal to the transverse R-S FEC decoder application circuitry 30, all the bits of which control signal are ZEROes. This forestalls the transverse R-S FEC decoder application circuitry 30 selecting any of the transverse R-S FEC decoders 31–36 to perform transverse R-S FEC decoding.

If one of the bits in the first portion of the position codeword held in the first stage of the shift register stage 83 is a ONE, these bits OR to ONE. This indicates to the operations control circuitry 80 that a robust transmission that completes an entire cycle of itself within the same data field was written into the RAM 22 during the previous data field. Accordingly, the operations control circuitry 80 scans storage locations in the bank of the RAM 22 temporarily storing the last data field received, to implement transverse R-S FEC decoding. The operations control circuitry 80 forwards the first portion of the position codeword held in the first stage of the shift register stage 83 to the transverse R-S FEC decoder application circuitry 30 as the control signal therefor. The transverse R-S FEC decoder application circuitry 30 is accordingly conditioned for selecting the correct one of the transverse R-S FEC decoders 31–36 to perform transverse R-S FEC decoding. After any transverse R-S FEC decoding to be done on a data field by the transverse R-S FEC decoders 31–36 is completed or is found not to be necessary, the segments of that data field are read seriatim from the RAM 22 to a lateral (207, 187) R-S FEC decoder 125 shown in FIG. 16B.

The (207, 187) R-S FEC decoder 125 performs lateral Reed-Solomon forward-error-correction. The R-S FEC decoder 125 resets the Transport Error Indicator bit in each data packet to indicate whether or not it contains byte errors that remain uncorrected. The (207, 187) R-S FEC decoder 125 supplies each 187-byte data packet to the data de-randomizer 26. The data de-randomizer 26 is connected for supplying de-randomized 187-byte data packets to a transport stream de-multiplexer 84, which responds to the PIDs in the data packets for sorting them to appropriate packet decoders. As in the FIG. 5 DTV receiver, video data packets are sorted to an MPEG-2 decoder 28 in the portion of the DTV receiver shown in FIG. 16B.

The (207, 187) R-S FEC decoder 125 supplies a banked random-access memory 85 with corrected 207-byte data segments each of which includes a respective 187-byte data packet as supplied to the data de-randomizer 26 and further includes twenty parity bytes of lateral (207, 187) R-S FEC coding. The RAM 85 is conditioned for writing into one of its banks those 207-byte data segments that include either audio data packets or data packets containing bytes of transverse R-S FEC coding for robust audio transmission appearing in the data de-randomizer 26 response. The transport stream de-multiplexer 84 supplies the operations control circuitry 80(B) with information concerning the PIDs of these data packets. This information includes information concerning the 4-bit PID extension that succeeds the PID of a data packet containing bytes of transverse R-S FEC coding for robust audio transmission. This information combined with the position codewords stored in the shift register 83 enables the operations control circuitry 80(B) to direct the writing of audio data packets and data packets containing bytes of transverse R-S FEC coding for robust audio transmission to the appropriate bank of the RAM 85. This is important for implementing "shingled" robust audio transmissions.

The RAM 85 stores one 8-bit byte of data, plus any extension or extensions thereof, at each of its addressed storage locations. The RAM 85 has enough addressed storage locations to store at least two successive ones of the largest super groups of data packets associated with robust audio transmission. The writing and reading operations of the banked RAM 85 are similar to those of the banked RAM 62 of the FIG. 12 DTV receiver described earlier in this specification.

The processing of the baseband DTV signal after it is read from the RAM 22 is governed by the second portion of the position codeword stored in the second stage of the shift register 83. This second portion concerns possible robust transmissions each of which takes more than one data field to complete an entire cycle of itself. A cycle of DTV signal that mixes data segments associated with robust transmission and data segments not associated with robust transmission is read from the RAM 22, beginning in the second data field after the PID of a data segment containing transverse R-S FEC coding from that cycle is detected by one of the correlation filters 81. The detection of this PID is memorialized in the second portion of the position codeword stored in the second stage of the shift register 83.

The operations control circuitry 80 responds to the second portion of the position codeword stored in the second stage of the shift register 83 to generate prescribed patterns of writing to and reading from the RAM 85. These prescribed patterns are stored within internal memory of the operations control circuitry 80. A prescribed pattern of write addressing is generated for the bank of the RAM 85 that currently assembles a super group from data packets that the transport stream de-multiplexer 84 supplies for writing the RAM 85. This bank of the RAM 85 is written into, a data byte at a time, with the bytes being written to addressed storage locations some of which have previously had error-corrected bytes read therefrom. The prescribed pattern of write addressing extends over a number of data fields, depending on the type of transverse R-S FEC decoding used for the robust audio transmission. In designs in which the previous reading of storage locations is done immediately before their respective writing, pursuant to a read-then-write operation, the read addressing is a portion of the write addressing. In designs in which the previous reading of error-corrected bytes from storage locations is done well before those storage locations are re-written, the pattern of read addressing still corresponds to a portion of the prescribed pattern of write addressing. However, the pattern of read addressing begins soon after transverse R-S error-correction procedures are completed.

A prescribed pattern of transverse read and write addressing is generated for the bank of the RAM 85 involved in the transverse R-S FEC decoding procedure. The transverse read addressing implements reading a byte stream from each transverse path through the super group to a selected transverse R-S FEC decoder via transverse R-S FEC decoder application circuitry 90 that selects that decoder. The transverse write addressing implements writing back to its original addressed storage locations the byte stream that after error correction is returned from the selected transverse R-S FEC decoder via the transverse R-S FEC decoder application circuitry 90.

The operations control circuitry 80(B) generates a SELECT B signal responsive to the second portion of the position codeword supplied from the second stage of the shift register 83 at the beginning of the cycle of robust audio transmission. Until that cycle of robust audio transmission concludes, the operations control circuitry 80(B) continues to supply that SELECT B signal, which the transverse R-S FEC decoder application circuitry 90 is connected to receive as its control signal. The transverse R-S FEC decoder application circuitry 90 is conditioned by the SELECT B signal to select one of a plurality of transverse R-S FEC decoders for implementing transverse R-S FEC decoding of data segments temporarily stored in the RAM 85. The second portion of the position codeword forwarded to the transverse R-S FEC decoder application circuitry 90 as the SELECT B signal can memorialize detection of the PID identifying a transmitter broadcasting with (20, 16) transverse R-S FEC coding of audio. The transverse R-S FEC decoder application circuitry 90 responds to this SELECT B signal to select the (20, 16) transverse R-S FEC decoder 91 for correcting byte errors in each of the transverse code paths that are scanned. If the SELECT B signal memorializes detection of the PID identifying broadcasting with (22, 16) transverse R-S FEC coding of audio, the transverse R-S FEC decoder application circuitry 90 responds to select the (22, 16) transverse R-S FEC decoder 92 for correcting byte errors. If the SELECT B signal memorializes detection of the PID identifying broadcasting with (26, 16) transverse R-S FEC coding of audio, the transverse R-S FEC decoder application circuitry 90 responds to select the (26, 16) transverse R-S FEC decoder 93 for correcting byte errors. If the SELECT B signal memorializes detection of the PID identifying broadcasting with (30, 16) transverse R-S FEC coding of audio, the transverse R-S FEC decoder application circuitry 90 responds to select the (30, 16) transverse R-S FEC decoder 94 for correcting byte errors. If the SELECT B signal memorializes detection of the PID identifying broadcasting with (62, 32) transverse R-S FEC coding of audio, the transverse R-S FEC decoder application circuitry 90 responds to select the (62, 32) transverse R-S FEC decoder 95 for correcting byte errors. If the SELECT B signal memorializes detection of the PID identifying broadcasting with (90, 32) transverse R-S FEC coding of audio, the transverse R-S FEC decoder application circuitry 90 responds to select the (90, 32) transverse R-S FEC decoder 96 for correcting byte errors.

Data segments containing audio data packets that have been processed through the byte-error-correction procedures, using the one of the transverse R-S FEC decoders 91 through 96 selected by the transverse R-S FEC decoder application circuitry 90, are subsequently read from the RAM 85. In some designs this reading from the RAM 85 is part of a read-then-write operation. In other designs, the byte-error-correction procedures on the super group are completed quickly, and this reading is done soon after those byte-error-correction procedures are completed. This reduces the differential delay between video and audio data packets.

It is necessary to determine which of those data segments read from the RAM 85 that contain data packets previously found not to be correctable are correctable after the transverse R-S FEC decoding procedure implemented using the RAM 85. A lateral (207, 187) R-S FEC decoder 97 is connected for receiving those data segments read from the RAM 85. The R-S FEC decoder 97 attempts further byte correction on at least those of the audio data packets with Transport Error Indicator (TEI) bits indicating that they contain byte error. If the byte errors in such an audio data packet are corrected, the TEI bit is reset to remove indication of byte error in the packet. The (207, 187) R-S FEC decoder 97 then supplies the portions of the data segment other than its twenty R-S FEC code parity bytes to a data de-randomizer 98 as a 187-byte data packet. The data de-randomizer 98 is connected for supplying the AC-3 decoder 29 with de-randomized audio data packets. The operation of the data de-randomizer 98 is facilitated by appending to each data segment the number of that segment within the data field. This can be done just after de-interleaving is done, with the number of the segment being carried throughout the R-S FEC decoding procedures and being stored in the RAMs 22 and 85. It is convenient to fit the segment number into the DSS interval preceding the data segment.

Figure 17A:
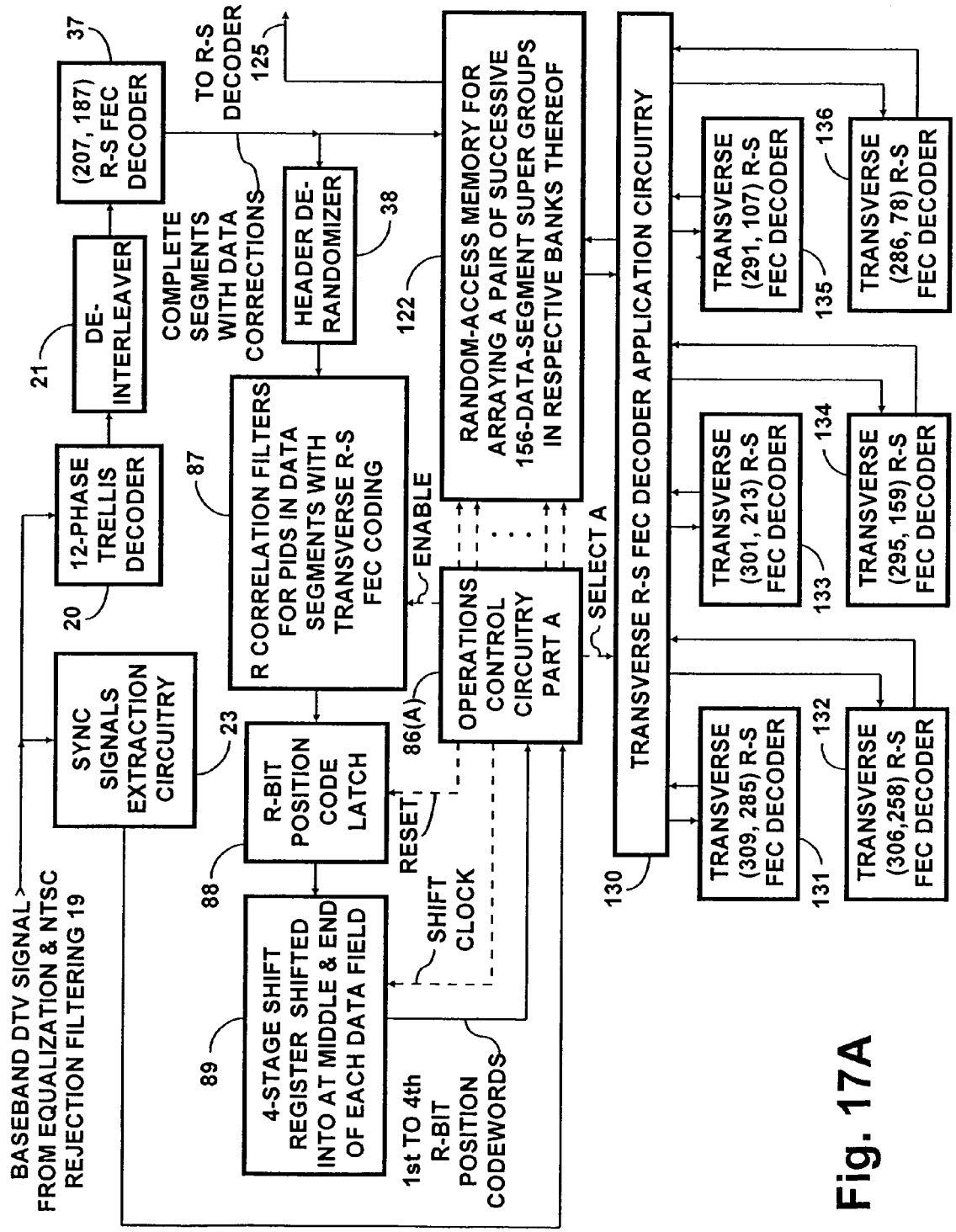
FIGS. 17A and 17B combine to form a FIG. 17 schematic diagram of a modified FIG. 7 DTV receiver capable of receiving DTV signals using transverse Reed-Solomon forward-error-correction codes that traverse half data fields, as transmitted by transmitting apparatus of a types as shown in FIGS. 14 and 15.
Figure 17B:
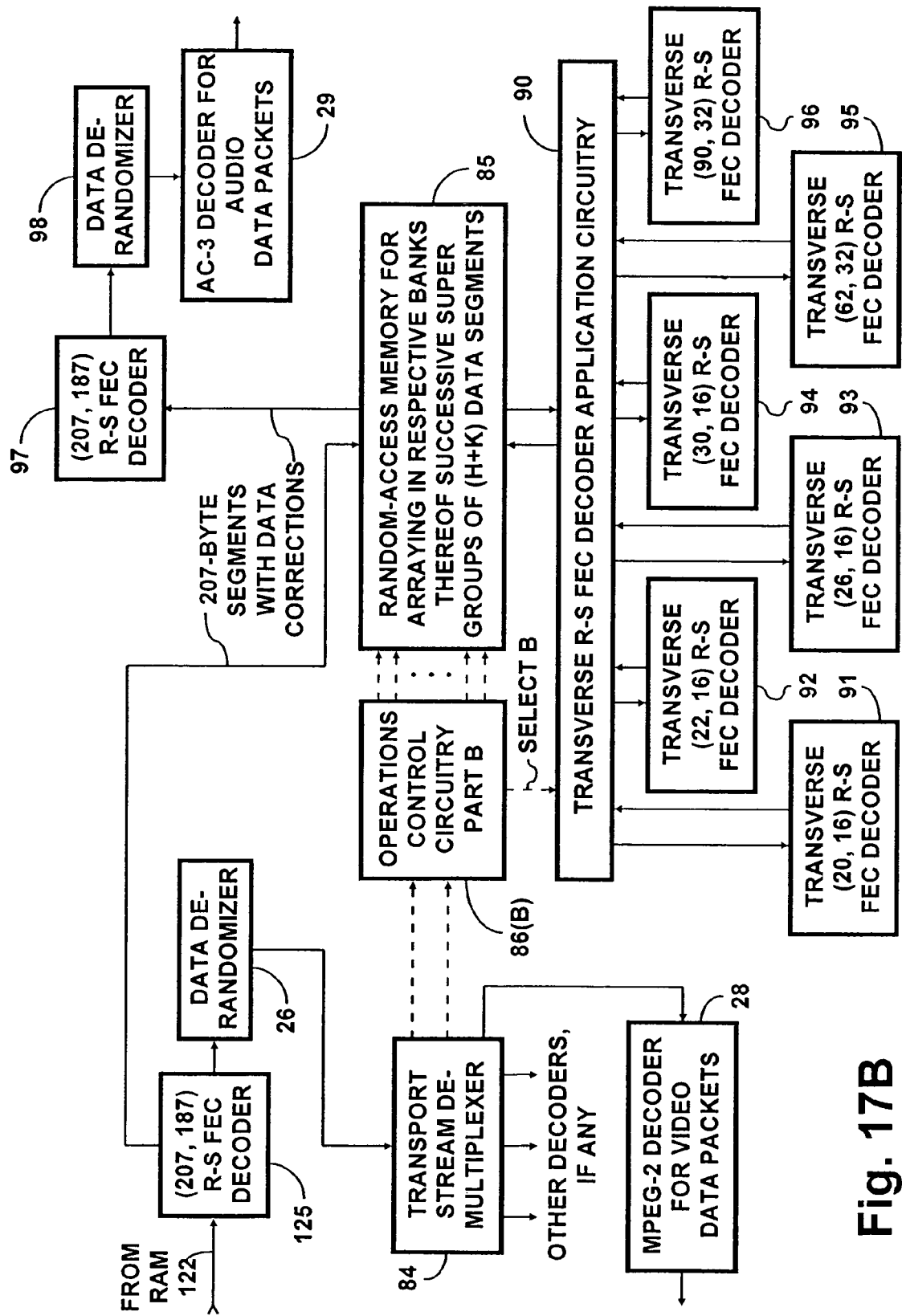

FIGS. 17A and 17B combine to form FIG. 17 showing modifications of the FIG. 7 DTV receiver. Accordingly, in many respects, the circuitry shown in FIG. 17A resembles the FIG. 9 modifications of the FIG. 7 DTV receiver. The FIG. 17A portion of the modified FIG. 7 DTV receiver provides for the reception of robust DTV signals which employ transverse Reed-Solomon forward-error-correction codes that traverse full data fields and are transmitted by a type of transmitter shown in FIG. 1. The FIG. 17 modifications permit reception of robust DTV signals which employ transverse Reed-Solomon forward-error-correction codes that traverse half data fields and which include super-robust audio component signals as transmitted by the transmitting apparatus of FIG. 15. The FIG. 17 modifications also permit reception of DTV signals with robust audio component signals as transmitted by the FIG. 14 DTV transmitter.

However, operations control circuitry 86 replaces the operations control circuitry 124 shown in FIGS. 7, 8 and 9. FIGS. 17A and 17B show the operations control circuitry 86 as comprising parts 86(A) and 86(B), which is an artifice used in the drawings to avoid running numerous connections from elements shown in FIG. 17A to elements shown in FIG. 17B. The operations control circuitry 86 is more complicated than the operations control circuitry 124. The operations control circuitry 86 performs further tasks, in addition to providing for the reading and writing of the RAM 122 to implement transverse RS FEC decoding of robust DTV signals as transmitted by a transmitter of the type shown in FIG. 1 or shown in FIG. 15.

FIG. 17A shows transverse R-S FEC decoder application circuitry 130 connected for receiving position code forwarded from the operations control circuitry 86(A) as a SELECT A signal. In response to the SELECT A signal, the transverse R-S FEC decoder application circuitry 130 selects one of the transverse R-S FEC decoders 131–136 for implementing transverse R-S FEC decoding of half data fields of data segments temporarily stored in one bank of the RAM 122. FIG. 17A shows correlation filters 87, R in number, which are connected for receiving as their respective input signals the de-randomized PIDs from the PID de-randomizer 38. The correlation filters 87 comprise the correlation filters 139 (not explicitly shown in FIG. 17A), L in number, which generate spike responses to respective ones of the PIDs identifying data segments containing transverse R-S FEC coding that spans half a data field. The correlation filters 87 comprise further correlation filters, which generate spike responses to respective ones of the PIDs identifying data segments containing transverse R-S FEC coding descriptive of more robust audio data transmission or other specific more robust data transmission. FIG. 16A shows a position code latch 88 and a four-stage shift register 89 for position code from the position code latch 88. These replace the position code latch 140 and the single-stage shift register 141 for position code from the position code latch 10 that are shown in FIG. 9. The position code latch 88 is capable of temporarily storing the position code with more bits that results from the correlation filters 87 including further correlation filters besides the correlation filters 139.

The four-stage shift register 89 temporarily stores each successive position codeword for two data fields, and the position codewords stored in the four-stage shift register 89 are supplied to the operations control circuitry 86(A) for its use in determining the operations it is to perform. Increasing the number of stages in the shift register 89 simplifies keeping track of different cycles of robust audio transmission that overlap each other when "shingled" operation is employed. The four bits that succeed the PID of a data packet that contains parity bytes of transverse R-S FEC code can be used as a PID extension that identifies the cycle of robust transmission that data packet belongs to.

The position codeword from the position-code latch 88 contains a ONE from the bit latch for one of the correlation filters 87 that generates spike responses to the PIDs of the data segments that contain the transverse R-S FEC coding of a specific type. The position codeword from the position-code latch 88 contains ZEROes from the bit latches for the other ones of the correlation filters 87 that do not generate spike responses because the PIDs those correlation filters 87 respond to are not present in the current data field. The position-code latch 86 retains the position codeword until the beginning of the next half data field, at which time responsive to a SHIFT CLOCK signal the position codeword is shifted into the shift register 89 for temporary storage throughout the following two data field intervals. Then, the position-code latch 88 is reset to an all-ZERO condition responsive to a RESET signal. The SHIFT CLOCK and RESET signals are generated by circuitry within the operations control circuitry 86 responsive to the count from the counter circuitry also within the operations control circuitry 86.

Each of the position codewords temporarily stored in one of the stages of the shift register 89 has first and second portions. The first portion of each position codeword consists of the bits generated by those of the correlation filters 87 that detect PIDS of data segments containing transverse R-S FEC coding for robust transmissions each of which completes an entire cycle of itself within the same half data field. The operations control circuitry 86 responds to the first portion of the position codeword stored in the first stage of the shift register 89 to implement transverse R-S FEC decoding of such a robust transmission. This transverse R-S FEC decoding is done in circuitry shown in FIG. 17A. The second portion of each position codeword consists of the bits generated by those of the correlation filters 87 that detect PIDS of data segments containing transverse R-S FEC coding for more robust transmissions each of which requires more than one data field to complete an entire cycle of itself. The operations control circuitry 86 responds to the second portion of the position codeword stored in the second stage of the shift register 89 to implement transverse R-S FEC decoding of such a more robust transmission. This transverse R-S FEC decoding is done in circuitry shown in FIG. 17B.

The transverse R-S FEC decoding done in circuitry shown in FIG. 17A is similar to that done in the FIG. 6 circuitry. However, the operations control circuitry 86 ORs the bits of the first portion of the position codeword from the first stage of the four-stage shift register 89. This OR operation generates an indication of whether or not a robust transmission that completes an entire cycle thereof within the same half data field is being received.

If all the bits in the first portion of the position codeword are ZEROes, these bits OR to ZERO. This indicates to the operations control circuitry 86 that a robust transmission that completes an entire cycle of itself within the same half data field was not written into the RAM 122 during the previous data field. Responsive to this information the operations control circuitry 86 foregoes the scanning of storage locations in the bank of the RAM 122 temporarily storing the last data field received, which scanning would be done to implement transverse R-S FEC decoding. This saves some power consumption in the DTV receiver. The operations control circuitry 86 supplies a control signal to the transverse R-S FEC decoder application circuitry 130, all the bits of which control signal are ZEROes. This forestalls the transverse R-S FEC decoder application circuitry 130 selecting any of the transverse R-S FEC decoders 131–136 to perform transverse R-S FEC decoding.

If one of the bits in the first portion of the position codeword held in the first stage of the shift register stage 89 is a ONE, these bits OR to ONE. This indicates to the operations control circuitry 86 that a robust transmission that completes an entire cycle of itself within the same half data field was written into the RAM 122 during the previous data field. Accordingly, the operations control circuitry 86 scans storage locations in the bank of the RAM 122 temporarily storing the last half data field received, to implement transverse R-S FEC decoding. The operations control circuitry 86 forwards the first portion of the position codeword held in the first stage of the shift register stage 89 to the transverse R-S FEC decoder application circuitry 130 as the control signal therefor. The transverse R-S FEC decoder application circuitry 130 is accordingly conditioned for selecting the correct one of the transverse R-S FEC decoders 131–136 to perform transverse R-S FEC decoding. After any transverse R-S FEC decoding to be done on a data field by the transverse R-S FEC decoders 131–136 is completed, or is found not to be necessary, the segments of that data field are read seriatim from the RAM 122 to the lateral (207, 187) R-S FEC decoder 125 shown in FIG. 17B.

The (207, 187) R-S FEC decoder 125 performs lateral Reed-Solomon forward-error-correction. The R-S FEC decoder 125 toggles the Transport Error Indicator (TEI) bit in each data packet in which it finds byte errors that still cannot be corrected. The (207, 187) R-S FEC decoder 125 then supplies the portions of the data segment other than its twenty R-S FEC code parity bytes to the data de-randomizer 126 as a 187-byte data packet. The data de-randomizer 126 is connected for supplying de-randomized data to the transport stream de-multiplexer 84, which responds to the PIDs in the data packets for sorting them to appropriate packet decoders. Video data packets are sorted to an MPEG-2 decoder 28.

Audio data packets and data packets containing bytes of transverse R-S FEC coding for robust audio transmission appearing in the data de-randomizer 126 response are written into a banked random-access memory 85. The transport stream de-multiplexer 84 supplies the operations control circuitry 86(B) with information concerning the PIDs of these data packets. This information includes information concerning the 4-bit PID extension that succeeds the PID of a data packet containing bytes of transverse R-S FEC coding for robust audio transmission. This information combined with the position codewords stored in the shift register 89 enables the operations control circuitry 86(B) to write audio data packets and data packets containing bytes of transverse R-S FEC coding for robust audio transmission to the appropriate bank of the RAM 85. This is important for implementing "shingled" robust audio transmissions.

The RAM 85 stores one 8-bit byte of data, plus any extension or extensions thereof, at each of its addressed storage locations. The RAM 85 has enough addressed storage locations to store at least two successive ones of the largest super groups of data packets associated with robust audio transmission. The writing and reading operations of the banked RAM 85 are similar to those of the banked RAM 62 of the FIG. 12 DTV receiver described earlier in this specification.

The processing of the baseband DTV signal after it is read from the RAM 122 is governed by the second portion of the position codeword stored in the second stage of the shift register 89. This second portion concerns possible robust transmissions each of which takes more than half a data field to complete an entire cycle of itself. A cycle of DTV signal that mixes data segments associated with robust transmission and data segments not associated with robust transmission is read from the RAM 122, beginning in the second half data field after the PID of a data segment containing transverse R-S FEC coding from that cycle is detected by one of the correlation filters 87. The detection of this PID is memorialized in the second portion of the position codeword stored in the second stage of the shift register 89.

The operations control circuitry 86 responds to the second portion of the position codeword stored in the second stage of the shift register 89 to generate prescribed patterns of writing to and reading from the RAM 85. These prescribed patterns are stored within internal memory of the operations control circuitry 86. A prescribed pattern of write addressing is generated for the bank of the RAM 85 that currently assembles a super group from data packets that the transport stream de-multiplexer 84 supplies for writing the RAM 85. This bank of the RAM 85 is written into, a data byte at a time, with the bytes being written to addressed storage locations some of which have previously had error-corrected bytes read therefrom. The prescribed pattern of write addressing extends over a number of data fields, depending on the type of transverse R-S FEC decoding used for the robust audio transmission. In designs in which the previous reading of storage locations is done immediately before their respective writing, pursuant to a read-then-write operation, the read addressing is a portion of the write addressing. In designs in which the previous reading of error-corrected bytes from storage locations is done well before those storage locations are re-written, the pattern of read addressing still corresponds to a portion of the prescribed pattern of write addressing. However, the pattern of read addressing begins soon after transverse R-S error-correction procedures are completed.

A prescribed pattern of transverse read and write addressing is generated for the bank of the RAM 85 involved in the transverse R-S FEC decoding procedure. The transverse read addressing implements reading a byte stream from each transverse path through the super group to a selected transverse R-S FEC decoder via transverse R-S FEC decoder application circuitry 90 that selects that decoder. The transverse write addressing implements writing back to its original addressed storage locations the byte stream that after error correction is returned from the selected transverse R-S FEC decoder via the transverse R-S FEC decoder application circuitry 90.

The operations control circuitry 86(B) generates a SELECT B signal responsive to the second portion of the position codeword supplied from the second stage of the shift register 89 at the beginning of the cycle of robust audio transmission. Until that cycle of robust audio transmission concludes, the operations control circuitry 86(B) continues to supply that SELECT B signal, which the transverse R-S FEC decoder application circuitry 90 is connected to receive as its control signal. The transverse R-S FEC decoder application circuitry 90 is conditioned by the SELECT B signal to select one of a plurality of transverse R-S FEC decoders for implementing transverse R-S FEC decoding of data segments temporarily stored in the RAM 85. The second portion of the position codeword forwarded to the transverse R-S FEC decoder application circuitry 90 as the SELECT B signal can memorialize detection of the PID identifying a transmitter broadcasting with (20, 16) transverse R-S FEC coding of audio. The transverse R-S FEC decoder application circuitry 90 responds to this SELECT B signal to select the (20, 16) transverse R-S FEC decoder 91 for correcting byte errors in each of the transverse code paths that are scanned. If the SELECT B signal memorializes detection of the PID identifying broadcasting with (22, 16) transverse R-S FEC coding of audio, the transverse R-S FEC decoder application circuitry 90 responds to select the (22, 16) transverse R-S FEC decoder 92 for correcting byte errors. If the SELECT B signal memorializes detection of the PID identifying broadcasting with (26, 16) transverse R-S FEC coding of audio, the transverse R-S FEC decoder application circuitry 90 responds to select the (26, 16) transverse R-S FEC decoder 93 for correcting byte errors. If the SELECT B signal memorializes detection of the PID identifying broadcasting with (30, 16) transverse R-S FEC coding of audio, the transverse R-S FEC decoder application circuitry 90 responds to select the (30, 16) transverse R-S FEC decoder 94 for correcting byte errors. If the SELECT B signal memorializes detection of the PID identifying broadcasting with (62, 32) transverse R-S FEC coding of audio, the transverse R-S FEC decoder application circuitry 90 responds to select the (62, 32) transverse R-S FEC decoder 95 for correcting byte errors. If the SELECT B signal memorializes detection of the PID identifying broadcasting with (90, 32) transverse R-S FEC coding of audio, the transverse R-S FEC decoder application circuitry 90 responds to select the (90, 32) transverse R-S FEC decoder 96 for correcting byte errors.

Data segments containing audio data packets that have been processed through the byte-error-correction procedures, using the one of the transverse R-S FEC decoders 91 through 96 selected by the transverse R-S FEC decoder application circuitry 90, are subsequently read from the RAM 85 to the lateral (207, 187) R-S FEC decoder 97. The R-S FEC decoder 97 attempts further byte correction on at least those of the audio data packets with TEI bits indicating that they contain byte error. If the byte errors in such an audio data packet are corrected, the TEI bit is reset to remove indication of byte error in the packet. The (207, 187) R-S FEC decoder 97 then supplies the portions of the data segment other than its twenty R-S FEC code parity bytes to the data de-randomizer 98 as a 187-byte data packet. The data de-randomizer 98 is connected for supplying the AC-3 decoder 29 with de-randomized audio data packets.

The FIG. 16 DTV receiving apparatus can be modified in accordance with the receiver design concept used in the FIG. 13 DTV receiver. That is, the transverse R-S FEC decoding of robust audio transmissions can be done working from the RAM 22 rather than employing another RAM 85. The FIG. 17 DTV receiving apparatus can be modified similarly, with the transverse R-S FEC decoding of robust audio transmissions being done working from the RAM 122 rather than employing another RAM 85. The lateral R-S FEC decoder 97 and the data de-randomizer 98 can be dispensed with in such modifications, with their duties being performed instead by the lateral R-S FEC decoder 125 and the data de-randomizer 26. The transport stream de-multiplexer 84 can sort de-randomized audio data packets from the data de-randomizer 26 for application to the AC-3 decoder 29. The advantage of lateral R-S FEC decoding between successive transverse R-S FEC decoding procedures is sacrificed. However, there is less delay in the more robust audio data packets respective to less robust video data packets.

Figure 18:
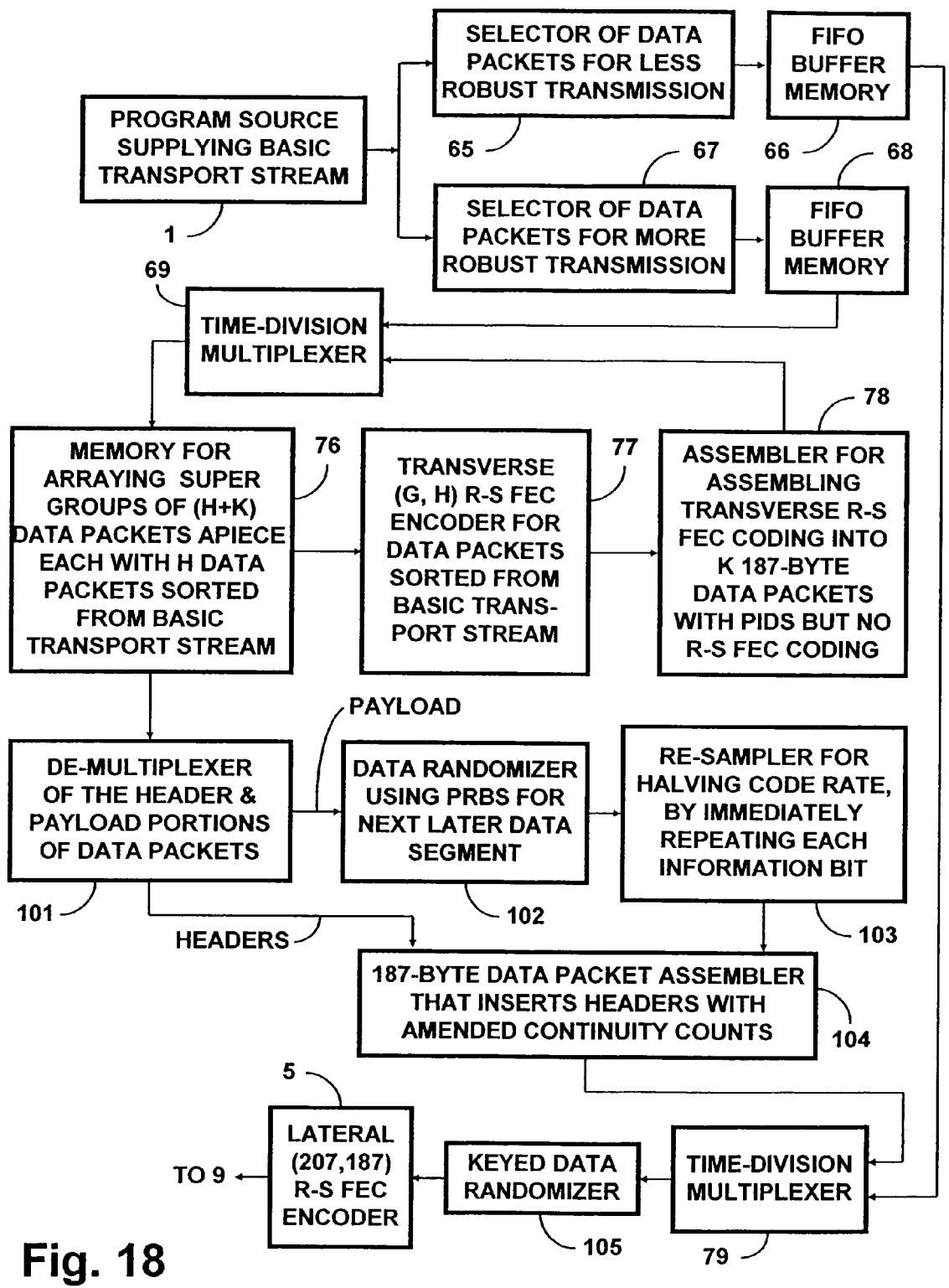
FIG. 18 is a schematic diagram of a modification made to the FIG. 1 transmitter in accordance with an aspect of the invention, which modification permits transmission of a DTV signal including a "super-robust" signal that uses pseudo-2VSB modulation together with transverse Reed-Solomon forward-error-correction coding.

FIG. 18 shows modifications of the FIG. 14 DTV transmitter enabling the transmission of a normal-transmission DTV signal together with a pseudo-2VSB robust-transmission signal. Furthermore, the FIG. 18 modifications permit transverse R-S FEC coding of this robust-transmission signal to make it "super-robust". With these FIG. 18 modifications, the data packets for the robust transmission read from the RAM 71 are not applied directly to the time-division multiplexer 74 as an input signal thereto. A de-multiplexer 101 is connected for separating the 184-byte payload portions of the data packets read from the RAM 71 from their 3-byte headers and for supplying those 184-byte payload portions to a data randomizer 102 as its input signal. The data-randomizer 102 randomizes data in the 184-byte payload portions by exclusive-ORing them with the PRBS that A/53, Annex D, specifies being used 1496 bits (187 bytes) later in time. The data-randomizer 102 supplies the randomized data in its output signal to a re-sampler 103 as its input signal. The re-sampler 103 halves the code rate by immediately repeating each information bit in each 184-byte payload portion, supplying the resulting 368 bytes of modified data to a 187-byte-packet assembler 104. The assembler 104 is connected for supplying 187-byte data packets as input signal for the time-division multiplexer 74, instead of the multiplexer 74 input signal being provided by direct read-out from the RAM 71 as in the FIG. 14 DTV transmitter.

The assembler 104 generates two new headers responsive to each header received from the de-multiplexer 101. Each of the two new headers differs from the old header with regard to continuity count. The continuity count of the old header is multiplied by two and the most significant bit of the resulting product is discarded to generate the continuity count for a first of the new headers. The continuity count of the first of the new headers is incremented by one to generate the continuity count for the second of the new headers. The assembler 104 appends the initial 192 of the 368 bytes of modified data to the first of the new headers to generate a 187-byte packet supplied as input signal to the time-division multiplexer 74. The assembler 104 appends the final 192 of the 368 bytes of modified data to the second of the new headers to generate the next 187-byte packet supplied as input signal to the time-division multiplexer 74.

Another FIG. 18 modification of the FIG. 14 transmitter replaces the data randomizer 75 with a keyed data randomizer 105 connected for supplying input signal to the lateral (207, 187) R-S FEC encoder 5. The remaining portion of the FIG. 10 transmitter modified per FIG. 18 comprises the elements 5 through 15, connected without further modification and operated as in the unmodified FIG. 14 transmitter. The keyed data randomizer 105 selectively omits randomization of the payloads of the data packets that the assembler 104 supplies, so the data therein will cause pseudo-2VSB symbols to be generated in the trellis coding procedure performed by the 12-phase trellis coder 10. The keyed data randomizer 105 does randomize the bits of the 3-byte headers payloads of the data packets that the assembler 104 supplies, however.

Figure 19:
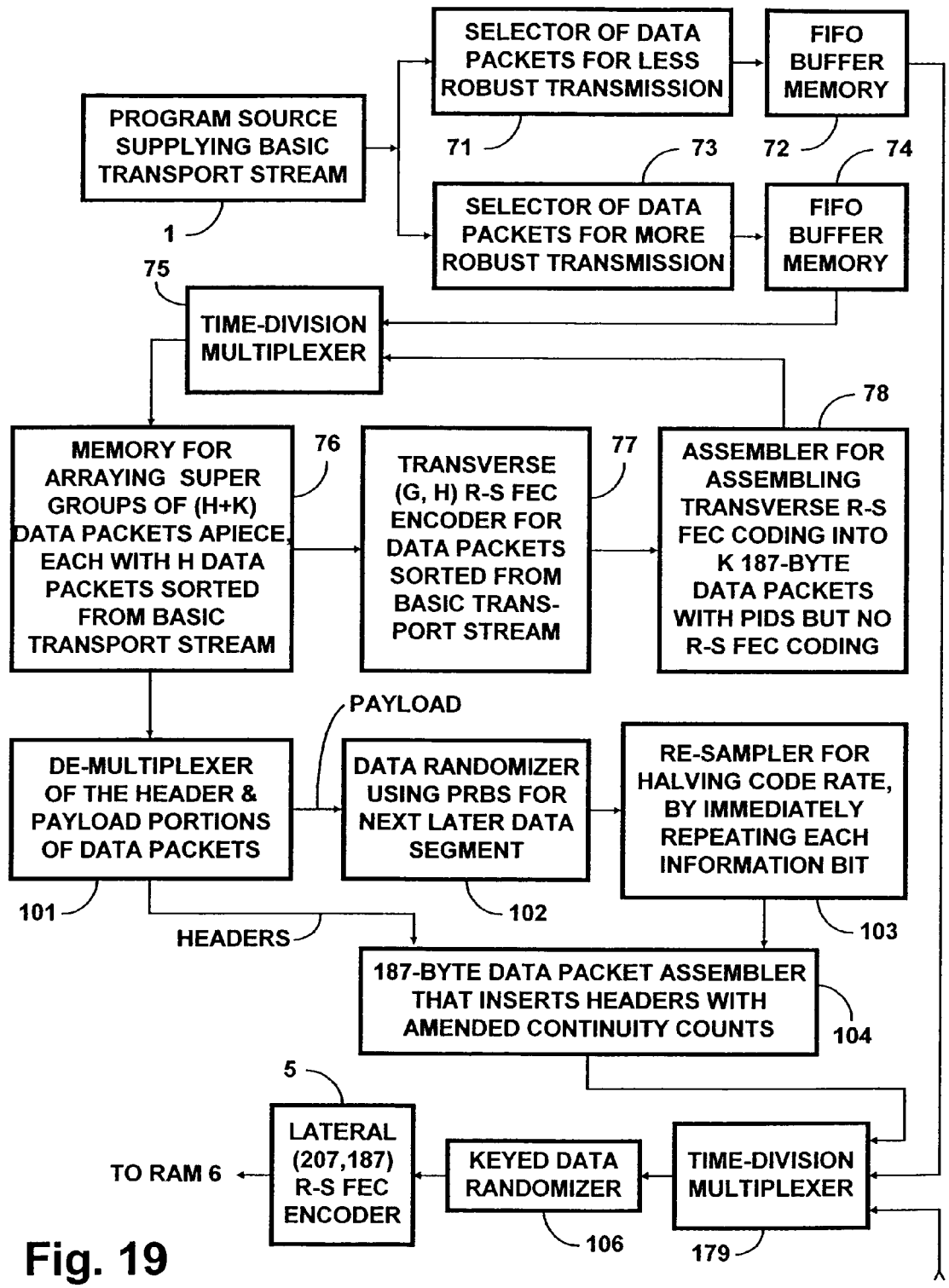
FIG. 19 is a schematic diagram of a modification made to the FIG. 1 transmitter, which modification permits transmission of a robust DTV signal including an even more robust "super-robust" signal that uses pseudo-2VSB modulation together with transverse Reed-Solomon forward-error-correction coding.

FIG. 19 shows modifications of the FIG. 15 transmitting apparatus enabling the transmission of a robust-transmission DTV signal together with an even more robust "super-robust" signal that uses pseudo-2VSB modulation. With these FIG. 19 modifications the data packets for the super-robust transmission read from the RAM 71 are not applied directly to the time-division multiplexer 81 as an input signal thereto. Instead, the data packets for the super-robust transmission read from the RAM 71 are supplied to circuitry comprising elements 101, 102, 103 and 104 connected similarly to corresponding elements in FIG. 18. The time-division multiplexer 174 receives an input signal from the assembler 104 in place of the input signal received directly from the RAM 71 in the FIG. 15 transmitting apparatus.

Another FIG. 19 modification of the FIG. 11 transmitting apparatus replaces the keyed data randomizer 4 with a keyed data randomizer 106 connected for supplying input signal to the lateral (207, 187) R-S FEC encoder 5. Like the keyed data randomizer 4, the keyed data randomizer 106 selectively omits randomization of the payloads of the data packets that the assembler 8 supplies. Furthermore, like the keyed data randomizer 105, the keyed data randomizer 106 selectively omits randomization of the payloads of the data packets that the assembler 104 supplies. The remaining portion of the transmitter modified per FIG. 19 comprises the elements 5 through 15, connected without further modification and operated as in the transmitter containing unmodified FIG. 10 transmitting apparatus.

Figure 20:
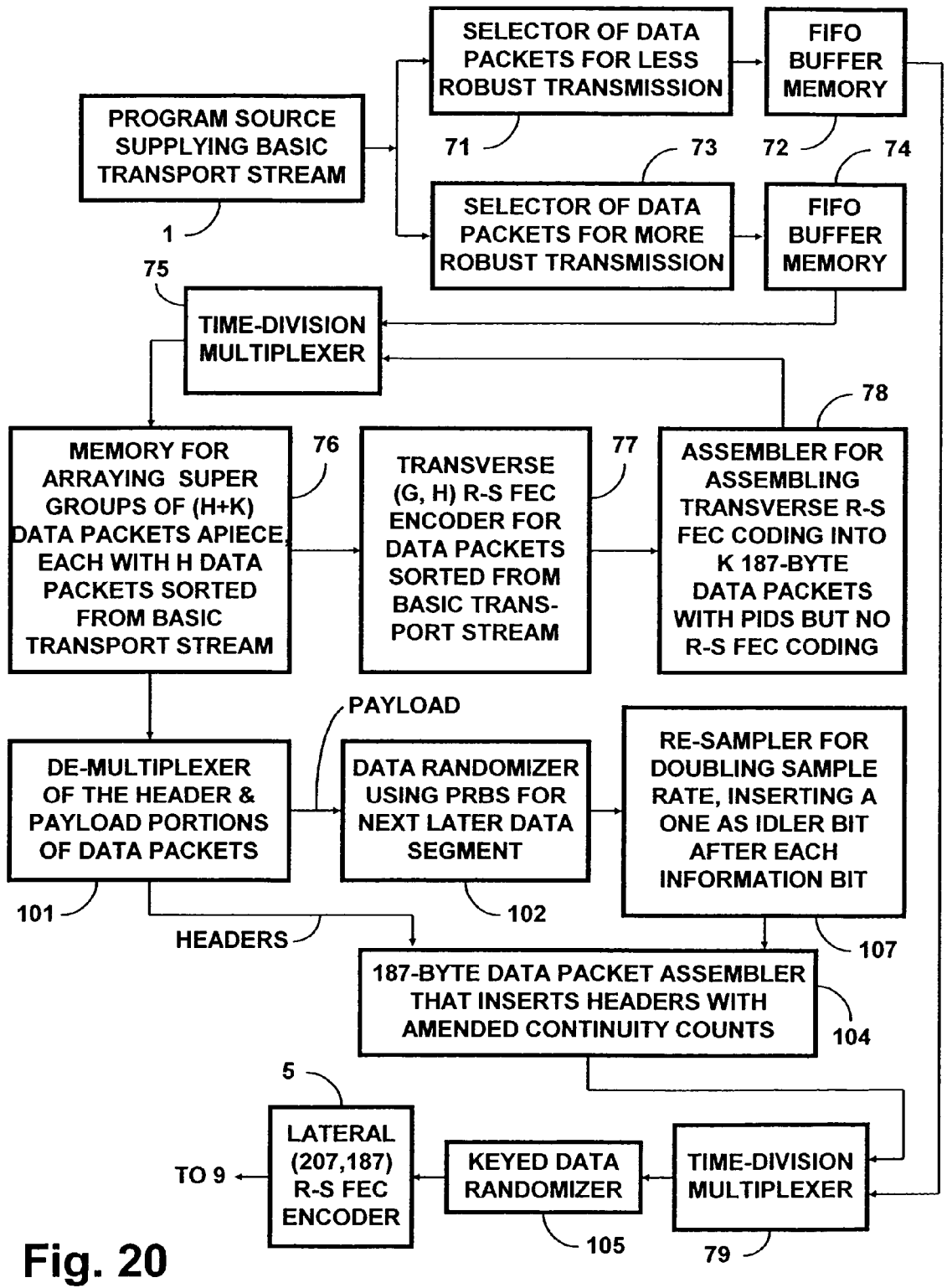
FIG. 20 is a schematic diagram of a modification made to the FIG. 1 transmitter in accordance with an aspect of the invention, which modification permits transmission of a DTV signal including a "super-robust" signal that has transverse Reed-Solomon forward-error-correction coding and excludes the −3, −1, +5 and +7 symbol values of the full 8VSB symbol alphabet.

FIG. 20 shows modifications of the FIG. 14 DTV transmitter enabling the transmission of a normal-transmission DTV signal together with a robust-transmission signal that excludes −3, −1, +5 and +7 symbol values of the full 8VSB symbol alphabet. Furthermore, the FIG. 20 modifications permit transverse R-S FEC coding of this robust-transmission signal to make it "super-robust". The FIG. 20 modifications are generally similar to the FIG. 18 modifications. The FIG. 20 modifications do not use a re-sampler 103 for halving the code rate of the randomized payload data from the data-randomizer 102. Instead, a re-sampler 107 is used to halve the code rate by inserting a ONE immediately after each information bit in each 184-byte payload portion, supplying the resulting 368 bytes of modified data to a 187-byte-packet assembler 104. The keyed data randomizer 105 selectively omits randomization of the payloads of the data packets that the assembler 104 supplies, so the data therein will only cause −7, −5, +1 and +3 symbols to be generated in the trellis coding procedure performed by the 12-phase trellis coder 10. The keyed data randomizer 105 does randomize the bits of the 3-byte headers payloads of the data packets that the assembler 104 supplies, however.

Figure 21:
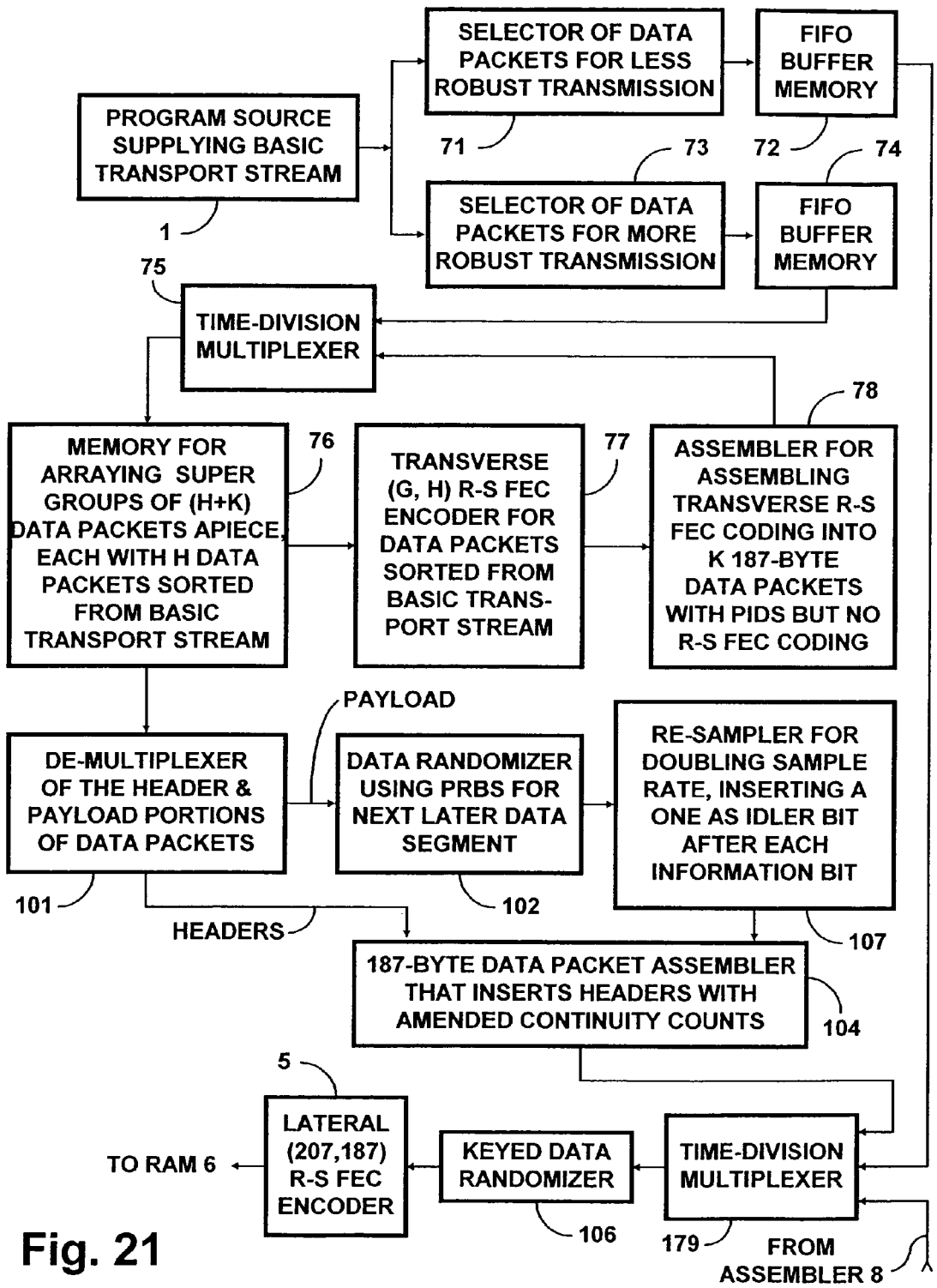
FIG. 21 is a schematic diagram of a modification made to the FIG. 1 transmitter, which modification permits transmission of a robust DTV signal including an even more robust "super-robust" signal that has its own transverse Reed-Solomon forward-error-correction coding and excludes the −3, −1, +5 and +7 symbol values of the full 8VSB symbol alphabet.

FIG. 21 shows modifications of the FIG. 15 transmitting apparatus enabling the transmission of a robust-transmission DTV signal together with an even more robust "super-robust" signal that uses modulation that excludes −3, −1, +5 and +7 symbol values of the full 8VSB symbol alphabet. The FIG. 21 modifications are generally similar to the FIG. 19 modifications. Like the FIG. 20 modifications of the FIG. 14 transmitting apparatus, the FIG. 21 modifications of the FIG. 15 transmitting apparatus use the re-sampler 107 in place of the re-sampler 103 for halving the code rate of the randomized payload data from the data-randomizer 102.

Figure 22A:
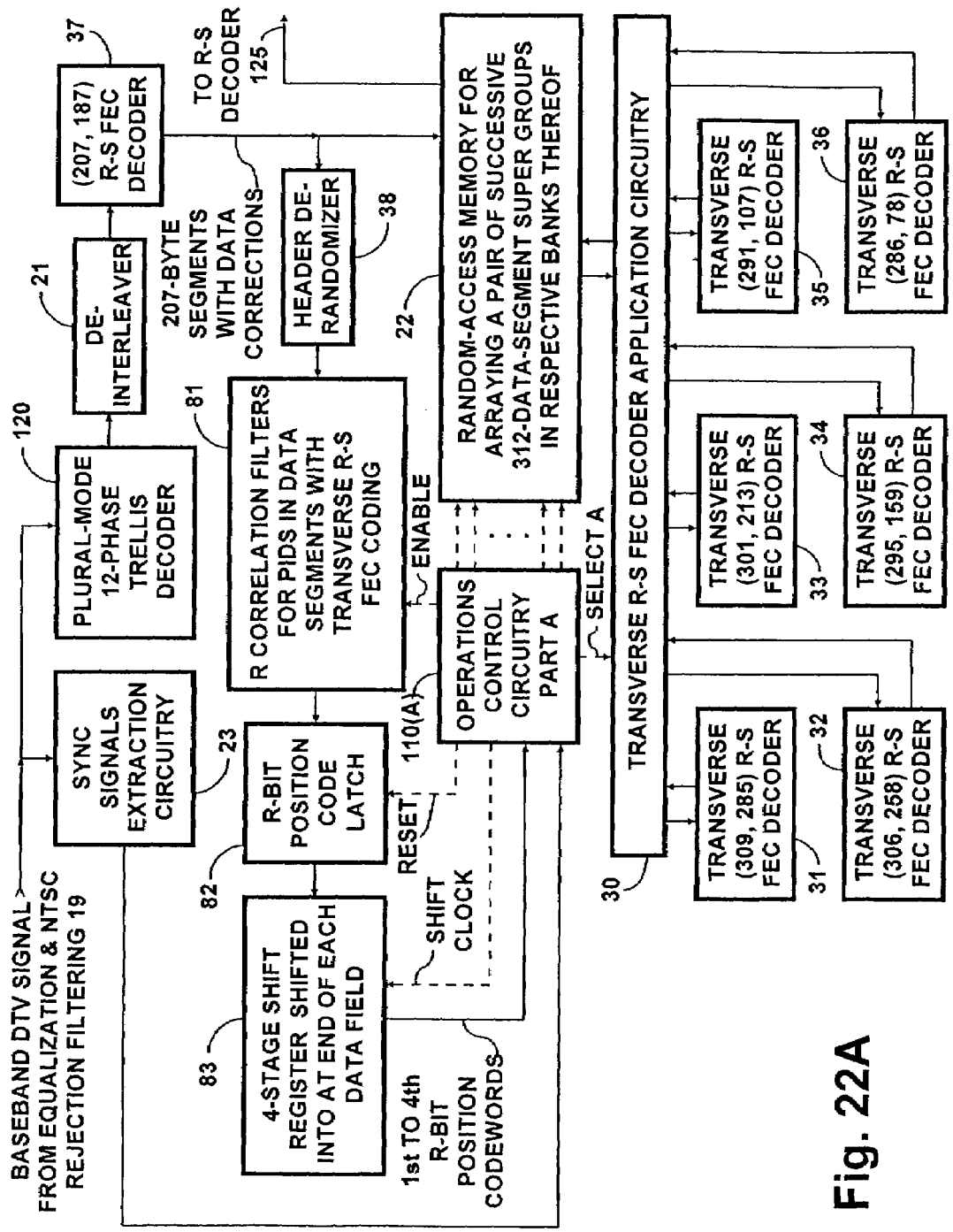
FIGS. 22A and 22B combine to form a FIG. 22 schematic diagram of a modified FIG. 16 DTV receiver capable of receiving DTV signals transmitted by transmitting apparatus of types shown in FIGS. 18 and 19 or of types shown in FIGS. 20 and 21.
Figure 22B:
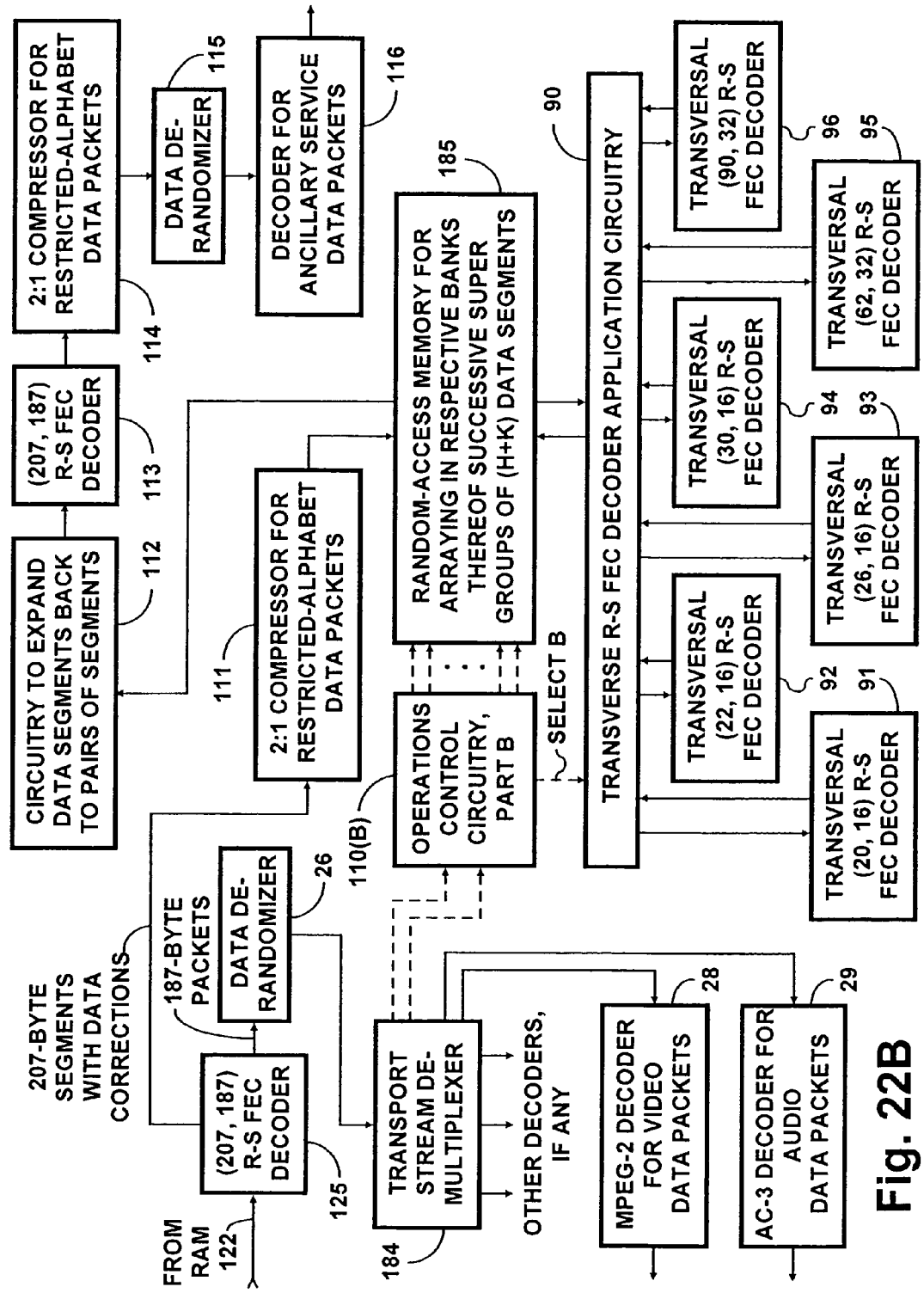

FIGS. 22A and 22B combine to form a FIG. 22 schematic diagram of modifications of the FIG. 16 DTV receiver for DTV signals employing transverse R-S FEC codes that can traverse full data fields. In FIG. 22A a plural-mode 12-phase trellis decoder 120 replaces the 12-phase trellis decoder 20 shown in FIG. 16A. If the plural-mode 12-phase trellis decoder 120 is capable of symbol decoding pseudo-2VSB modulation, the DTV receiver shown in FIGS. 22A and 22B is able to receive DTV signals transmitted by the FIG. 18 DTV transmitter or by the FIG. 1 DTV transmitter modified per FIG. 19. Suppose that the plural-mode 12-phase trellis decoder 120 is capable of symbol decoding modulation that excludes the −3, −1, +5 and +7 symbol values of the full 8VSB symbol alphabet. Then, the DTV receiver shown in FIGS. 22A and 22B is able to receive DTV signals transmitted by the FIG. 20 DTV transmitter or by the FIG. 1 DTV transmitter modified per FIG. 21.

The operations control circuitry 80 of the FIG. 16 DTV receiver is replaced by operations control circuitry 110 in the FIG. 22 DTV receiver. FIGS. 22A and 22B show the operations control circuitry 110 as comprising parts 110(A) and 110(B), which is an artifice used in the drawings to avoid running numerous connections from elements shown in FIG. 22A to elements shown in FIG. 22B. The operations control circuitry 110 differs from the operations control circuitry 80 in that the operations control circuitry 110 controls which mode the plural-mode trellis decoder 120 operates in, the connection for applying such control not being explicitly shown in FIG. 22A. Read-only memory within the operations control circuitry 110 maps which portions of each data field contain symbols drawn from a restricted 8VSB symbol alphabet and which portions of each data field contain symbols drawn from the complete 8VSB symbol alphabet. This read-only memory receives a successive counting of the symbols in a raster scanning of each successive data field as a part of its input addressing. The other part of the input addressing of this ROM selects the pattern of robust transmission in the current data field. The ROM supplies the plural-mode trellis decoder 120 with map information indicating whether or not the symbols the decoder is currently being supplied for decoding were selected from the full alphabet of 8VSB symbols or from a restricted alphabet. When the map information indicates restricted-alphabet symbols are currently being supplied to the plural-mode trellis decoder 120, the decision tree in the trellis decoding is selectively pruned to exclude decisions that currently received symbols have normalized modulation levels that are excluded from the restricted alphabet of 8VSB symbols.

FIG. 22B shows a banked random-access memory 185 replacing the banked random-access memory 85 of FIG. 16B. The RAM 185 differs from the RAM 85 in that it is set up to store 230-byte data segments, rather than 207-byte data segments. Each of these 230-byte data segments contains a 6-byte header composed of two 3-byte data-packet headers extracted from a pair of restricted-alphabet data segments. Each of these 230-byte data segments contains forty parity bytes of lateral R-S FEC code extracted from a pair of restricted-alphabet data segments. It is convenient to append an additional byte to each 230-byte data segment stored in the RAM 185, which additional byte codes the number of the data segment within the data field that the data in the 230-byte data segment was randomized with respect to. This simplifies synchronization of subsequent data de-randomization.

FIG. 22B shows the lateral (207, 187) R-S FEC decoder 125 connected for supplying the data de-randomizer 26 with 187-byte data packets after byte error correction. The data de-randomizer 26 is connected for supplying de-randomized data packets to a transport stream de-multiplexer 184 used instead of the transport stream de-multiplexer 84 of FIG. 16B. The transport stream de-multiplexer 184 selects video data packets to the MPEG-2 decoder 28 and selects audio data packets to the AC-3 decoder 29. The transport stream de-multiplexer 184 also supplies the operations control circuitry 110(B) with information about the PIDs of packets concerning super-robust transmissions. This information includes information concerning any 4-bit PID extension that succeeds the PID of a data packet containing bytes of transverse R-S FEC coding for super-robust transmission. This information combined with the position codewords stored in the shift register 83 enables the operations control circuitry 110(B) to write 230-byte data segments concerning super-robust transmissions to the appropriate bank of the RAM 185.

FIG. 22B shows the R-S FEC decoder 125 connected for supplying 207-byte data segments with byte error corrections to a 2:1 compressor 111 for restricted-alphabet data packets. The 2:1 data compressor 111 generates a single 230-byte data segment from each pair of 207-byte restricted-alphabet data segments, which 230-byte data segment is written to a bank of the RAM 185. The 2:1 data compressor 111 extracts the 3-byte headers from each pair of 207-byte restricted-alphabet data segments, for incorporation within a 6-byte portion of the 230-byte data segment written to the RAM 185. The 2:1 data compressor 111 extracts the twenty parity bytes of lateral R-S FEC code from each pair of 207-byte restricted-alphabet data segments, for incorporation within a 40-byte portion of the 230-byte data segment written to the RAM 185. The 2:1 data compressor 111 deletes the redundant alternate bits from the remaining payload portions of the restricted-alphabet data segments. Then, the 2:1 data compressor 111 combines the remaining 92-byte byte payload portions from earlier and later ones of each successive pair of restricted-alphabet data segments. This regenerates the 184-byte payload portion of a respective original data packet involved in the transverse R-S FEC coding for super-robust transmissions using symbols from a restricted 8VSB alphabet. The transverse R-S FEC decoding procedures used for correcting byte errors in these regenerated payload portions of these data packets are performed using one of the transverse R-S FEC decoders 91 through 96 selected by the transverse R-S FEC decoder application circuitry 90. The operations control circuitry 110 controls the writing and reading of RAM 185 during these transverse R-S FEC decoding procedures similarly to the way that the operations control circuitry 80 controls the writing and reading of RAM 85 during transverse R-S FEC decoding procedures in the FIG. 16B DTV receiver apparatus.

Packets of super-robust data that have been processed by byte-error-correction procedures using the one of the transverse R-S FEC decoders 91 through 96 selected by the transverse R-S FEC decoder application circuitry 90, are subsequently read from the RAM 185. Circuitry 112 to expand data segments back to pairs of segments is connected for receiving the 230-byte data segments read from the RAM 185. The circuitry 112 regenerates two 207-byte data segments responsive to each 230-byte data segment read from the RAM 185. The 184-byte payload portion of each 230-byte data segment is re-sampled using procedures similar either to those described with regard to FIGS. 18 and 19, or to those described with regard to FIGS. 20 and 21. The earlier one of a pair of 207-byte data segments is reconstituted by joining the initial 184 bytes resulting from this re-sampling with the 3-byte packet header and 20 parity bytes of lateral R-S FEC coding for that data segment. The later one of a pair of 207-byte data segments is reconstituted by joining the final 184 bytes resulting from this re-sampling with the 3-byte packet header and 20 parity bytes of lateral R-S FEC coding for that data segment.

A lateral (207, 187) R-S FEC decoder 113 is connected to receive the 207-byte data segments from the circuitry 112. The R-S FEC decoder 113 attempts further byte correction on at least those of the data packets with TEI bits indicating that they contain byte error. If the byte errors in such a data packet are corrected, the TEI bit is toggled to remove indication of byte error in the packet. The lateral R-S FEC decoder 113 is connected for supplying 187-byte packets to a 2:1 compressor 114 for restricted-alphabet data packets.

The 2:1 compressor 114 is connected for supplying a data de-randomizer 115 with a single 187-byte ancillary-service data packet generated from each pair of 187-byte data packets that the 2:1 data compressor 114 receives from the lateral R-S FEC decoder 113. The 3-byte header of the single 187-byte data packet corresponds essentially with the 3-byte header of the later one of the pair of 187-byte data packets that are being compressed. If both of the TEI bits of the pair of 187-byte data packets that are being compressed indicate the absence of uncorrected byte error, the TEI bit of the single 187-byte ancillary-service data packet is left unchanged so as to indicate the absence of uncorrected byte error. The TEI bit of the single 187-byte ancillary-service data packet is changed as necessary to indicate the presence of uncorrected byte error previously signaled by either or both of the TEI bits of the pair of 187-byte data packets that are being compressed. The 184-byte payload of each single 187-byte ancillary-service data packet that the 2:1 data compressor 114 supplies is generated by deleting the redundant alternate bits of the payload portions of the pair of 187-byte data packets that are being compressed. The data de-randomizer 115 is connected for receiving randomized ancillary-service data packets from the 2:1 compressor 114 and supplying de-randomized ancillary-service data packets to a decoder 116 for ancillary-service data packets.

Figure 23A:
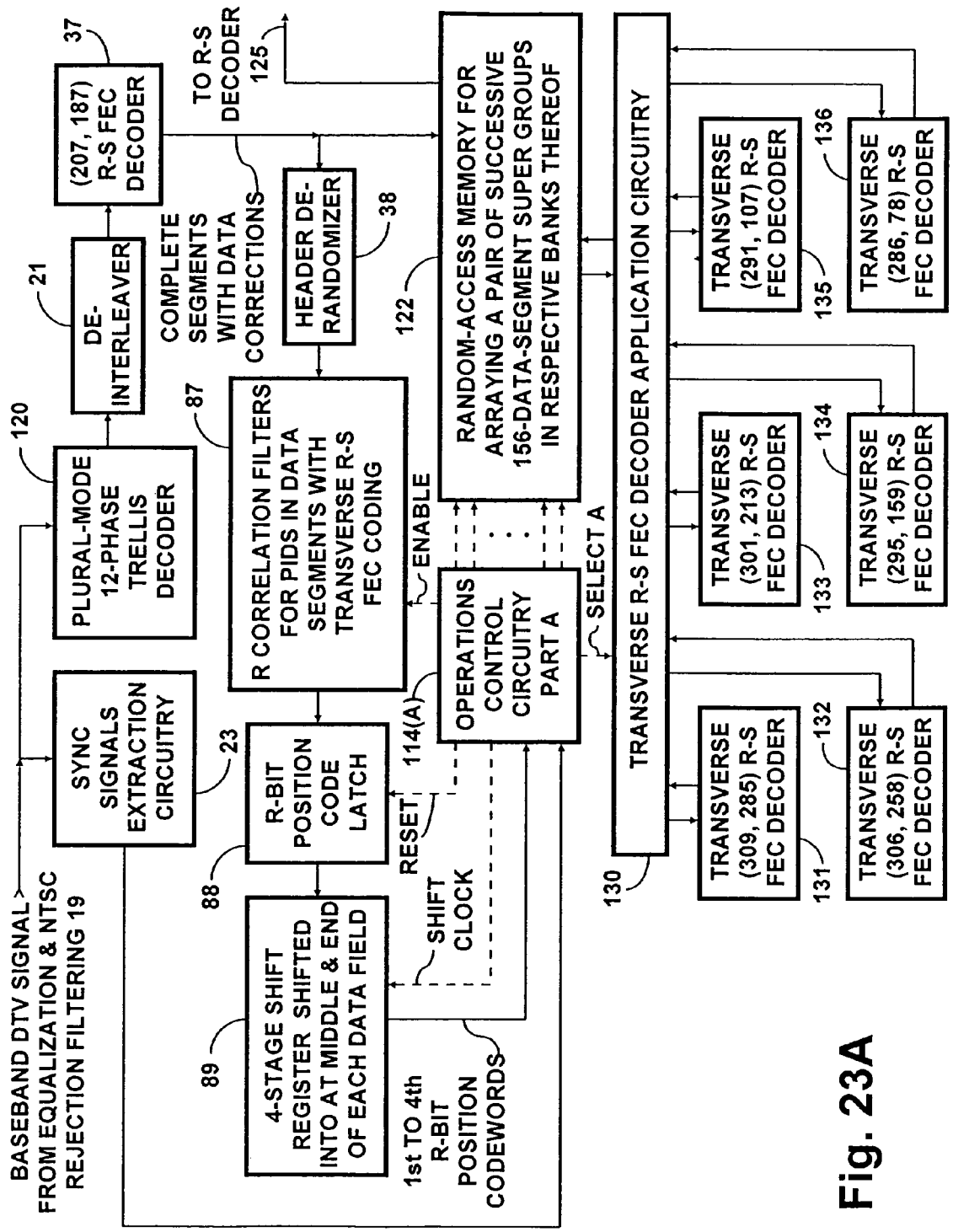
FIGS. 23A and 23B combine to form a FIG. 23 schematic diagram of a modified FIG. 17 DTV receiver capable of receiving DTV signals transmitted by transmitting apparatus of types shown in FIGS. 18 and 19 or of types shown in FIGS. 20 and 21.
Figure 23B:
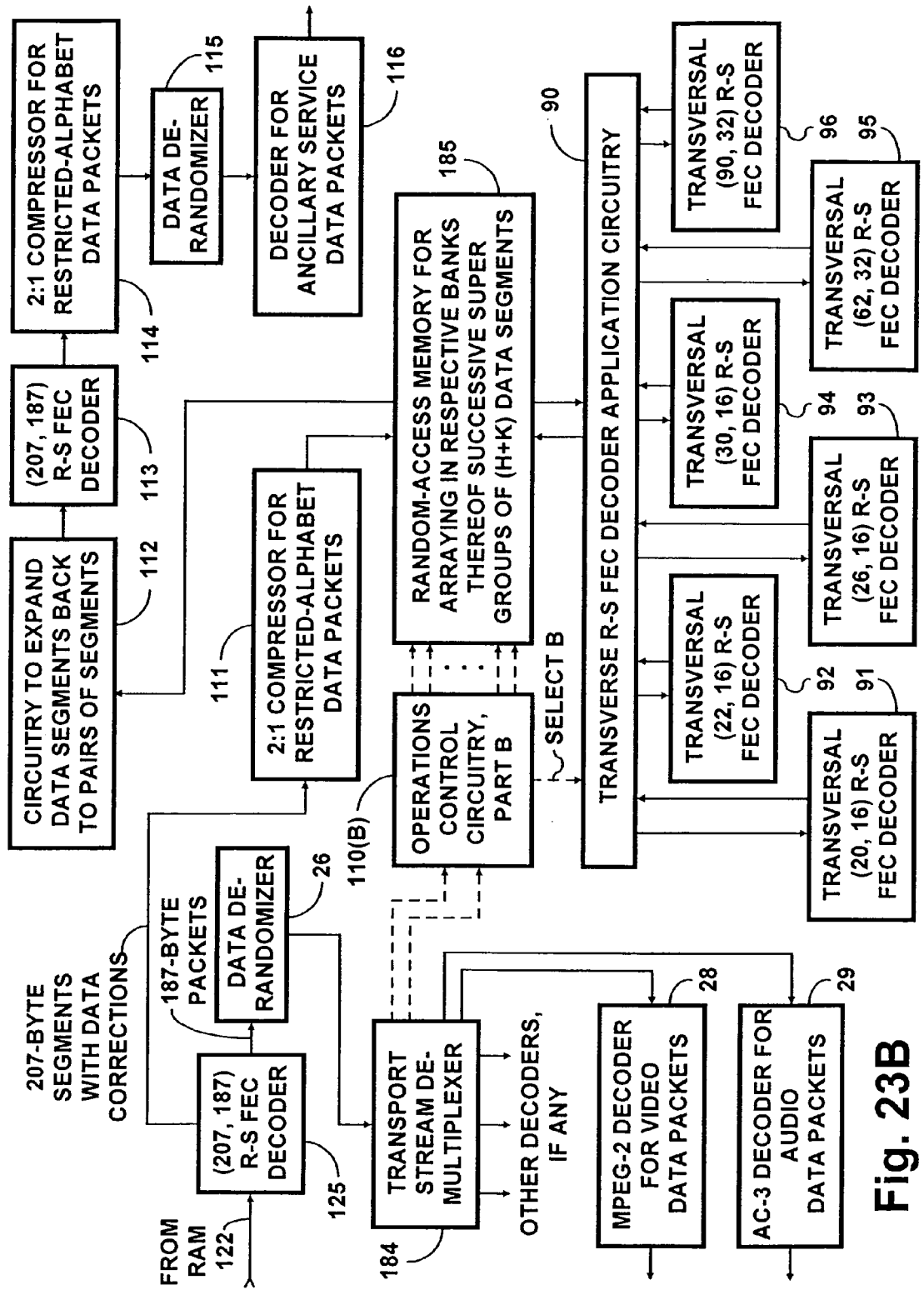

FIGS. 23A and 23B combine to form a FIG. 23 schematic diagram of modifications of the FIG. 17 DTV receiver for DTV signals employing transverse R-S FEC codes that can traverse half data fields. In FIG. 23A the plural-mode 12-phase trellis decoder 120 replaces the 12-phase trellis decoder 20 shown in FIG. 17A. The operations control circuitry 86 of the FIG. 17 DTV receiver is replaced by operations control circuitry 114 in the FIG. 23 DTV receiver. FIGS. 23A and 23B show the operations control circuitry 114 as comprising parts 114(A) and 114(B), which is an artifice used in the drawings to avoid running numerous connections from elements shown in FIG. 23A to elements shown in FIG. 23B. The operations control circuitry 114 differs from the operations control circuitry 86 of the FIG. 17 DTV receiver in that the operations control circuitry 114 controls which mode the plural-mode trellis decoder 120 operates in, the connection for applying such control not being explicitly shown in FIG. 23A. The operations control circuitry 114 controls the operational mode of the plural-mode trellis decoder 120 similarly to the way the operations control circuitry 110 controls the operational mode of the plural-mode trellis decoder 120 in the FIG. 22 DTV receiver.

The modifications of the FIG. 17B DTV receiver circuitry shown in FIG. 23B are similar to the modifications of the FIG. 16B DTV receiver circuitry shown in FIG. 22B. FIG. 23B shows the banked RAM 185 replacing the banked RAM 85 of FIG. 17B. The transport stream de-multiplexer 84 of FIG. 17B is replaced by the transport stream de-multiplexer 184 that selects video data packets to the MPEG-2 decoder 28 and selects audio data packets to the AC-3 decoder 29. The transport stream de-multiplexer 184 also supplies the operations control circuitry 114(B) with information about the PIDs of packets concerning super-robust transmission. This information combined with the position codewords stored in the shift register 89 enables the operations control circuitry 114(B) to write 230-byte data segments concerning super-robust transmissions to the appropriate bank of the RAM 185. These 230-byte data segments are generated by the 2:1 compressor 111 connected and operated the same as in the FIG. 22B receiving apparatus. The operations control circuitry 114 controls the writing and reading of RAM 185 during transverse R-S FEC decoding procedures similarly to the way that the operations control circuitry 86 controls the writing and reading of RAM 85 during transverse R-S FEC decoding procedures in the FIG. 17B DTV receiver apparatus. The circuitry 112 to expand data segments back to pairs of segments, the lateral (207, 187) R-S FEC decoder 113, the 2:1 data compressor 114, the data de-randomizer 115 and the decoder 116 for ancillary-service data packets are connected and operated the same as in the FIG. 22B receiving apparatus.

As noted in the "Background of the Invention", supra, the DTV receiver should have knowledge available to it as to whether the currently received DTV signal was transmitted using the full alphabet of 8VSB symbols or only half of that alphabet. This knowledge allows selection of the proper mode of trellis decoding in the plural-mode trellis decoder 120. This knowledge also facilitates improvements of the data-slicing procedures used for implementing decision-feedback equalization filtering. Transmissions using only half of the full alphabet of 8VSB symbols could be made invariably the same way, so there would be no need for the DTV transmitter to signal DTV receivers how such robust transmissions are being made. In order that a broadcaster can choose how such robust transmissions are time-division multiplexed with other types of transmission, however, it is necessary for the DTV transmitter to signal DTV receivers how such robust transmissions are being made.

More robust signal transmission modes that halve code rate code the payload information of an MPEG-2 data packet in two data segments, rather than a single data segment, and it is convenient to transmit the two data segments consecutively within a single data field. Generally, grouping segment pairs of more robust signal transmission consecutively within a data field is beneficial for improving the speed with which the weighting coefficients of an adaptive equalizer converge to appropriate values responsive to the more robust signal transmission. The convention of numbering the initial segment of the data field as the $0^{th}$ is followed in this specification. If a contiguous group of paired data segments commences in the $1^{st}$ data segment of a data field, it can end in the $2^{nd}$, $4^{th}$, $6^{th}$, . . . $308^{th}$, $310^{th}$ or $312^{th}$ data segment of that field, having any of 156 possible lengths. If a contiguous group of paired data segments commences in the $2^{nd}$ data segment of a data field, it can end in the $3^{rd}$, $5^{th}$, $7^{th}$, . . . $307^{th}$, $309^{th}$ or $311^{th}$ data segment of that field, having any of 155 possible lengths. If a contiguous group of paired data segments commences in the $3^{rd}$ data segment of a data field, it can end in the $4^{th}$, $6^{th}$, $8^{th}$, . . . $308^{th}$, $310^{th}$ or $312^{th}$ data segment of that field, having any of 155 possible lengths. If a contiguous group of paired data segments commences in the $4^{th}$ data segment of a data field, it can end in the $5^{th}$, $7^{th}$, $9^{th}$, . . . $307^{th}$, $309^{th}$ or $311^{th}$ data segment of that field, having any of 154 possible lengths. If a contiguous group of paired data segments commences in the $5^{th}$ data segment of a data field, it can end in the $6^{th}$, $8^{th}$, $10^{th}$ . . . $308^{th}$, $310^{th}$ or $312^{th}$ data segment of that field, having any of 154 possible lengths. So it continues, with the possible lengths of the contiguously grouped pairs continuously diminishing. If a contiguous group of paired data segments commences in the $310^{th}$ data segment of a data field, it can only end in $311^{th}$ data segment of that field, having only one possible length. If a contiguous group of paired data segments commences in the $11^{th}$ data segment of a data field, it can only end in the $312^{th}$ data segment of that field, having only one possible length. The total number of possible patterns of contiguously grouped segment pairs is 156, plus two times the summation of all numbers from 1 to 155, plus the possibility of no robust transmission within a data field. The summation of all numbers from 1 to 155 is 12,090. The total number of possible patterns of contiguously grouped segment pairs is 156+2(12,090)+1=24,337.

Suppose there is to be variation from one data field to another with regard to the pattern of data segments that are transmitted using only half of the alphabet of 8VSB symbols. Then, it is convenient to transmit information concerning the pattern to the receiver so as to be timely available for controlling the symbol decoding procedures. Information concerning such robust transmissions can be transmitted in coded form during the 92-symbol "reserved" portion of the zeroeth data segment of a data field, which "reserved" portion immediately follows the data field synchronization (DFS) signal. By way of example, this information is transmitted by six successive PN15 sequences with ONES and ZEROes at +6.125 and −3.75 normalized modulation levels, respectively.

If the six successive PN15 sequences are constrained to being permutations of the same PN15 sequence in 15 different phases and the complements of those 15 different phases of the same PN15 sequence, each of the PN15 sequences can code 30 possible conditions. All fifteen possible phasings of a PN15 sequence and both of its two possible senses of polarity can be used to generate a binary-coded radix-30 number. A triple of PN15 sequences can then specify $30^3=27,000$ patterns of robust signal transmission for a data field. This more than suffices to describe all possible patterns of contiguously grouped segment pairs contained within a 312-segment data field. The remaining triple of PN15 sequences can describe the pattern of robust signal transmission for the next data field. The description of the pattern of robust signal transmission for each data field in the $0^{th}$ data segments of two data fields reduces the susceptibility of pattern information to being lost when burst noise occasionally corrupts the $0^{th}$ segment of a data field.

The DTV receiver is easily designed to be able to determine the phasing of each of the PN15 sequences. The DTV receiver sequence can very accurately determine the timing of the PN511 sequence using PN511 match filtering to establish a time reference against which to measure the centers of symbol epochs. The frequency of symbol epochs can be very accurately determined using bright-spectral-line methods for adjusting the oscillations of a crystal oscillator that times all sample clocking within the DTV receiver, including symbol-rate clocking. There is very little phase run-out of the symbol-rate clocking from the time reference established using PN511 match filtering during the zeroeth data segment preceding a data field, which data segment contains the PN511 sequence.

Generally, positioning the contiguously grouped segment pairs of more robust signal at the beginning of a data field is beneficial for improving the speed with which the weighting coefficients of an adaptive equalizer converge to appropriate values responsive to the more robust signal transmission. This is because the benefit of the known PN511 and triple PN62 sequences in the $0^{th}$ data segment in the convergence process can be capitalized upon without too much intervening unknown data before the more robust unknown data commences. If the contiguous group of segment pairs of the more robust signal transmission is constrained always to begin in the first data segment of a data field, there are only 156 possible lengths for the group. Adding the possibility of no robust transmission within a data field, there are only 157 possible patterns of robust transmission. A pair of PN15 sequences can specify $30^2=900$ patterns of robust signal transmission for a data field. This permits the contiguous group of segment pairs of the more robust signal transmission to begin in any of a limited number of prescribed segments within the data field. Permitting no more than 900 possible patterns of robust signal transmission for a data field allows the pattern in the current data field to be described using only two of the PN15 sequences in the reserved section of the $0^{th}$ data segment of the current data field. Another two of the PN15 sequences in the reserved section of the $0^{th}$ data segment of the current data field can describe the pattern of robust signal transmission for the next data field. The remaining two of the PN15 sequences in the reserved section of the $0^{th}$ data segment of the current data field can describe the pattern of robust signal transmission for the data field after the next data field. The description of the pattern of robust signal transmission for each data field in the $0^{th}$ data segments of three data fields, rather than just two, further reduces the susceptibility of pattern information to being lost when burst noise occasionally corrupts the $0^{th}$ segment of a data field.

The number of the 15 possible phasings of the PN 31 sequence that are actually transmitted can be reduced to eight alternate ones of the 15 possible phasings, which reduces the number of correlation filters required for detecting different phases of the PN15 sequence. This also reduces the chances of erroneous detection of the PN15 phasing caused by symbol jitter. This expurgation allows the coding of $16^6$ conditions, which is to say $2^{24}$ conditions, so the coding can be converted to a 24-bit binary number.

The 8-bit binary number defined by the first-occurring pair of PN15 sequences can be used to indicate the type of robust transmission currently being made. The receiver can use the 8-bit binary number to address a read-only memory in the operations control circuitry, which ROM holds complete pattern instructions concerning 256 species of robust transmissions. The 8-bit binary number defined by the second-occurring pair of PN15 sequences can be used to indicate the number of data fields until there will be a change in the type of robust transmission that is broadcast. However, this 8-bit binary number being 0000 0000 means that no change will occur for more than two-hundred-and-fifty-six data fields. The 8-bit binary number defined by the third-occurring pair of PN15 sequences can be used to indicate the type of robust transmission that will next be made. If no change will occur for more than 256 data fields, the third-occurring pair of PN15 sequences can repeat the first-occurring pair of PN15 sequences.

Protection against burst noise is afforded even at SNRs close to TOV, if the parity bytes of the transverse R-S FEC coding of the ancillary data in the super-robust transmission are transmitted using the restricted alphabet of 8VSB symbols. This is what is done in the transmitting apparatuses shown in FIGS. 18–21. If the parity bytes of the transverse R-S FEC coding of the ancillary data in the super-robust transmission are transmitted using the complete alphabet of 8VSB symbols, protection against burst noise is more apt to fail at SNRs close to TOV.

An interesting aspect of time-division multiplexing restricted-alphabet signal with full-alphabet 8VSB signal, then transverse R-S FEC coding the result, is that transverse R-S FEC coded full-alphabet 8VSB signal is made more robust than if the transverse R-S FEC coding only involves full-alphabet 8VSB signal. This is because the trellis-decoded restricted-alphabet signal is less likely to contain uncorrectable error than the trellis-decoded full-alphabet 8VSB signal it replaces. Consequently, more of the capability of the transverse R-S FEC code is available for correcting errors in the trellis-decoded full-alphabet 8VSB signal that remains.

Operations cycles for transverse R-S FEC coding of a full data field or half a data field have been specifically described in this specification and the accompanying drawing. Since R-S FEC codes are readily shortened by using null bytes, there is a great deal of flexibility in choosing operations cycles for the transverse R-S FEC coding. It is convenient to match the operations cycles of the transverse R-S FEC coding to multiples of 52 data segments, however. An operations cycle of only 104 data segments, or one-third of a data field, might be used to reduce further the memory requirements in DTV receivers. Greater shortening of the R-S FEC codes would be required. Operations cycles for transverse R-S FEC coding of 208 data segments, or two-thirds of a data field, might merit consideration. Three operations cycles could be synchronized to fit within one data frame. A transverse path through 208 data segments more closely approximates the 255-byte natural length of many R-S FEC codes, so less shortening of the R-S FEC codes would be required.

Shortening a Reed-Solomon FEC code by presuming a number of its bytes to be null bytes of known value increases the strength of the R-S FEC coding and decreases code rate. Using the same R-S FEC code for different lengths of transverse paths is another way of achieving various code rates that is alternative to using several different R-S FEC codes of similar length. Suppose a 255-byte-length transverse R-S FEC code is capable of locating and correcting a prescribed number, P, of bytes. The number of bytes of data will at most be $[255-(9/8)(2P)]=[255-(9P/4)]$.

If the R-S FEC code is shortened to 208 bytes by presuming there are 47 null bytes, the number of bytes of data will at most be $[208-(9/8)(2P)]=[208-(9P/4)]$. Code rate is reduced by a factor $[208-(9P/4)]\div[255-(9P/4)]=(832-9P)\div(1020-9P)$. This is less than a 20% reduction for smaller values of P.

If the R-S FEC code is shortened to 156 bytes by presuming there are 99 null bytes, the number of bytes of data will at most be $[156-(9/8)(2P)]=[156-(9P/4)]$. Code rate is reduced by a factor $[156-(9P/4)]\div[255-(9P/4)]=(624-9P)\div(1020-9P)$. This is a code rate reduction of about one-and-a-half times for smaller values of P.

If the R-S FEC code is shortened to 104 bytes by presuming there are 151 null bytes, the number of bytes of data will at most be $[104-(9/8)(2P)]=[104-(9P/4)]$. Code rate is reduced by a factor $[104-(9P/4)]\div[255-(9P/4)]=(416-9P)\div(1020-9P)$. This is a code rate reduction of about two-and-a-half times for smaller values of P.

If the R-S FEC code is shortened to 52 bytes by presuming there are 203 null bytes, the number of bytes of data will at most be $[52-(9/8)(2P)]=[52-(9P/4)]$. Code rate is reduced by a factor $[52-(9P/4)]\div[255-(9P/4)]=(208-9P)\div(1020-9P)$. This is a code rate reduction of about five times for smaller values of P.

Modifying the number of data segments to which a transverse R-S FEC code is applied is an alternative way of changing the code rate reduction provided by transverse R-S FEC coding.

Design principles revealed in the foregoing specification and the figures of the drawing will enable one skilled in the art of DTV system design to design more complex DTV systems that utilize transverse R-S FEC coding. This should be borne in mind when considering the scope of the invention.

What is claimed is:

1. A method of generating a symbol code composed of symbols manifested as different levels of a plural-level electric signal, said method comprising the steps of:
   (a) randomizing a stream of data packets, each having a prescribed first number of bytes therein;
   (b) forward-error-correction coding each of said data packets to generate a respective lateral Reed-Solomon code segment that is included as one of successive segments of a data field included in a succession of data fields, each of said lateral Reed-Solomon code segments consisting of said prescribed first number of bytes plus a prescribed second number of parity bytes;
   (c) forming groups of said lateral Reed-Solomon code segments containing ones of said data packets that are of at least one prescribed type;
   (d) forward-error-correction coding bytes in each of transverse paths through each said group of said lateral Reed-Solomon code segments, thereby to generate a respective transverse Reed-Solomon code further including a respective set of transverse Reed-Solomon code parity bytes;
   (e) assembling each said respective set of transverse Reed-Solomon code parity bytes into a prescribed number of further segments of at least one of said data fields, each of which further segments has a prescribed third number of bytes, said prescribed third number being a sum of said prescribed first number and said prescribed second number;
   (f) time-division multiplexing, within said data fields, said lateral Reed-Solomon code segments generated in step (b) with said further segments in which said respective sets of transverse Reed-Solomon code parity bytes are assembled in step (e);
   (g) convolutionally interleaving the successive segments of said data fields to generate successive segments of convolutionally interleaved data fields;
   (h) trellis coding said successive segments of convolutionally interleaved data fields to generate a trellis code;
   (i) mapping successive nibbles of said trellis code into respective symbols of said symbol code; and
   (j) inserting synchronizing signals into said symbol code.

2. Apparatus constructed for generating symbol code according to the method of claim 1.

3. The method of claim 1, wherein step (d) is performed so that the parity bytes of each of said lateral Reed-Solomon code segments in a group thereof are excluded from each and all of the transverse paths through that said group.

4. The method of claim 3, wherein said step (e) assembles each set of transverse Reed-Solomon code parity bytes into further segments each beginning with a packet identifier (PID) code reserved for such further segments.

5. The method of claim 1, wherein step (d) is performed so that each byte in the payload portions of data packets in each said group of said lateral Reed-Solomon code segments is included in one of the transverse paths through that said group.

6. The method of claim 5, wherein step (d) is performed so that each byte in the headers of data packets in each said group of said lateral Reed-Solomon code segments is included in one of the transverse paths through that said group.

7. The method of claim 6, wherein step (d) is performed so that each of the parity bytes of each of said lateral Reed-Solomon code segments in a group thereof is included in one of the transverse paths through that said group.

8. The method of claim 1, wherein step (d) is performed so that each of the parity bytes of each of said lateral Reed-Solomon code segments in a group thereof is included in one of the transverse paths through that said group.

9. The method of claim 8, wherein said step (e) assembles each set of transverse Reed-Solomon code parity bytes into further segments each beginning with a packet identifier (PID) code reserved for such further segments.

10. The method of claim 1, wherein each group of said lateral Reed-Solomon code segments and the prescribed number of further segments into which the respective set of transverse Reed-Solomon code parity bytes are assembled are included within a single data field.

11. The method of claim 10, wherein the sum of the number of said lateral Reed-Solomon code segments in each said group thereof and the prescribed number of further segments into which the respective set of transverse Reed-Solomon code parity bytes are assembled totals substantially 312.

12. The method of claim 11, wherein the further segments in which each set of transverse Reed-Solomon code parity bytes are assembled are at the conclusion of a respective one of said data fields.

13. The method of claim 12, wherein each set of transverse Reed-Solomon code parity bytes are assembled into the further segments of a respective data field together with other bytes, which other bytes after step (g) of convolutionally interleaving appear at the conclusion of a respective one of said convolutionally interleaved data fields.

14. The method of claim 13, wherein the other bytes in the further segments of each said respective data field are place-holder bytes and said method further comprises a step of:
   (k) replacing the trellis-coded place-holder bytes at the conclusions of said convolutionally interleaved data fields with a respective succession of transitional trellis-coding symbols followed by a respective succession of prescribed trellis-coding symbols.

15. The method of claim 10, wherein the sum of the number of said lateral Reed-Solomon code segments in each said group thereof and the prescribed number of further segments into which the respective set of transverse Reed-Solomon code parity bytes are assembled totals substantially 156.

16. The method of claim 10 wherein said step (c) of forming groups of said lateral Reed-Solomon code segments is performed by parsing said stream of data packets into said groups without regard to the particular type of each of those data packets.

17. The method of claim 10 wherein said step (c) of forming groups of said lateral Reed-Solomon code segments is performed after a preliminary step of selecting said lateral Reed-Solomon code segments containing said prescribed type of data packets.

18. The method of claim 17, wherein said step (d) inserts said further segments before the group of said lateral Reed-Solomon code segments to which they relate and after any previous group of said lateral Reed-Solomon code segments containing said prescribed type of data packets, and wherein said step (e) assembles each set of transverse Reed-Solomon code parity bytes into further segments each beginning with a header including a packet identifier (PID) code reserved for such further segments.

19. The method of claim 1, wherein said data packets comprise MPEG-2-compliant data packets, wherein said prescribed first number of bytes is 187 and said prescribed second number of bytes is 20.

20. A method of generating a symbol code composed of symbols manifested as different levels of a plural-level electric signal, said method comprising the steps of:
(a) randomizing a stream of data packets, each having a prescribed first number of bytes therein;
(b) forward-error-correction coding each of said data packets to generate a respective lateral Reed-Solomon code segment that is included as one of successive segments of a data field included in a succession of data fields, each of said lateral Reed-Solomon code segments consisting of said prescribed first number of data bytes plus a prescribed second number of parity bytes;
(c) forming groups of said lateral Reed-Solomon code segments containing ones of said data packets that are of at least one prescribed type;
(d) forward-error-correction coding bytes in each of transverse paths through each said group of said lateral Reed-Solomon code segments, thereby to generate a respective transverse Reed-Solomon code comprising a respective set of transverse Reed-Solomon code parity bytes;
(e) assembling each said respective set of transverse Reed-Solomon code parity bytes into a prescribed number of further packets, which further packets each consist of said prescribed first number of bytes;
(f) forward-error-correction coding each of said further packets to generate a respective two-dimensional Reed-Solomon code segment that is included as one of the successive segments of one of said data fields included in said succession of data fields, each of said two-dimensional Reed-Solomon code segments consisting of said prescribed first number of bytes from a respective one of said further packets plus an additional said prescribed second number of parity bytes;
(g) convolutionally interleaving the successive segments of said data fields to generate successive segments of convolutionally interleaved data fields;
(h) trellis coding said successive segments of convolutionally interleaved data fields to generate a trellis code;
(i) mapping successive nibbles of said trellis code into respective symbols of said symbol code; and
(j) inserting synchronizing signals into said symbol code.

21. Apparatus constructed for generating symbol code according to the method of claim 20.

22. The method of claim 20, wherein step (d) is performed so that the parity bytes of each of said lateral Reed-Solomon code segments in a group thereof are excluded from all of the transverse paths through that said group.

23. The method of claim 22, wherein said step (e) assembles each set of transverse Reed-Solomon code parity bytes into further segments each beginning with a header including packet identifier (PID) code reserved for such further segments.

24. The method of claim 20, wherein step (d) is performed so that the parity bytes of each of said lateral Reed-Solomon code segments in a group thereof are included in a respective one of the transverse paths through that said group.

25. The method of claim 24, wherein said step (e) assembles each set of transverse Reed-Solomon code parity bytes into further segments each beginning with a header including a packet identifier (PID) code reserved for such further segments.

26. The method of claim 20, wherein each group of said lateral Reed-Solomon code segments and the prescribed number of further segments into which the respective set of transverse Reed-Solomon code parity bytes are assembled are included within a single data field.

27. The method of claim 26, wherein the sum of the number of said lateral Reed-Solomon code segments in each said group thereof and the prescribed number of further segments into which the respective set of transverse Reed-Solomon code parity bytes are assembled totals substantially 312.

28. The method of claim 26, wherein the further segments in which each set of transverse Reed-Solomon code parity bytes are assembled are at the conclusion of a respective one of said data fields.

29. The method of claim 28, wherein each set of transverse Reed-Solomon code parity bytes are assembled into the further segments of a respective data field together with other bytes, which other bytes after step (g) of convolutionally interleaving appear at the conclusion of a respective one of said convolutionally interleaved data fields.

30. The method of claim 29, wherein the other bytes in the further segments of each said respective data field are place-holder bytes and said method further comprises a step of:
(k) replacing the trellis-coded place-holder bytes at the conclusions of said convolutionally interleaved data fields with a respective succession of transitional trellis-coding symbols followed by a respective succession of prescribed trellis-coding symbols.

31. The method of claim 26, wherein the sum of the number of said lateral Reed-Solomon code segments in each said group thereof and the prescribed number of further segments into which the respective set of transverse Reed-Solomon code parity bytes are assembled totals substantially 156.

32. The method of claim 26 wherein said step (c) of forming groups of said lateral Reed-Solomon code segments is performed by parsing said stream of data packets into said groups without regard to the particular type of each of those data packets.

33. The method of claim 26 wherein said step (c) of forming groups of said lateral Reed-Solomon code segments is performed after a preliminary step of selecting said lateral Reed-Solomon code segments containing said prescribed type of data packets.

34. The method of claim 33, wherein said step (d) inserts said further segments before the group of said lateral Reed-Solomon code segments to which they relate and after any previous group of said lateral Reed-Solomon code segments containing said prescribed type of data packets, and wherein said step (e) assembles each set of transverse Reed-Solomon code parity bytes into further segments each beginning with a header including a packet identifier (PID) code reserved for such further segments.

35. The method of claim 20, wherein said data packets comprise MPEG-2-compliant data packets, wherein said prescribed first number of bytes is 187 and said prescribed second number of bytes is 20.

36. A method of generating a symbol code composed of symbols manifested as different levels of a plural-level electric signal, said method comprising the steps of:
(a) forming groups of data packets that are of at least one prescribed type, each of said data packets having a prescribed first number of bytes therein;
(b) randomizing said data packets in said groups;
(c) forward-error-correction coding all bytes in each of transverse paths through each said group of randomized data packets, thereby to generate a respective transverse Reed-Solomon code further including a respective set of transverse Reed-Solomon code parity bytes;

(d) assembling each said respective set of transverse Reed-Solomon code parity bytes into a prescribed number of further data packets, each having said prescribed first number of bytes, a respective super group arising from each said group of said data packets being augmented by said further data packets containing parity bytes of the transverse Reed-Solomon forward-error-correction coding for that said group of said data packets;

(e) time-division multiplexing said data packets of each said group thereof with said further data packets and with still other data packets, each having said prescribed first number of bytes, thereby generating a succession of time-division multiplexed data packets;

(f) forward-error-correction coding each of said succession of time-division multiplexed data packets to generate a respective lateral Reed-Solomon code segment that is included as one of successive segments of a data field included in a succession of data fields, each of said lateral Reed-Solomon code segments consisting of said prescribed first number of bytes plus a prescribed second number of parity bytes;

(g) convolutionally interleaving the successive segments of said data fields to generate successive segments of convolutionally interleaved data fields;

(h) trellis coding said successive segments of convolutionally interleaved data fields to generate a trellis code;

(i) mapping successive nibbles of said trellis code into respective symbols of said symbol code; and (j) inserting field synchronizing signals and segment synchronizing signals into said symbol code.

37. The method of claim 36, wherein said data packets comprise MPEG-2-compliant data packets, wherein said prescribed first number of bytes is 187 and said prescribed second number of bytes is 20.

38. The method of claim 36, wherein said step (d) assembles each set of transverse Reed-Solomon code parity bytes into further data packets each beginning with a header including a packet identifier (PID) code reserved for such further data packets, and wherein the method of claim 36 further includes a step of:

randomizing the headers of said further data packets, but not their payload portions, prior to said step (f) of forward-error-correction coding each of said succession of time-division multiplexed data packets to generate a respective lateral Reed-Solomon code segment that is included as one of successive segments of a data field included in a succession of data fields.

39. The method of claim 36, wherein said still other data packets used in said step (f) of time-division multiplexing consist of MPEG-2-compliant 187-byte data packets, and wherein the method of claim 36 further includes a step of:
(k) randomizing each of said still other data packets throughout all of its portions.

40. The method of claim 36, wherein a first set of said still other data packets used in said step (e) of time-division multiplexing consists of MPEG-2-compliant 187-byte data packets, each of which is randomized throughout all portions thereof, and wherein a second set of said still other data packets include parity bytes for transverse Reed-Solomon forward-error-correction coding of 187-byte data packets in said first set of said still other data packets.

41. The method of claim 40, wherein each of said still other data packets in said second set thereof begins with a header including a packet identifier (PID) code reserved for said still other data packets in said second set thereof, and wherein the method of claim 40 further includes a step of:

randomizing the headers of said still other data packets in said second set thereof, but not their payload portions, prior to said step (f) of forward-error-correction coding each of said succession of time-division multiplexed data packets to generate a respective lateral Reed-Solomon code segment that is included as one of successive segments of a data field included in a succession of data fields.

42. A method of generating a symbol code composed of symbols manifested as different levels of a plural-level electric signal, said method comprising the steps of:

(a) forming successive groups of data packets of at least one prescribed type, each of said data packets having a prescribed first number of bytes therein and including a respective header portion and a respective payload portion;

(b) forward-error-correction coding all bytes in each of transverse paths through each said group of data packets of at least one prescribed type, thereby to generate a respective transverse Reed-Solomon code comprising a respective set of transverse Reed-Solomon code parity bytes;

(c) assembling each said respective set of transverse Reed-Solomon code parity bytes into a prescribed number of further packets, each having said prescribed first number of bytes therein, which further packets each include a respective header portion and a respective payload portion, each said group of data packets formed in step (a) and said further packets assembled from said respective set of transverse Reed-Solomon code parity bytes thereof combining to form a super group of packets;

(d) generating a respective pair of prescribed first number of byte packets from each of said prescribed first number of byte packets in each said super group;

(e) forward-error-correction coding each prescribed first number of byte packet in each of said pairs of prescribed first number of byte packets to generate a respective two-dimensional Reed-Solomon code segment having a prescribed second number of bytes therein that is included as one of successive segments of a succession of data fields;

(f) time-division multiplexing said two-dimensional Reed-Solomon code segments with other segments of said succession of data fields;

(g) convolutionally interleaving the successive segments of said data fields to generate successive segments of convolutionally interleaved data fields;

(h) trellis coding said successive segments of convolutionally interleaved data fields to generate a trellis code;

(i) mapping successive nibbles of said trellis code into respective symbols of said symbol code; and (j) inserting field synchronizing signals and segment synchronizing signals into said symbol code.

43. The method of claim 42, wherein said data packets comprise MPEG-2-compliant data packets, wherein said prescribed first number of bytes is 187 and said prescribed second number of bytes is 207.

44. The method of claim 42, wherein said step (d) of generating a respective pair of packets from each of said packets in each said super group comprises substeps of:

randomizing the data contained in the respective payload portion of each of said packets in each said super group with a pseudo-random binary sequence that is advanced by 1496 bits from that specified in the ATSC Digital Television Standard, thereby generating a respective randomization result;

immediately repeating each bit of each randomization result to generate a respective re-sampled randomization result;

employing the header portion of each of said packets in each said super group to generate the header of the first of said respective pair of packets generated therefrom;

employing the initial half of the respective re-sampled randomization result from each of said packets in each said super group as the payload portion of the first of said respective pair of packets generated therefrom;

employing the header portion of each of said packets in each said super group to generate the header of the second of said respective pair of packets generated therefrom;

employing the final half of the respective re-sampled randomization result from each of said packets in each said super group as the payload portion of the second of said respective pair of packets generated therefrom; and randomizing the header portions of the first and second packets in each respective pair of packets.

45. The method of claim 42, wherein said step (d) of generating a respective pair of packets from each of said packets in each said super group comprises substeps of:

randomizing the data contained in the respective payload portion of each of said packets in each said super group with a pseudo-random binary sequence that is advanced by 1496 bits from that specified in the ATSC Digital Television Standard, thereby generating a respective randomization result;

immediately following each bit of each randomization result with a ONE to generate a respective bit-extended randomization result;

employing the header portion of each of said packets in each said super group to generate the header of the first of said respective pair of packets generated therefrom;

employing the initial half of the respective bit-extended randomization result from each of said packets in each said super group as the payload portion of the first of said respective pair of packets generated therefrom;

employing the header portion of each of said packets in each said super group to generate the header of the second of said respective pair of packets generated therefrom;

employing the final half of the respective bit-extended randomization result from each of said packets in each said super group as the payload portion of the second of said respective pair of packets generated therefrom; and randomizing the header portions of the first and second packets in each respective pair of packets.

46. The method of claim 42, wherein said other segments of said succession of data fields used in said step (f) of time-division multiplexing consist of randomized MPEG-2-compliant 187-byte data packets.

47. The method of claim 42, wherein a first set of said other segments of said succession of data fields used in said step (f) of time-division multiplexing each contain a respective MPEG-2-compliant 187-byte data packet that is randomized throughout all of its portions, and wherein a second set of said other segments of said succession of data fields include parity bytes for transverse Reed-Solomon forward-error-correction coding of at least the header and payload portions of said first set of said still other segments of said succession of data fields.

48. The method of claim 47, wherein each of said second set of said other segments of said succession of data fields begins with a respective randomized header, which header in a de-randomized state includes a packet identifier (PID) code reserved for said other segments in said second set thereof, said header of each of said other segments of said succession of data fields in said second set thereof being the only randomized portion thereof.

49. A receiver for digital television signals employing transverse Reed-Solomon forward-error-correction coding in addition to lateral Reed-Solomon forward-error-correction coding and trellis coding, said receiver comprising:

apparatus for receiving digital television signals and converting them to a baseband digital signal including successive segments of trellis-coded baseband digital signal;

a trellis decoder connected for responding to said successive segments of said trellis-coded baseband digital signal to supply successive segments of a convolutionally interleaved trellis-decoding result;

a de-interleaver connected for receiving said convolutionally interleaved trellis-decoding result and de-interleaving it to supply successive segments of de-interleaved data fields as a de-interleaver response;

error-correction circuitry connected for performing Reed-Solomon decoding and error-correction procedures on said successive segments of said de-interleaved data fields, thereby to regenerate respective successive segments of an error-corrected randomized baseband digital signal, said error-correction circuitry being of a type for performing two-dimensional Reed-Solomon decoding and error-correction procedures on at least selected ones of said successive segments of said de-interleaved data fields; and a first data de-randomizer connected for responding to said successive segments of said error-corrected randomized baseband digital signal to regenerate a transport stream of data packets.

50. The receiver of claim 49, wherein said error-correction circuitry comprises:

a decoder for transverse Reed-Solomon forward-error-correction coding;

a decoder for lateral Reed-Solomon forward-error-correction coding, connected for supplying said successive segments of said error-corrected randomized baseband digital signal to said first data de-randomizer; and random-access memory for temporarily storing in respective first and second banks thereof respective super groups of successive data segments extracted from said de-interleaver response, said first and second banks of said random-access memory connected for successive cycles of read-then-write-over operation, which cycles are considered for purposes of claiming to be ordinally numbered in order of their occurrence in time, said first bank of said random-access memory connected for having each successive segment of the super group temporarily stored therein laterally scanned during odd-numbered cycles of read-then-overwrite operation for reading to said decoder for lateral Reed-Solomon forward-error-correction coding and for then being overwritten by a fresh segment of said de-interleaver response, said first bank of said random-access memory connected for having the super group temporarily stored therein transversely scanned during even-numbered cycles of read-then-overwrite operation for reading to said decoder for transverse Reed-Solomon forward-error-correction coding and for then being overwritten by corrected transverse Reed-Solomon forward-error-correction coding from said decoder for transverse Reed-Solomon forward-error-correction coding, said second bank of said random-access memory connected for having each successive segment of the super group temporarily stored therein laterally scanned during even-numbered cycles of read-then-overwrite operation for reading to said decoder for lateral Reed-Solomon forward-error-correction coding and for then being overwritten by a fresh segment of said de-interleaver response, said second bank of said random-access memory connected for having the super group temporarily stored therein transversely scanned during odd-numbered cycles of read-then-overwrite operation for reading to said decoder for transverse Reed-Solomon forward-error-correction coding and for then being overwritten by corrected transverse Reed-Solomon forward-error-correction coding from said decoder for transverse Reed-Solomon forward-error-correction coding.

51. The receiver of claim 50 further comprising:
a plurality of packet decoders for different types of data packets; and
a transport stream de-multiplexer connected for receiving said transport stream from said first data de-randomizer and for sorting data packets of different types from said transport stream to appropriate ones of said plurality of packet decoders.

52. The receiver of claim 50, wherein said decoder for transverse Reed-Solomon forward-error-correction coding is selected from a plurality of decoders, each for decoding a respective one of different transverse Reed-Solomon forward-error-correction codes.

53. The receiver of claim 50, wherein each said super group contains substantially 312 data segments.

54. The receiver of claim 50, wherein each said super group contains substantially 156 data segments.

55. The receiver of claim 49, wherein said error-correction circuitry comprises:
a first decoder for lateral Reed-Solomon forward-error-correction coding, connected for correcting said successive segments of said de-interleaver response to generate respective successive segments of a de-interleaver response with initial lateral Reed-Solomon error-correction;
a second decoder for lateral Reed-Solomon forward-error-correction coding, connected for supplying said successive segments of said error-corrected randomized baseband digital signal to said first data de-randomizer;
a decoder for transverse Reed-Solomon forward-error-correction coding; and
random-access memory for temporarily storing in respective first and second banks thereof respective super groups of successive data segments extracted from said de-interleaver response with initial lateral Reed-Solomon error-correction, said first and second banks of said random-access memory connected for successive cycles of read-then-write-over operation, which cycles are considered for purposes of claiming to be ordinally numbered in order of their occurrence in time, said first bank of said random-access memory connected for having each successive segment of the super group temporarily stored therein laterally scanned during odd-numbered cycles of read-then-overwrite operation for reading to said second decoder for lateral Reed-Solomon forward-error-correction coding and for then being overwritten by a fresh segment of said de-interleaver response with initial lateral Reed-Solomon error-correction supplied from said first decoder for lateral Reed-Solomon forward-error-correction coding, said first bank of said random-access memory connected for having the super group temporarily stored therein transversely scanned during even-numbered cycles of read-then-overwrite operation for reading to said decoder for transverse Reed-Solomon forward-error-correction coding and for then being overwritten by corrected transverse Reed-Solomon forward-error-correction coding from said decoder for transverse Reed-Solomon forward-error-correction coding, said second bank of said random-access memory connected for having each successive segment of the super group temporarily stored therein laterally scanned during even-numbered cycles of read-then-overwrite operation for reading to said second decoder for lateral Reed-Solomon forward-error-correction coding and for then being overwritten by a fresh segment of said de-interleaver response with initial lateral Reed-Solomon error-correction supplied from said first decoder for lateral Reed-Solomon forward-error-correction coding, said second bank of said random-access memory connected for having the super group temporarily stored therein transversely scanned during odd-numbered cycles of read-then-overwrite operation for reading to said decoder for transverse Reed-Solomon forward-error-correction coding and for then being overwritten by corrected transverse Reed-Solomon forward-error-correction coding from said decoder for transverse Reed-Solomon forward-error-correction coding.

56. The receiver of claim 55, further comprising:
a plurality of packet decoders for different types of data packets; and
a transport stream de-multiplexer connected for receiving said transport stream from said first data de-randomizer and for sorting data packets of different types from said transport stream to appropriate ones of said plurality of packet decoders.

57. The receiver of claim 55, wherein said decoder for transverse Reed-Solomon forward-error-correction coding is selected from a plurality of decoders, each for decoding a respective one of different transverse Reed-Solomon forward-error-correction codes.

58. The receiver of claim 55, wherein each said super group contains substantially 312 data segments.

59. The receiver of claim 55, wherein each said super group contains substantially 156 data segments.

60. The receiver of claim 55, wherein said first decoder for lateral Reed-Solomon forward-error-correction coding is connected for supplying indications when it is unable to correct all errors in any segment of said de-interleaver response, and wherein said decoder for transverse Reed-Solomon forward-error-correction coding is of a type that is connected for receiving said indications and using them in locating errors in transverse Reed-Solomon forward-error-correction codes.

61. The receiver of claim 49, wherein said error-correction circuitry comprises:
a first decoder for lateral Reed-Solomon forward-error-correction coding, connected for correcting said successive segments of said de-interleaver response to generate respective successive segments of de-interleaver response with initial lateral Reed-Solomon error-correction;
a second decoder for lateral Reed-Solomon forward-error-correction coding, connected for supplying said successive segments of said error-corrected randomized baseband digital signal to said first data de-randomizer;

a plurality of decoders for transverse Reed-Solomon forward-error-correction coding, each of which decodes transverse Reed-Solomon forward-error-correction coding of a respective different type from the others;

a second data de-randomizer connected for de-randomizing at least the randomized packet identifier (PID) bits in each of said successive segments of said de-interleaver response with initial lateral Reed-Solomon error-correction;

a plurality of correlation filters connected for receiving from said second data de-randomizer the de-randomized packet identifier bits in each of said successive segments of said de-interleaver response with initial lateral Reed-Solomon error-correction, each of said correlation filters designed for responding to a respective set of packet identifier bits indicative of a respective type of transverse Reed-Solomon forward-error-correction coding being used;

a position-code latch for temporarily storing the respective responses of said plurality of correlation filters until the conclusion of a data field, thereby to-generate a position code descriptive of said respective type of transverse Reed-Solomon forward-error-correction coding being used in that data field;

a shift register connected for receiving each successive position code temporarily stored until the conclusion of a data field and temporarily storing it throughout the duration of at least one further data field;

operations control circuitry responsive to each said position code stored in said shift register for selecting one of said plurality of decoders for transverse Reed-Solomon forward-error-correction coding to be the only currently utilized decoder for transverse Reed-Solomon forward-error-correction coding; and random-access memory for temporarily storing in respective first and second banks thereof respective super groups of successive data packets extracted from said de-interleaver response with initial lateral Reed-Solomon error-correction, said first and second banks of said random-access memory connected for successive cycles of read-then-write-over operation, which cycles are considered for purposes of claiming to be ordinally numbered in order of their occurrence in time, said first bank of said random-access memory connected for having each successive segment of the super group temporarily stored therein laterally scanned during odd-numbered cycles of read-then-overwrite operation for reading to said second decoder for lateral Reed-Solomon forward-error-correction coding and for then being overwritten by a fresh segment of said de-interleaver response with initial lateral Reed-Solomon error-correction supplied from said first decoder for lateral Reed-Solomon forward-error-correction coding, said first bank of said random-access memory connected for having the super group temporarily stored therein transversely scanned during even-numbered cycles of read-then-overwrite operation for reading to said currently utilized decoder for transverse Reed-Solomon forward-error-correction coding and for then being overwritten by corrected transverse Reed-Solomon forward-error-correction coding from said currently utilized decoder for transverse Reed-Solomon forward-error-correction coding, said second bank of said random-access memory connected for having each successive segment of the super group temporarily stored therein laterally scanned during even-numbered cycles of read-then-overwrite operation for reading to said second decoder for lateral Reed-Solomon forward-error-correction coding and for then being overwritten by a fresh segment of said de-interleaver response with initial lateral Reed-Solomon error-correction supplied from said first decoder for lateral Reed-Solomon forward-error-correction coding, said second bank of said random-access memory connected for having the super group temporarily stored therein transversely scanned during odd-numbered cycles of read-then-overwrite operation for reading to said currently utilized decoder for transverse Reed-Solomon forward-error-correction coding and for then being overwritten by corrected transverse Reed-Solomon forward-error-correction coding from said currently utilized decoder for transverse Reed-Solomon forward-error-correction coding.

62. The receiver of claim 61, further comprising:

a plurality of packet decoders for different types of data packets; and a transport stream de-multiplexer connected for receiving said transport stream from said first data de-randomizer and for sorting data packets of different types from said transport stream to appropriate ones of said plurality of packet decoders.

63. The receiver of claim 49, further comprising:

a first packet decoder, said first packet decoder being of MPEG-2 type for use in decoding video data packets;

a transport stream de-multiplexer connected for receiving said transport stream from said first data de-randomizer and for sorting video data packets from said transport stream to said first packet decoder;

a second packet decoder; and a second data de-randomizer connected for receiving an input signal composed of randomized data packets and responding to those said randomized data packets to supply de-randomized data packets to said second packet decoder.

64. The receiver of claim 63, wherein said error-correction circuitry comprises:

first and second decoders for lateral Reed-Solomon forward-error-correction coding, said first decoder for lateral Reed-Solomon forward-error-correction coding connected for correcting said successive segments of said de-interleaver response to generate respective successive segments of a de-interleaver response with initial lateral Reed-Solomon error-correction, said first decoder for lateral Reed-Solomon forward-error-correction coding connected for supplying said first data de-randomizer said successive segments of said error-corrected randomized baseband digital signal, said second decoder for lateral Reed-Solomon forward-error-correction coding connected for supplying said second data de-randomizer its said input signal composed of randomized data packets;

a decoder for transverse Reed-Solomon forward-error-correction coding; and random-access memory for temporarily storing in respective first and second banks thereof respective super groups of data segments extracted from said de-interleaver response with initial lateral Reed-Solomon error-correction, said first and second banks of said random-access memory connected for successive cycles of read-then-write-over operation, which cycles are considered for purposes of claiming to be ordinally numbered in order of their occurrence in time, said first bank of said random-access memory connected for having each successive segment of the super group temporarily stored therein laterally scanned during odd-numbered cycles of read-then-overwrite operation for reading to said second decoder for lateral Reed-Solomon forward-error-correction coding and for then being overwritten by a fresh segment of said de-interleaver response with initial lateral Reed-Solomon error-correction, said first bank of said random-access memory connected for having the super group temporarily stored therein transversely scanned during even-numbered cycles of read-then-overwrite operation for reading to said decoder for transverse Reed-Solomon forward-error-correction coding and for then being overwritten by corrected transverse Reed-Solomon forward-error-correction coding from said decoder for transverse Reed-Solomon forward-error-correction coding, said second bank of said random-access memory connected for having each successive segment of the super group temporarily stored therein laterally scanned during even-numbered cycles of read-then-overwrite operation for reading to said second decoder for lateral Reed-Solomon forward-error-correction coding and for then being overwritten by a fresh segment of said de-interleaver response with initial lateral Reed-Solomon error-correction, said second bank of said random-access memory connected for having the super group temporarily stored therein transversely scanned during odd-numbered cycles of read-then-overwrite operation for reading to said decoder for transverse Reed-Solomon forward-error-correction coding and for then being overwritten by corrected transverse Reed-Solomon forward-error-correction coding from said decoder for transverse Reed-Solomon forward-error-correction coding.

65. The receiver of claim 64, wherein said super groups of data segments extracted from said de-interleaver response with initial lateral Reed-Solomon error-correction are composed of audio data packets and packets containing parity bytes of transverse Reed-Solomon forward-error-correction coding of said audio packets, and wherein said second packet decoder is of AC-3 type for use in decoding audio data packets.

66. The receiver of claim 65, wherein the super groups temporarily stored in said first random-access memory correspond to respective data fields.

67. The receiver of claim 65, wherein the super groups temporarily stored in said first random-access memory correspond to respective halves of data fields.

68. The receiver of claim 65, wherein said super groups of data segments extracted from said de-interleaver response with initial lateral Reed-Solomon error-correction are composed of audio data packets and packets containing parity bytes of transverse Reed-Solomon forward-error-correction coding of said audio packets, and wherein said second packet decoder is of AC-3 type for use in decoding audio data packets.

69. The receiver of claim 63, wherein said error-correction circuitry comprises:

first, second and third decoders for lateral Reed-Solomon forward-error-correction coding, said first decoder for lateral Reed-Solomon forward-error-correction coding connected for correcting said successive segments of said de-interleaver response to generate respective successive segments of a de-interleaver response with initial lateral Reed-Solomon error-correction, said second decoder for lateral Reed-Solomon forward-error-correction coding connected for supplying said successive segments of said error-corrected randomized baseband digital signal to said first data de-randomizer, said third decoder for lateral Reed-Solomon forward-error-correction coding connected for supplying said second data de-randomizer its said input signal composed of randomized data packets;

a plurality of decoders for transverse Reed-Solomon forward-error-correction coding;

first Reed-Solomon forward-error-correction decoder application circuitry connected for selecting one of said plurality of decoders for transverse Reed-Solomon forward-error-correction coding to be used in first transverse Reed-Solomon forward-error-correction decoding operations;

second Reed-Solomon forward-error-correction decoder application circuitry connected for selecting one of said plurality of decoders for transverse Reed-Solomon forward-error-correction coding to be used in second transverse Reed-Solomon forward-error-correction decoding operations;

a first random-access memory for temporarily storing in respective first and second banks thereof respective super groups of data segments extracted from said de-interleaver response with initial lateral Reed-Solomon error-correction, said first and second banks of said first random-access memory connected for successive cycles of read-then-write-over operation used in said first transverse Reed-Solomon forward-error-correction decoding operations, which cycles are considered for purposes of claiming to be ordinally numbered in order of their occurrence in time, said first bank of said first random-access memory connected for having each successive segment of the super group temporarily stored therein laterally scanned during odd-numbered cycles of read-then-overwrite operation for reading to said second decoder for lateral Reed-Solomon forward-error-correction coding and for then being overwritten by a fresh segment of said de-interleaver response with initial lateral Reed-Solomon error-correction, said first bank of said first random-access memory connected for having the super group temporarily stored therein transversely scanned during even-numbered cycles of read-then-overwrite operation for reading to the one of said plurality of decoders for transverse Reed-Solomon forward-error-correction coding selected to be used in said first transverse Reed-Solomon forward-error-correction decoding operations and for then being overwritten by corrected transverse Reed-Solomon forward-error-correction coding from said decoder selected to be used in said first transverse Reed-Solomon forward-error-correction decoding operations, said second bank of said first random-access memory connected for having each successive segment of the super group temporarily stored therein laterally scanned during even-numbered cycles of read-then-overwrite operation for reading to said second decoder for lateral Reed-Solomon forward-error-correction coding and for then being overwritten by a fresh segment of said de-interleaver response with initial lateral Reed-Solomon error-correction, said second bank of said first random-access memory connected for having the super group temporarily stored therein transversely scanned during odd-numbered cycles of read-then-overwrite operation for reading to the one of said plurality of decoders for transverse Reed-Solomon forward-error-correction coding selected to be used in said first transverse Reed-Solomon forward-error-correction decoding operations and for then being overwritten by corrected transverse Reed-Solomon forward-error-correction coding from said decoder selected to be used in said first transverse Reed-Solomon forward-error-correction decoding operations; and a second random-access memory for temporarily storing in respective first and second banks thereof respective super groups of data segments extracted from said error-corrected randomized baseband digital signal generated by said second decoder for lateral Reed-Solomon forward-error-correction coding, said first and second banks of said second random-access memory connected for successive cycles of read-then-write-over operation used in said second transverse Reed-Solomon forward-error-correction decoding operations, which cycles are considered for purposes of claiming to be ordinally numbered in order of their occurrence in time, said first bank of said second random-access memory connected for having each successive segment of the super group temporarily stored therein laterally scanned during odd-numbered cycles of read-then-overwrite operation for reading to said third decoder for lateral Reed-Solomon forward-error-correction coding and for then being overwritten by a fresh segment of said error-corrected randomized baseband digital signal generated by said second decoder for lateral Reed-Solomon forward-error-correction coding, said first bank of said second random-access memory connected for having the super group temporarily stored therein transversely scanned during even-numbered cycles of read-then-overwrite operation for reading to the one of said plurality of decoders for transverse Reed-Solomon forward-error-correction coding selected to be used in said second transverse Reed-Solomon forward-error-correction decoding operations and for then being overwritten by corrected transverse Reed-Solomon forward-error-correction coding from said decoder selected to be used in said second transverse Reed-Solomon forward-error-correction decoding operations, said second bank of said second random-access memory connected for having each successive segment of the super group temporarily stored therein laterally scanned during even-numbered cycles of read-then-overwrite operation for reading to said third decoder for lateral Reed-Solomon forward-error-correction coding and for then being overwritten by a fresh segment of said error-corrected randomized baseband digital signal generated by said second decoder for lateral Reed-Solomon forward-error-correction coding, said second bank of said second random-access memory connected for having the super group temporarily stored therein transversely scanned during odd-numbered cycles of read-then-overwrite operation for reading to the one of said plurality of decoders for transverse Reed-Solomon forward-error-correction coding selected to be used in said second transverse Reed-Solomon forward-error-correction decoding operations and for then being overwritten by corrected transverse Reed-Solomon forward-error-correction coding from said decoder selected to be used in said second transverse Reed-Solomon forward-error-correction decoding operations.

70. The receiver of claim 49, further comprising:
a plurality of packet decoders for different types of data packets; and
a transport stream de-multiplexer connected for receiving said transport stream from said first data de-randomizer and for sorting data packets of different types from said transport stream to appropriate ones of said plurality of packet decoders.

71. The receiver of claim 70, wherein said error-correction circuitry comprises:
a first decoder for lateral Reed-Solomon forward-error-correction coding, connected for correcting said successive segments of said de-interleaver response to generate respective successive segments of a de-interleaver response with initial lateral Reed-Solomon error-correction;
a second decoder for lateral Reed-Solomon forward-error-correction coding, connected for supplying said successive segments of said error-corrected randomized baseband digital signal to said first data de-randomizer;
a plurality of decoders for transverse Reed-Solomon forward-error-correction coding;
Reed-Solomon forward-error-correction decoder application circuitry connected for selecting one of said plurality of decoders for transverse Reed-Solomon forward-error-correction coding to be used in transverse Reed-Solomon forward-error-correction decoding operations; and
random-access memory for temporarily storing in respective first and second banks thereof respective super groups of successive data segments extracted from said de-interleaver response with initial lateral Reed-Solomon error-correction,
said first and second banks of said random-access memory connected for successive cycles of read-then-write-over operation, which cycles are considered for purposes of claiming to be ordinally numbered in order of their occurrence in time, said first bank of said random-access memory connected for having each successive segment of the super group temporarily stored therein laterally scanned during odd-numbered cycles of read-then-overwrite operation for reading to said second decoder for lateral Reed-Solomon forward-error-correction coding and for then being overwritten by a fresh segment of said de-interleaver response with initial lateral Reed-Solomon error-correction supplied from said first decoder for lateral Reed-Solomon forward-error-correction coding, said first bank of said random-access memory connected for having the super group temporarily stored therein transversely scanned during even-numbered cycles of read-then-overwrite operation for reading to the one of said plurality of decoders for transverse Reed-Solomon forward-error-correction coding selected by said Reed-Solomon forward-error-correction decoding application circuitry to be used in transverse Reed-Solomon forward-error-correction decoding operations and for then being overwitten by corrected transverse Reed-Solomon forward-error-correction coding from said decoder so selected, said second bank of said random-access memory connected for having each successive segment of the super group temporarily stored therein laterally scanned during even-numbered cycles of read-then-overwrite operation for reading to said second decoder for lateral Reed-Solomon forward-error correction coding and for then being overwritten by a fresh segment of said de-interleaver response with initial lateral Reed- Solomon error-correction supplied from said first decoder for lateral Reed-Solomon forward-error-correction coding, said second bank of said random-access memory connected for having the super group temporarily stored therein transversely scanning during odd-numbered cycles of read-then-overwrite operation for reading to the one of said plurality of decoders for transverse Reed-Solomon forward-error-correction coding selected by said Reed-Solomon forward-error-correction decoder application circuitry to be used in transverse Reed-Solomon forward-error-correction decoding operations and for then being overwritten by corrected transverse Reed-Solomon forward-error-correction coding from said decoder so selected.

72. The receiver of claim 71, further comprising:
a transmission mode detector responsive to selected portions of said baseband digital signal for determining which if any of said plurality of decoders for transverse Reed-Solomon forward-error-correction coding is to be employed and for controlling said Reed-Solomon forward-error-correction decoder application circuit in its selection of one of said plurality of decoders for transverse Reed-Solomon forward-error-correction coding to be used in said transverse Reed-Solomon forward-error-correction decoding operations.

73. The receiver of claim 72, further comprising:
a second data de-randomizer connected for de-randomizing at least the randomized packet identifier (PID) bits in each of said successive segments of said de-interleaver response with initial lateral Reed-Solomon error-correction generated by said first decoder for lateral Reed-Solomon forward-error-correction coding, said transmission mode detector being connected to receive the de-randomized PID bits for use in determining which if any of said plurality of decoders for transverse Reed-Solomon forward-error-correction coding is to be employed.

74. The receiver of claim 49, wherein said trellis decoder is of a plural-mode type capable of selectively demodulating symbols transmitted using a full 8VSB alphabet and symbols transmitted using a restricted 8VSB alphabet, said receiver further comprising:
first, second and third packet decoders, said first packet decoder being of MPEG-2 type for use in decoding video data packets, and said second packet decoder being of AC-3 type for use in decoding audio packets;
a transport stream de-multiplexer connected for receiving said transport stream from said first data de-randomizer, for sorting video data packets from said transport stream to said first packet decoder, and for sorting audio data packets from said transport stream to said second packet decoder;
a first 2-segments-1 data compressor connected for receiving pairs of data packets that include 184-byte portions demodulated from symbols transmitted using said restricted 8VSB alphabet, said 2-segments-to-1 data compressor reproducing in its response to each said pair of data packets a respective single randomized data packet; and
a second data de-randomizer connected for receiving as its input signal the response of said first 2-segments-to-1 data compressor and responding to said randomized data packets in that response to supply de-randomized data packets to said third packet decoder as input signal thereto.

75. The receiver of claim 74 wherein said error-correction circuitry comprises:
first, second and third decoders for lateral Reed-Solomon forward-error-correction coding, said first decoder for lateral Reed-Solomon forward-error-correction coding connected for correction said successive segments of said de-interleaver response to generate respective successive segments of a de-interleaver response with initial lateral Reed-Solomon error-correction, said second decoder for lateral Reed-Solomon forward-error-correction coding connected for supplying said successive segments of said error-corrected randomized baseband digital signal to said first data de-randomizer, said third decoder for lateral Reed-Solomon forward-error-correction coding connected for supplying said first 2-segments-to-1 data compressor its input signal composed of pairs of randomized data packets;
a second 2-segments-to-1 data compressor connected for receiving pairs of data segments from said error-corrected randomized baseband digital signal supplied by said second decoder for lateral Reed-Solomon forward-error-correction coding, which pairs of data segments include 184-byte packets demodulated from symbols transmitted using said restricted 8VSB alphabet, said second 2-segments-to-1 data compressor reproducing in its response to each said pair of data segments a respective single extended data segment, the extended data segments in the response of said 2-segments-to-1 data compressor at times being subject to Reed-Solomon forward-error-correction coding;
circuitry for expanding each of extended data segments into a respective pair of data segments, which said third decoder for Reed-Solomon forward-error-correction coding is connected to receive as input signal thereto;
a plurality of decoders for transverse Reed-Solomon forward-error-correction coding;
first Reed-Solomon forward-error-correction decoder application circuitry connected for selecting one of said plurality of decoders for transverse Reed-Solomon forward-error-correction coding to be used in first transverse Reed-Solomon forward-error-correction decoding operation;
second Reed-Solomon forward-error-correction decoder application circuitry connected for selecting one of said plurality of decoders for transverse Reed-Solomon forward-error-correction coding to be used in second transverse Reed-Solomon forward-error-correction decoding operations;
a first random-access memory for temporarily storing in respective first and second banks thereof respective super groups of data segments extracted from said de-interleaver response with initial Reed-Solomon error-correction, said first and second banks of said first random-access memory connected for successive cycles of read-then-write-over operation used in said first transverse Reed-Solomon forward-error-correction decoding operations, which cycles are considered for purposes of claiming to be ordinally numbered in order of their occurrence in time,
said first bank of said first random-access memory connected for having each successive segment of the super group temporarily stored therein laterally scanned during odd-numbered cycles of read-then-overwrite operation for reading to said second decoder for lateral Reed-Solomon forward-error-correction coding and for then being overwritten by a fresh segment of said de-interleaver response with initial lateral Reed-Solomon error-correction, said first bank of said first random-access memory connected for having the super group temporarily stored therein transversely scanned during even-numbered cycles of read-then-overwrite operation for reading to the one of said plurality of decoders for transverse Reed-Solomon forward-error-correction coding selected to be used in said first transverse Reed-Solomon forward-error-correction decoding operations and for then being overwritten by corrected transverse Reed-Solomon forward-error-correction coding from said decoder selected to be used in said first transverse Reed-Solomon forward-error-correction decoding operations, said second bank of said first random-access memory connected for having each successive segment of the super group temporarily stored therein laterally scanned during even-numbered cycles of read-then-overwrite operation for reading to said second decoder for lateral Reed-Solomon forward-error-correction coding and for then being overwritten by a fresh segment of said de-interleaver response with initial lateral Reed-Solomon error-correction, said second bank of said first random-access memory connected for having the super group temporarily stored therein transversely scanned during odd-numbered cycles of read-then-overwrite operation for reading to the one of said plurality of decoders for transverse Reed-Solomon forward-error-correction coding selected to be used in said first transverse Reed-Solomon forward-error-correction decoding operations and for then being overwritten by corrected transverse Reed-Solomon forward-error-correction coding from said decoder selected to be used in said first transverse Reed-Solomon forward-error-correction decoding operations; and a second random-access memory for temporarily storing in respective first and second banks thereof respective super groups of extended data segments extracted from the response of said 2-segments-to-1 data compressor, said first and second banks of said second random-access memory connected for successive cycles of read-then-write-over operation used in said second transverse Reed-Solomon forward-error-correction decoding operations, which cycles are considered for purposes of claiming to be ordinally numbered in order of their occurrence in time, said first bank of said second random-access memory connected for having each successive extended data segment of the super group temporarily stored therein laterally scanned during odd-numbered cycles of read-then-overwrite operation for reading to said circuitry for expanding each of extended data segments into a respective pair of data segments and for then being overwritten by a fresh extended data segment from the response of said second 2-segments-to-1 data compressor, said first bank of said second random-access memory connected for having the super group temporarily stored therein transversely scanned during even-numbered cycles of Reed-Solomon forward-error-correction coding selected to be used in said second transverse Reed-Solomon forward-error-correction decoding operations and for then being overwritten by corrected transverse Reed-Solomon forward-error-correction coding from said decoder selected to be used in said second transverse Reed-Solomon forward-error-correction decoding operations, said second bank of said second random-access memory connected for having each successive segment of the super group temporarily stored therein laterally scanned during even-numbered cycles of read-then-overwrite operation for reading to said circuitry for expanding each of extended data segments into a respective pair of data segments and for then being overwritten by a fresh extended data segment from the response of said second 2-segments-to-1 data compressor, said second bank of said second random-access memory connected for having the super group temporarily stored therein transversely scanned during odd-numbered cycles of read-then-overwrite operation for reading to the one of said plurality of decoders for transverse Reed-Solomon forward-error-correction coding selected to be used in said second transverse Reed-Solomon forward-error-correction decoding operations and for then being overwritten by corrected transverse Reed-Solomon forward-error-correction coding from said decoder selected to be used in said second transverse Reed-Solomon forward-error-correction decoding operations.

\* \* \* \* \*